US008193288B2

(12) United States Patent
Gu et al.

(10) Patent No.: US 8,193,288 B2
(45) Date of Patent: Jun. 5, 2012

(54) SUPPORTED NONMETALLOCENE CATALYST AND PREPARATION THEREOF

(75) Inventors: Yuefeng Gu, Nanjing (CN); Chuanfeng Li, Nanjing (CN); Xiaoli Yao, Nanjing (CN); Zhonglin Ma, Nanjing (CN); Bo Liu, Nanjing (CN); Feng Guo, Nanjing (CN); Yaming Wang, Nanjing (CN); Jiye Bai, Nanjing (CN); Shaohui Chen, Nanjing (CN); Xiaoqiang Li, Nanjing (CN)

(73) Assignee: Sinopec Yangzi Petro-Chemical Ltd. (CN)

( * ) Notice: Subject to any disclaimer, the term of this patent is extended or adjusted under 35 U.S.C. 154(b) by 25 days.

(21) Appl. No.: 12/669,394

(22) PCT Filed: Oct. 15, 2008

(86) PCT No.: PCT/CN2008/001738
§ 371 (c)(1),
(2), (4) Date: Jan. 15, 2010

(87) PCT Pub. No.: WO2009/052700
PCT Pub. Date: Apr. 30, 2009

(65) Prior Publication Data
US 2011/0152486 A1    Jun. 23, 2011

(30) Foreign Application Priority Data

Oct. 16, 2007  (CN) .......................... 2007 1 0162672
Oct. 16, 2007  (CN) .......................... 2007 1 0162675
Oct. 16, 2007  (CN) .......................... 2007 1 0162677

(51) Int. Cl.
*C08F 4/00*    (2006.01)
*C08F 4/06*    (2006.01)
*C08F 4/44*    (2006.01)
*C08F 4/02*    (2006.01)
*C08F 4/60*    (2006.01)
*B01J 31/00*   (2006.01)
*B01J 37/00*   (2006.01)

(52) U.S. Cl. ....... 526/90; 526/120; 526/123.1; 526/126; 526/148; 502/126; 502/109; 502/115; 502/116; 502/121; 502/122; 502/123; 502/125; 502/127; 502/133; 502/134

(58) Field of Classification Search .................. 502/126, 502/109, 115, 116, 121, 122, 125, 123, 127, 502/133, 134; 526/90, 120, 123.1, 126, 148
See application file for complete search history.

(56) References Cited

U.S. PATENT DOCUMENTS

| 4,808,561 A | 2/1989 | Welborn, Jr. |
| 4,871,705 A | 10/1989 | Hoel |
| 5,122,492 A | 6/1992 | Albizzati et al. |
| 5,240,894 A | 8/1993 | Burkhardt et al. |
| 5,244,855 A * | 9/1993 | Morini et al. ............... 502/126 |
| 6,444,604 B1 | 9/2002 | Albizzati et al. |
| 2008/0227936 A1 | 9/2008 | Dai et al. |
| 2011/0237764 A1 | 9/2011 | Gu et al. |

FOREIGN PATENT DOCUMENTS

| CN | 1052681 | 7/1991 |
| CN | 1066274 | 11/1992 |
| CN | 1103069 | 5/1995 |
| CN | 1126480 | 7/1996 |
| CN | 1174849 | 3/1998 |
| CN | 1235166 | 11/1999 |
| CN | 1053673 | 6/2000 |
| CN | 1307594 | 8/2001 |
| CN | ZL01126323.7 | 1/2002 |
| CN | 1344749 | 4/2002 |
| CN | 1363537 | 8/2002 |
| CN | 1364817 | 8/2002 |
| CN | ZL02110844.7 | 8/2002 |
| CN | ZL02151294.9 | 6/2003 |
| CN | ZL01131136.3 | 8/2004 |
| CN | 1539855 | 10/2004 |
| CN | 1539856 | 10/2004 |
| CN | 1789290 | 6/2006 |
| CN | 1789291 | 6/2006 |
| CN | 1789292 | 6/2006 |
| CN | 1840549 | 10/2006 |
| CN | 1884253 | 12/2006 |

(Continued)

OTHER PUBLICATIONS

Xiao, Yi-zhi et al. "Study on a novel $TiCl_4/Ni(acac)_2IL$ Supported Ligand Composite Catalyst in Ethylene Polymerization to Produce Branched Polyethylene", Zhongshan Daxue Xuebao: Natural Science Edition, 2003, 42(3):28.

Ochedzan-Siodlak, Wioletta et al. "Heterogeneous zirconocene catalyst on magnesium support $MgCl_2(THF)_3$ modified by $AlEt_2Cl$ for ethylene polymerization", European Polymer Journal, 2005, 41, 941 to 947.

Sun, Min et al., "In-site Synthesis of $CpTi(dbm)Cl_2/MgCl_2$ Catalyst and its Catalysis for Ethylene Polymerization", Acta Polymerica Sinica, 2009 (1) pp. 137-139.

European Search Report issued Oct. 18, 2011, in European Patent Application No. 08842385.0.

(Continued)

*Primary Examiner* — William Cheung
(74) *Attorney, Agent, or Firm* — Fitch, Even, Tabin & Flannery, LLP

(57) ABSTRACT

This invention relates to a supported nonmetallocene catalyst for olefin polymerization, which is produced by directly reacting a nonmetallocene ligand with a catalytically active metallic compound on a carrier through an in-situ supporting process. The process according to this invention is simple and feasible, and it is easy to adjust the load of the nonmetallocene ligand on the porous carrier. The supported nonmetallocene catalyst according to this invention can be used for olefin homopolymerization/copolymerization, even in combination with a comparatively less amount of the co-catalyst, to achieve a comparatively high polymerization activity. Further, the polymer product obtained therewith boasts desirable polymer morphology and a high bulk density.

30 Claims, No Drawings

FOREIGN PATENT DOCUMENTS

| | | |
|---|---|---|
| CN | 200610026765.8 | 12/2006 |
| CN | 200610026766.2 | 12/2006 |
| CN | 200510119401 | 5/2007 |
| CN | 200510080210.7 | 2/2009 |
| EP | 0206794 | 12/1986 |
| EP | 0260130 | 3/1988 |
| EP | 0434082 | 6/1991 |
| EP | 0435557 | 7/1991 |
| EP | 0506073 | 9/1992 |
| EP | 0685494 | 12/1995 |
| EP | 0708116 | 4/1996 |
| EP | 1229055 | 8/2002 |
| EP | 1829897 | 9/2007 |
| EP | 2039677 | 3/2009 |
| KR | 20040061490 | 7/2004 |
| WO | 03/010207 | 6/2003 |
| WO | 03/047751 | 6/2003 |
| WO | 03/047752 | 6/2003 |
| WO | WO 2005052010 A1 | 9/2005 |
| WO | 2006/063501 | 6/2006 |
| WO | 2007/134537 | 11/2007 |
| WO | 2009/052700 | 4/2009 |

OTHER PUBLICATIONS

Gibson V C. and Spitzmesser S. K., "Advances in Non-Metallocene Olefin Polymerization Catalysis", Chem Rev 2003, 103, 283-315.

Britovsek, G. J. P., Gibson, V. C. and Wass, D. F. (1999), The Search for New-Generation Olefin Polymerization Catalysts: Life beyond Metallocenes. Angewandte Chemie International Edition, 38: 428-447.

Xiao Shijing and Yu Fusheng, "Olefin Coordination Polymerization Catalyst and Polyolefin", Beijing Industry University Press, Dec. 2002.

Huang qiang, Zhu Bochao, "Development in Olefin Polymerization Catalyst and Our Strategy in This Regard", Petrochemical Technology, 2001, vol. 30 supplement, 454-459.

Mingli Gao et al., "Ethylene-norbornene copolymerization by new titanium complexes bearing tridentate ligands. Sidearm effects on catalytic activity", Macromolecular Rapid Communications, 2007, 28, 1511-1516.

Wei-Qiu Hu et al., "Synthesis and Characterization of Novel Tridentate [NOP] Titanium Complexes and Their Application to Copolymerization and Polymerization of Ethylene", Organometallics 2004, 23, 1684-1688.

Hungarian Search Report issued on Dec. 2, 2011, in Singapore Application No. 200906868-5.

Hungarian Intellectual Property Office Search Report issued Dec. 16, 2011, for Singapore Application No. 201000759-9.

* cited by examiner

SUPPORTED NONMETALLOCENE CATALYST AND PREPARATION THEREOF

This is a National Phase application of International Application PCT/CN2008/001738, filed Oct. 15, 2008, which claims priority to and benefit of Chinese patent applications No. 200710162677.5, filed Oct. 16, 2007, No. 200710162672.2, filed Oct. 16, 2007, and No. 200710162675.6, filed Oct. 16, 2007, the contents of which is fully incorporated by reference herein.

TECHNICAL FIELD

The present invention relates to a supported nonmetallocene catalyst. Specifically, this invention relates to a supported nonmetallocene catalyst for olefin polymerization, which is produced by directly reacting a nonmetallocene ligand with a catalytically active metallic compound on a carrier through an in-situ supporting process. The supported nonmetallocene catalyst according to this invention can be used for olefin homopolymerization/copolymerization, when in combination with such a co-catalyst as an aluminoxane or an alkylaluminum.

BACKGROUND ART

The nonmetallocene catalyst, also called as the post-metallocene catalyst, was discovered in middle and late 1990's, whose central atom involves nearly all of the transition metal elements. The nonmetallocene catalyst is comparative to, or exceeds, the metallocene catalyst in some aspects of the performance, and has been classified as the fourth generation catalyst for olefin polymerization, following the Ziegler catalyst, the Ziegler-Natta catalyst and the metallocene catalyst. Polyolefin products produced with such catalysts exhibit favorable properties and boast low production cost. The coordination atom of the nonmetallocene catalyst comprises oxygen, nitrogen, sulfur and phosphor, without containing a cyclopentadiene group or a derivative thereof (for example, an indene group or a fluorene group). The nonmetallocene catalyst is characterized in that its central atom shows comparatively strong electrophilicity and has a cis alkyl metal type or a metal halide type central structure, which facilitates olefin insertion and σ-bond transfer. Therefore, the central atom is easily subject to alkylation, and therefore facilitates formation of a cationic active center. The thus formed complex has a restricted geometrical configuration, and is stereoselective, electronegative and chiral adjustable. Further, the formed metal-carbon bond is easy to be polarized, which further facilitates homopolymerization and copolymerization of an olefin. For these reasons, it is possible to obtain an olefin polymer having a comparatively high molecular weight, even under a comparatively high polymerization temperature.

However, it is known that in the olefin polymerization, the homogeneous phase catalyst suffers from such problems as short service life, fouling, high consumption of methyl aluminoxane, and undesirably low or high molecular weight in the polymer product, and thus only finds limited use in the solution polymerization process or the high-pressure polymerization process, which hinders its wider application in industry.

Chinese patent Nos. 01126323.7, 02151294.9 and 02110844.7, and WO03/010207 disclose a catalyst or catalyst system finding a broad application in olefin polymerization. However, the catalyst or catalyst system should be accompanied by a comparatively high amount of co-catalysts, to achieve an acceptable olefin polymerization activity. Further, the catalyst or catalyst system suffers from such problems as short service life and fouling.

As the experiences from the polymerization industry involving a metallocene catalyst show, it is necessary to have the nonmetallocene catalyst supported.

By supporting, It is possible to avoid deactivation of the dual molecular in the homogeneous phase nonmetallocene catalyst, whereby improving the performance of the catalyst in the polymerization and the particle morphology of the polymer products. This is reflected by, moderate reduction of the initial activity of the catalyst, elongation of the serve life of the catalyst, alleviation or elimination of caking or flash reaction during the polymerization, improvement of the polymer morphology, and increase of the apparent density of the polymer, thus extending its use to other polymerization processes, for example, the gas phase polymerization or the slurry polymerization.

Aiming at the catalysts of the Chinese patent Nos. 01126323.7, 02151294.9 and 02110844.7, and WO03/010207, Chinese patent application Laid-Open Nos. CN1539855A, CN1539856A, CN1789291A, CN1789292A and CN1789290A, and WO2006/063501 and Chinese application patent No. 200510119401.x provide several ways to support same on a carrier so as to obtain a supported nonmetallocene catalyst. However, each of these applications relates to the technology of supporting a transition metal-containing nonmetallocene organic metallic compound on a treated carrier. The bonding between the nonmetallocene catalyst and the carrier is rather limited, and hence in the thus obtained supported nonmetallocene catalyst, the nonmetallocene organic metallic compound presents mainly in a physical adsorption state, which is unfavorable for control of the polymer particle morphology and exertion of the nonmetallocene catalyst performance.

Most of the prior art olefin polymerization catalysts are metallocene catalyst-based, for example, those according to U.S. Pat. No. 4,808,561 and U.S. Pat. No. 5,240,894, Chinese patent application Laid-Open Nos. CN1049439, CN1136239, CN1344749, CN1126480, CN1053673, CN1307594, CN1130932, CN1103069, CN1363537 and CN1060179, U.S. Pat. No. 5,744,17, EP 685494, U.S. Pat. No. 4,871,705 and EP0206794. Again, all of these applications relate to the technology of supporting a transition metal-containing metallocene catalyst on a treated carrier.

According to EP260130, provided is a catalyst produced by supporting a metallocene or nonmetallocene catalyst on a methyl aluminoxane-treated SiO2 carrier, wherein the nonmetallocene herein refers to ZrCl4, TiCl4 or VOCl3 only. According to this patent, it is preferably for the surface of the carrier to be treated with an organic magnesium compound or the mixture of a magnesium compound and an alkyl aluminum. However, the process involved is very complicated, necessitating a vast of production steps.

WO03/047752A1 and WO03/047751A1 provide a process for supporting a composite catalyst (a Zeigler-Natta catalyst with a metallocene catalyst, or a nonmetallocene catalyst with a metallocene catalyst) on silica. According to these patent applications, the chloride or oxychloride of vanadium or titanium is used as the nonmetallocene catalyst component, and therefore the thus obtained catalyst is a dual-metal type.

EP708116 discloses a process comprising contacting gasified ZrCl4 with a carrier at a temperature ranging from 160° C. to 450° C. to support thereon, then reacting the supported ZrCl4 with the Li-salt of a ligand to obtain a supported metallocene catalyst, which is finally used for olefin polymerization in combination with a co-catalyst. The process is rather undesirable since the supporting procedure should be conducted at a high reaction temperature and under a high vacuum.

Chinese patent No. 01131136.3 discloses a process for producing a supported metallocene catalyst, which comprises mixing a carrier with a Group IVB transition metal halide in a solvent under the normal pressure, then directly reacting with the cation ion of a ligand, so as to integrate synthesis and supporting of the metallocene catalyst in one step. However, according to this process, the transition metal and the ligand is used at a molar ratio of 1:1, and a proton acceptor (for example, butyl lithium) is required. Further, the ligand to be used is a bridged or non-bridged metallocene ligand containing a cyclopentadiene group.

Chinese patent No. 200510080210.7 discloses a process for in-situ producing a supported vanadium-based nonmetallocene catalyst for olefin polymerization and use thereof, which comprises reacting dialkyl magnesium with acyl naphthol or a β-dione to form magnesium acyl naphthol or magnesium β-dione compound, then reacting with a chloride of vanadium (IV), so as to form the carrier and the active catalytic component simultaneously.

Chinese patent No. 200610026765.8 discloses a single site Zeigler-Natta catalyst for olefin polymerization. In this catalyst, a coordination group-containing salicylaldehyde or substituted salicylaldehyde derivative is used as the electron donor. The catalyst is produced by introducing a pre-treated carrier (for example, silica), a metallic compound (for example, TiCl4) and the electron donor into a magnesium compound (for example, MgCl2)/tetrahydrofuran solution and then post-treating the resultant.

Chinese patent No. 200610026766.2 is similar to this patent, and relates to an organic compound containing a hetero atom and use thereof for producing a Zeigler-Natta catalyst.

As can be seen from aforesaid, the prior art supported nonmetallocene catalyst suffers from low olefin polymerization activity, and there is no an easy way to adjust same. If one tries to increase the activity, he has to significantly increase the amount of the co-catalyst to be used, which is undesirable. Further, the polymer product (for example, polyethylene) produced by using the prior art catalyst suffers from low bulk density and poor polymer morphology. Still further, the prior art supported nonmetallocene catalyst suffers from unstable performance in polymerization.

Therefore, there still exists a need for a supported nonmetallocene catalyst, which can be produced in a simple way and in an industrial scale, free of the problems associated with the prior art catalyst.

SUMMARY OF THE INVENTION

Therefore, an object of the present invention is to provide a supported nonmetallocene catalyst on the basis of the prior art, which is prepared by directly reacting a nonmetallocene ligand with a transition metal compound on a carrier through an in-situ supporting process. During its preparation, no proton acceptor and electron donor are needed, without the need of severe reaction requirements and reaction conditions. For these reasons, the supported catalyst according to this invention is easy to be produced and suitable for production in an industrial scale.

Specifically, this invention relates to a process for producing a supported nonmetallocene catalyst, which comprises:
a treating step of treating a porous carrier with one of the two: a chemical treating agent and a nonmetallocene ligand, to obtain a modified porous carrier, wherein the chemical treating agent is selected from the group consisting of a Group IVB metal compound; and
a contacting step of contacting the modified porous carrier with the other of the two: the chemical treating agent and the nonmetallocene ligand, so as to obtain the supported nonmetallocene catalyst.

According to a further embodiment of this invention, prior to said treating step, the porous carrier is previously thermally activated and/or treated by a magnesium compound.

According to a preferred embodiment of this invention, the nonmetallocene ligand is selected from the group consisting of a compound having the following structure.

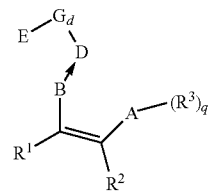

wherein:
q is 0 or 1;
d is 0 or 1;
A is selected from the group consisting of an oxygen atom, a sulfur atom, a selenium atom,

—NR$^{23}$R$^{24}$, —N(O)R$^{25}$R$^{26}$,

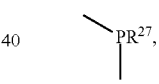

—PR$^{28}$R$^{29}$, —P(O)R$^{30}$OR$^-$, a sulfone group, a sulfoxide group or —Se(O)R$^{39}$;
B is selected from the group consisting of a nitrogen-containing group, a phosphor-containing group, or a C$_1$-C$_{30}$ hydrocarbyl;
D is selected from the group consisting of an oxygen atom, a sulfur atom, a selenium atom, a nitrogen-containing C$_1$-C$_{30}$ hydrocarbyl, a phosphor-containing C$_1$-C$_{30}$ hydrocarbyl, a sulfone group, a sulfoxide group,

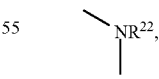

—N(O)R$^{25}$R$^{26}$,

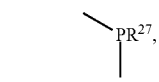

or —P(O)R$^{32}$(OR$^{33}$), wherein N, O, S, Se, and P each represent a coordination atom;

E is selected from the group consisting of a nitrogen-containing group, an oxygen-containing group, a sulfur-containing group, a selenium-containing group or a phosphor-containing group, wherein N, O, S, Se and P each represent a coordination atom;

G is selected from the group consisting of a $C_1$-$C_{30}$ hydrocarbyl, a substituted $C_1$-$C_{30}$ hydrocarbyl or an inert functional group;

→ represents a single bond or a double bond;
— represents a covalent bond or an ionic bond;

$R^1$ to $R^3$, $R^{22}$ to $R^{33}$, and $R^{39}$ are each independently selected from the group consisting of hydrogen, a $C_1$-$C_{30}$ hydrocarbyl, a halogen atom, a substituted $C_1$-$C_{30}$ hydrocarbyl or an inert functional group, wherein these groups could be identical to or different with each other, and any adjacent groups could form a bond or a ring together.

According to this invention, the nonmetallocene ligand is preferably selected from the group consisting of the following compounds.

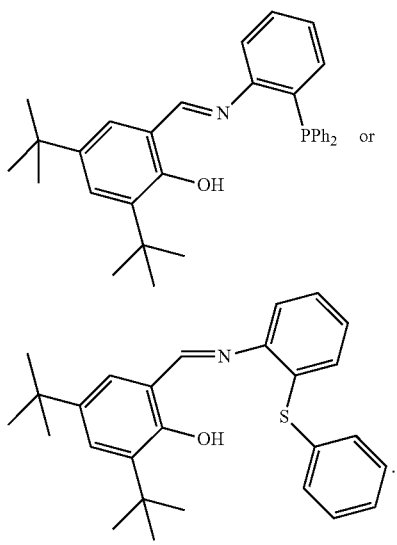

This invention further relates to a supported nonmetallocene catalyst thus produced.

EFFECT OF THE INVENTION

The process for producing the supported nonmetallocene catalyst according to this invention is simple and feasible, and it is easy to adjust the load of the nonmetallocene ligand on the porous carrier, and therefore it is possible to significantly increase the load.

Further, by using different amounts of the chemical treating agent, it is possible to freely adjust the polymerization activity of the obtained supported nonmetallocene catalyst as needed, from low to high, thereby adapting same for different olefin polymerization requirements.

According to the process of this invention, the nonmetallocene ligand and the porous carrier bond firmly, so as to significantly decrease the influence of any un-bonded ligand on the polymerization performance of the supported nonmetallocene catalyst, whereby rendering the performance of said catalyst more stable and reliable.

When a catalyst system is constituted by using the catalyst according to this invention in combination with a co-catalyst (for example, methyl aluminoxane or triethyl aluminum), only a comparatively small amount of the co-catalyst is needed to achieve a comparatively high polymerization activity. Further, the polymer product (for example, polyethylene) obtained therewith boasts desirable polymer morphology and high bulk density.

DETAILED DESCRIPTION OF THE INVENTION

In the first place, this invention relates to a process for producing a supported nonmetallocene catalyst, which comprises:

a treating step of treating a porous carrier with one of the two: a chemical treating agent and a nonmetallocene ligand, to obtain a modified porous carrier, wherein the chemical treating agent is selected from the group consisting of a Group IVB metal compound; and a contacting step of contacting the modified porous carrier with the other of the two: the chemical treating agent and the nonmetallocene ligand, so as to obtain the supported nonmetallocene catalyst.

The porous carrier to be used with this invention is not specifically limited, which could be any porous solid having a functional group on its surface. It could be one or more selected from the group consisting of an organic material containing an organo-functional group on its surface and an inorganic material containing a functional group on its surface.

The organic material could be selected from the group consisting of polyethylene, polypropylene, polybutene, poly vinylalcohol, cyclodextrin, and any copolymer derived from two or more of the monomers consisting of the aforementioned polymers, polyester, polyamide, polyvinyl chloride, polyacrylate, polymethacrylate, polystyrene, and a partly cross-linked polymer, with the organo-functional group being selected from the group consisting of a hydroxy group, a primary amino group, a secondary amino group, a sulfonic group, a carboxy group, an amido group, a N-mono substituted amido group, a sulfonamido group, a N-mono substituted sulfonamido group, a mercapto group, an imido group or a hydrazide group. Preferred is a partly cross-linked styrene polymer having a carboxy group on its surface.

The inorganic material could be selected from the group consisting of an oxide of one or more metal elements selected from the group consisting of the Group IIA, the Group IIIA, the Group IVA and the Group IVB in the Periodic Table of Elements, such as silica (also known as silicon dioxide or silica gel), alumina, magnesium oxide, titanium oxide, zirconia, thorium oxide, a combination thereof, or a composite oxide of two or more of these metals, a halide thereof (for example, magnesium chloride), an oxide prepared by pyrohydrolysis of a gaseous metal halide or a gaseous silicon compound (for example, silica gel obtained by pyrohydrolysis of SiCl4, or alumina obtained by pyrohydrolysis of AlCl3, and the like), clay, a molecular sieve, mica, montmorillonite, bentonite, kieselguhr, ZSM-5, MCM-41, and the like, with the functional group on its surface being selected from the group consisting of a hydroxy group and a carboxy group. Preferred is an inorganic material having a hydroxy group on its surface, for example, silica, alumina, magnesium oxide, titanium dioxide, a molecular sieve, montmorillonite and the like, or a composite oxide derived from silica and an oxide of the Group IIA or IIIA metals, for example, silica-alumina composite oxide or silica-magnesium-oxide composite oxide, most preferably silica.

According to this invention, the silica can be produced in a conventional way or can be commercially purchased as, for example, Grace 955, Grace 948, Grace SP9-351, Grace SP9-

485, Grace SP9-10046, and Daysion Syloid 245 (all from the Grace company), ES70, ES70X, ES70Y, ES70W, ES757, EP10X, and EP11 (all from the Ineos company), Aerosil 812, and CS-2133 and MS-3040 (all from PQ company).

According to this invention, there is no limitation to the surface area (measured by a BET method) of the porous carrier, which is usually of 10 to 1000 m$^2$/g, more preferably 100 to 600 m$^2$/g. The pore volume (measured by a nitrogen adsorption method) of the porous carrier is preferably 0.1 to 4 cm$^3$/g, more preferably 0.2 to 2 cm$^3$/g. The average particle diameter (measured by a laser particle size analyzer) of the porous carrier is preferably 1 to 500 urn, more preferably 1 to 100 µm.

According to this invention, the porous carrier could be in any form, such as particulate, sphere, agglomerate, etc.

According to a preferred embodiment of this invention, in order to reduce any detrimental influence of any free group (for example, a hydroxy group or a carboxy group) present on the surface of the inorganic porous carrier on the subsequent contacting step involving the nonmetallocene ligand, or to control the amount of such group so as for a predetermined load of the nonmetallocene ligand on the porous carrier, and to uniform the distribution of such free group on the surface of the porous carrier, it is preferably to thermally activate the inorganic porous carrier before use. The thermal activation could be conducted in a conventional way. For example, the inorganic porous carrier could be thermally treated under reduced pressure or in an inert gas (for example, nitrogen gas or rare gas) atmosphere. In this specification, by an inert gas atmosphere, it means an atmosphere containing only a minimum amount of or no component that would react with the porous carrier. The conditions for conducting the thermal activation could be, a heating temperature ranging from 200° C. to 800° C., preferable from 400° C. to 700° C., most preferably from 400° C. to 650° C.; a heating duration of 0.5 to 24 hours, preferably 2 to 12 hours, most preferably 4 to 8 hours. According to this invention, the activation procedure is preferably conducted under a nitrogen or argon atmosphere, preferably under the nitrogen atmosphere. It is well known for a person skilled in the art that the thermally activated porous carrier is usually stored in an inert gas atmosphere before use.

According to this invention, it is preferably to thermally activate the organic porous carrier before use as well. The main object of this thermal activation is to remove any water adsorbed on the surface of the organic porous carrier. Due to the poor heat resistance of said organic porous carrier, it is necessary for the thermal activation not to destroy the basic structure and composition of the organic porous carrier. The thermal activation could be conducted in a conventional way. For example, the organic porous carrier could be thermally treated under reduced pressure or in an inert gas (for example, nitrogen gas or rare gas) atmosphere. In this specification, by an inert gas atmosphere, it means an atmosphere containing only a minimum amount of or no component that would react with the porous carrier. The conditions for conducting the thermal activation could be, a heating temperature ranging from 50° C. to 400° C., preferable from 100° C. to 250° C.; a heating duration of 1 to 24 hours, preferably 2 to 12 hours. According to this invention, the activation procedure is preferably conducted under a nitrogen or argon atmosphere, preferably under the nitrogen atmosphere. It is well known for a person skilled in the art that the thermally activated porous carrier is usually stored in an inert gas atmosphere before use.

According to a preferred embodiment of this invention, prior to the treating step, preferably after the thermal activation, it is preferably for the porous carrier to be subjected to a magnesium compound-treating step.

The magnesium compound-treating step comprises,
a step of dissolving a magnesium compound in a mixed solvent consisting of tetrahydrofuran and an alcohol, to obtain a magnesium compound solution,
a step of mixing a porous carrier (with or without the thermal activation) with the magnesium compound solution, to obtain a slurry; and
a step of drying said slurry (hereinafter referred to a slurry-drying process), or adding a precipitating agent to said slurry to precipitate same (hereinafter referred to a slurry-precipitating process), so as to treat said porous carrier with said magnesium compound, i.e., to obtain a Mg-treated porous carrier (hereinafter also referred as porous carrier sometimes).

First of all, the step of obtaining the magnesium compound solution is detailedly described as follows.

According to one embodiment of this invention, the magnesium compound is selected from the group consisting of a magnesium halide, an alkoxy magnesium halide, an alkoxy magnesium, an alkyl magnesium, an alkyl magnesium halide, an alkyl alkoxy magnesium or a mixture thereof.

Specifically, the magnesium halide for example, could be selected from the group consisting of magnesium chloride (MgCl$_2$), magnesium bromide (MgBr$_2$), magnesium iodide (MgI$_2$) and magnesium fluoride (MgF$_2$), etc., preferably magnesium chloride.

The alkoxy magnesium halide for example, could be selected from the group consisting of methoxy magnesium chloride (Mg(OCH$_3$)Cl), ethoxy magnesium chloride (Mg(OC$_2$H$_5$)Cl), propoxy magnesium chloride (Mg(OC$_3$H$_7$)Cl), n-butoxy magnesium chloride (Mg(OC$_4$H$_9$)Cl), isobutoxy magnesium chloride (Mg(i-OC$_4$H$_9$)Cl), methoxy magnesium bromide (Mg(OCH$_3$)Br), ethoxy magnesium bromide (Mg(OC$_2$H$_5$)Br), propoxy magnesium bromide (Mg(OC$_3$H$_7$)Br), n-butoxy magnesium bromide (Mg(OC$_4$H$_9$)Br), isobutoxy magnesium bromide (Mg(i-OC$_4$H$_9$)Br), methoxy magnesium iodide (Mg(OCH$_3$)I), ethoxy magnesium iodide (Mg(OC$_2$H$_5$)I), propoxy magnesium iodide (Mg(OC$_3$H$_7$)I), n-butoxy magnesium iodide (Mg(OC$_4$H$_9$)I) and isobutoxy magnesium iodide (Mg(i-OC$_4$H$_9$)I), etc., preferably methoxy magnesium chloride, ethoxy magnesium chloride and isobutoxy magnesium chloride.

The alkoxy magnesium for example, could be selected from the group consisting of methoxy magnesium (Mg(OCH$_3$)$_2$), ethoxy magnesium (Mg(OC$_2$H$_5$)$_2$), propoxy magnesium (Mg(OC$_3$H$_7$)$_2$), butoxy magnesium (Mg(OC$_4$H$_9$)$_2$), isobutoxy magnesium (Mg(i-OC$_4$H$_9$)$_2$) and 2-ethyl hexyloxy magnesium (Mg(OCH$_2$CH(C$_2$H$_5$)C$_4$H$_9$)$_2$), etc., preferably ethoxy magnesium and isobutoxy magnesium.

The alkyl magnesium for example, could be selected from the group consisting of methyl magnesium (Mg(CH$_3$)$_2$), ethyl magnesium (Mg(C$_2$H$_5$)$_2$), propyl magnesium (Mg(C3H$_7$)$_2$), n-butyl magnesium (Mg(C$_4$H$_9$)$_2$) and isobutyl magnesium (Mg(i-C$_4$H$_9$)$_2$), etc., preferably ethyl magnesium and n-butyl magnesium.

The alkyl magnesium halide for example, could be selected from the group consisting of methyl magnesium chloride (Mg(CH$_3$)Cl), ethyl magnesium chloride (Mg(C$_2$H$_5$)Cl), propyl magnesium chloride (Mg(C$_3$H$_7$)Cl), n-butyl magnesium chloride (Mg(C$_4$H$_9$)Cl), isobutyl magnesium chloride (Mg(i-C$_4$H$_9$)Cl), methyl magnesium bromide (Mg(CH$_3$)Br), ethyl magnesium bromide (Mg(C$_2$H$_5$)Br), propyl magnesium bromide (Mg(C$_3$H$_7$)Br), n-butyl magnesium bromide (Mg(C$_4$H$_9$)Br), isobutyl magnesium bromide (Mg(i-C$_4$H$_9$)Br), methyl magnesium iodide (Mg(CH$_3$)I), ethyl magnesium iodide (Mg($C_2H_5$)I), propyl magnesium iodide (Mg($C_3H_7$)I), n-butyl magnesium iodide (Mg($C_4H_9$)I) and isobutyl magnesium iodide (Mg(i-$C_4H_9$)I), etc., preferably methyl magnesium chloride, ethyl magnesium chloride and isobutyl magnesium chloride.

The alkyl alkoxy magnesium for example, could be selected from the group consisting of methyl methoxy magnesium (Mg(OCH$_3$)(CH$_3$)), methyl ethoxy magnesium (Mg(O$C_2H_5$)(CH$_3$)), methyl propoxy magnesium (Mg(O$C_3H_7$)(CH$_3$)), methyl n-butoxy magnesium (Mg(O$C_4H_9$)(CH$_3$)), methyl isobutoxy magnesium (Mg(i-O$C_4H_9$)(CH$_3$)), ethyl methoxy magnesium (Mg(OCH$_3$)($C_2H_5$)), ethyl ethoxy magnesium (Mg(O$C_2H_5$)($C_2H_5$)), ethyl propoxy magnesium (Mg(O$C_3H_7$)($C_2H_5$)), ethyl n-butoxy magnesium (Mg(O$C_4H_9$)($C_2H_5$)), ethyl isobutoxy magnesium (Mg(i-O$C_4H_9$)($C_2H_5$)), propyl methoxy magnesium (Mg(OCH$_3$)($C_3H_7$)), propyl ethoxy magnesium (Mg(O$C_2H_5$)($C_3H_7$)), propyl propoxy magnesium (Mg(O$C_3H_7$)($C_3H_7$)), propyl n-butoxy magnesium (Mg(O$C_4H_9$)($C_3H_7$)), propyl isobutoxy magnesium (Mg(i-O$C_4H_9$)($C_3H_7$)), n-butyl methoxy magnesium (Mg(OCH$_3$)($C_4H_9$)), n-butyl ethoxy magnesium (Mg(O$C_2H_5$)($C_4H_9$)), n-butyl propoxy magnesium (Mg(O$C_3H_7$)($C_4H_9$)), n-butyl n-butoxy magnesium (Mg(O$C_4H_9$)($C_4H_9$)), n-butyl isobutoxy magnesium (Mg(i-O$C_4H_9$)($C_4H_9$)), isobutyl methoxy magnesium (Mg(OCH$_3$)(i-$C_4H_9$)), isobutyl ethoxy magnesium (Mg(O$C_2H_5$)(i-$C_4H_9$)), isobutyl propoxy magnesium (Mg(O$C_3H_7$)(i-$C_4H_9$)), isobutyl n-butoxy magnesium (Mg(O$C_4H_9$)(i-$C_4H_9$)) and isobutyl isobutoxy magnesium (Mg(i-O$C_4H_9$)(i-$C_4H_9$)), etc., preferably butyl ethoxy magnesium.

The magnesium compounds could be used with one kind or as a mixture of two or more kinds, without any limitation thereto. For example, if more than one magnesium compounds are used as a mixture, the ratio by molar of one magnesium compound to another magnesium compound in the mixture could be, for example, 0.25 to 4, preferably 0.5 to 3, most preferably 1 to 2.

The duration for dissolving the magnesium compound in preparation of the magnesium compound solution is not specifically limited, usually 0.5 to 24 hours. It is known that in case the dissolution is conducted at a comparatively low temperature, a comparatively long duration should be required, and in case the dissolution is conducted at a comparatively high temperature, a comparatively short duration should be required. For example, when the dissolution is conducted at a temperature of 5° C. below the boiling point of the mixed solvent, the duration for dissolution is usually 0.5 to 4 hours; when the dissolution is conducted at a temperature of 20° C., the duration could be 4 to 24 hours. During preparation of the magnesium compound solution, any stirring means for example, a stirring paddle (whose rotational speed could be 10 to 1000 r/min), could be used to facilitate dissolution of the magnesium compound in the mixed solvent.

In the step for preparing the magnesium compound solution, the alcohol to be used could be one or more selected from the group consisting of an aliphatic alcohol, an aromatic alcohol and an alicyclic alcohol, wherein the alcohol could be optionally substituted by a substituent selected from the group consisting of an alkyl group, a halogen atom and an alkoxy group. The aliphatic alcohol is preferred.

For example, the aliphatic alcohol could be selected from the group consisting of methanol, ethanol, propanol, 2-propanol, butanol, pentanol, 2-methyl pentanol, 2-ethyl pentanol, 2-hexyl butanol, hexanol, 2-ethyl hexanol and the like, preferably ethanol, butanol and 2-ethyl hexanol. The aromatic alcohol could be selected from the group consisting of benzyl alcohol, benzene ethanol and methyl benzyl alcohol and the like, preferably benzene ethanol. The alicyclic alcohol could be selected from the group consisting of cyclo hexanol, cyclo pentanol and cyclo octanol and the like, preferably cyclo hexanol. The alkyl-substituted alcohol could be for example, methyl cyclo pentanol, ethyl cyclo pentanol, propyl cyclo pentanol, methyl cyclo hexanol, ethyl cyclo hexanol, propyl cyclo hexanol, methyl cyclo octanol, ethyl cyclo octanol and propyl cyclo octanol and the like, preferably methyl hexanol. The halogen atom-substituted alcohol could be for example, trichloro methanol, trichloro ethanol and trichloro hexanol and the like, preferably trichloro methanol. The alkoxy-substituted alcohol could be for example, ethylene glycol ethyl ether, ethylene glycol n-butyl ether and 1-butoxy-2-propanol and the like, preferably ethylene glycol ethyl ether. Among these alcohols, ethanol and butanol are more preferred.

The alcohols could be used with one kind or as a mixture of two or more kinds.

In preparation of the magnesium compound solution, the ratio by molar of the magnesium compound (based on Mg) to tetrahydrofuran could be 1 to 6-40, preferably 1 to 8-20, while the ratio by molar of the magnesium compound (based on Mg) to the alcohol could be 1 to 1-8, preferably 1 to 0.5-4.

By mixing said porous carrier with the thus obtained magnesium compound solution, a slurry is obtained.

According to this invention, mixing of the porous carrier (including the porous carrier as such or the thermally-activated porous carrier, preferably thermally-activated porous carrier) with the magnesium compound solution could be conducted by using any conventional process, without any limitation. For example, the mixing could last 0.1 to 8 hours, preferably 0.5 to 4 hours, most preferably 1 to 2 hours, while the temperature at which the mixing is conducted could be that at which the magnesium compound is dissolved. During the mixing, stirring means could be used to facilitate the mixing. Any form of stirring means could be used, for example, a stirring paddle, whose rotational speed could be 10 to 1000 r/min.

During the mixing, the ratio by mass of said magnesium compound to said porous carrier could be 1 to 0.5-4, preferably 1 to 1-2.

By drying said slurry, or by introducing a precipitating agent into said slurry for precipitating same, a Mg-treated porous carrier could be obtained.

First of all, the process for obtaining the Mg-treated porous carrier by drying is detailedly described as follows.

The slurry, which is a semi-dry mass, and contains no any free liquid, could be directly thermally dried after stirred thoroughly, and a solid material having good fluidity is obtained, which corresponds to the Mg-treated porous carrier according to this invention. Though it is not always the case, it is preferably for the slurry to stand in a sealed container for a determined duration before drying, so as to secure uniformity of the mass, wherein the duration could be 2 to 48 hours, preferably 4 to 24 hours, most preferably 6 to 18 hours.

There is no limitation as to the temperature at which the slurry is dried, and a person skilled in the art could determine as needed. As a rule, if the boiling point of the alcohol involved in the slurry is comparatively low, a accordingly comparatively low temperature is preferred, while if the boiling point is comparatively high, a accordingly comparatively high temperature is preferred. For example, if ethanol is used as the alcohol, the drying temperature could range from 40° C. to 120° C., and if butanol is used, the drying temperature could range from 60° C. to 140° C.

Then, the process for obtaining the Mg-treated porous carrier by introducing a precipitating agent into said slurry is detailedly described as follows.

In preparation of said Mg-treated porous carrier, the precipitating agent to be used could be any one that represents a bad solvent of the magnesium compound and a good solvent of the mixed solvent, which could be selected from the group consisting of one or more of an alkane, a cyclic alkane, a halogenated alkane and a halogenated cyclic alkane.

As the alkane, exemplified is pentane, hexane, heptane, octane, nonane and decane, and the like, preferably hexane, heptane and decane, most preferably hexane.

As the cyclic alkane, exemplified is cyclohexane, cyclo pentane, cyclo heptane, cyclo decane, cyclo nonane, and the like, preferably cyclo hexane.

As the halogenated alkane, exemplified is dichloro methane, dichloro hexane, dichloro heptane, trichloro methane, trichloro ethane, trichloro butane, dibromo methane, dibromo ethane, dibromo heptane, tribromo methane, tribromo ethane, tribromo butane, and the like.

As the halogenated cyclic alkane, exemplified is chlorinated cyclo hexane, chlorinated cyclo pentane, chlorinated cyclo heptane, chlorinated cyclo decane, chlorinated cyclo nonane, chlorinated cyclo octane, brominated cyclo hexane, brominated cyclo pentane, brominated cyclo heptane, brominated cyclo decane, brominated cyclo nonane, brominated cyclo octane, and the like.

The precipitating agent could be used with one kind or as a mixture of two or more kinds.

There is no limitation as to the amount of the precipitating agent to be used, however, the ratio by volume of the precipitating agent to tetrahydrofuran is usually 1 to 0.25-4, preferably 1 to 0.5-2.

There is no limitation as to the temperature at which the precipitating agent is, however, preferably at the room temperature. Further, the precipitation is preferably conducted after the slurry has cooled down to the room temperature.

The precipitating agent could be added all at once or dropwise to the slurry, preferably all at once. During the precipitation, any stirring means could be used to facilitate uniform dispersion of the precipitating agent throughout the slurry, and eventually facilitate precipitation of the solid. The stirring means could be in any form, for example, as a stirring paddle, whose rotational speed could be 10 to 1000 r/min.

After precipitation, the thus obtained precipitate is filtered, washed and dried, so as to obtain the Mg-treated porous carrier according to this invention. Herein, the washing solvent could be the same as or different from that as the precipitating agent.

There is no special limitation as to the aforesaid filtration, washing and drying process, which could be determined by a person skilled in the art as needed.

The porous carrier according to this invention (preferably one after thermally-activated, or one after Mg-treated, or more preferably, one after thermally-activated and then Mg-treated) could be used directly for conducting the treating step, however, in a preferred embodiment, prior to the treating step, the porous carrier (the term "porous carrier" hereinafter refers to the porous carrier as such, the thermally-activated porous carrier, the Mg-treated porous carrier, or the thermally-activated and then Mg-treated porous carrier) could be pre-treated by an assistant chemical treating agent selected from the group consisting of an aluminoxane, an alkylaluminum, or a combination thereof (hereinafter referred as the pre-treating step).

In the context of this invention, the term "porous carrier as such" refers to a porous carrier that has not been subjected to any treatment mentioned in this invention.

As the aluminoxane, exemplified is a linear aluminoxane $R_2Al—(Al(R)—O)_n—O—AlR_2$ having the following formula (I), and a cyclic aluminoxane $(Al(R)—O—)_{n+2}$ having the following formula (II).

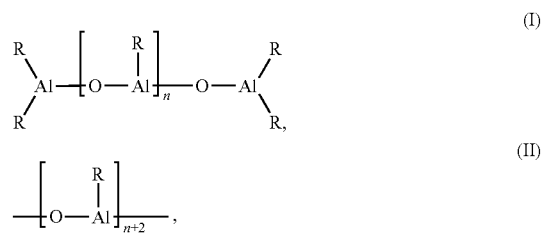

wherein R is each independently identical or different, preferably identical, and could be each independently selected from the group consisting of a $C_1$-$C_8$ alkyl, preferably methyl, ethyl, and iso-butyl, most preferably methyl, n is an integer of 1 to 50, preferably 10 to 30.

Specifically, the aluminoxane could be preferably selected from the group consisting of methyl aluminoxane, ethyl aluminoxane, isobutyl aluminoxane and butyl aluminoxane, preferably methyl aluminoxane (MAO) and isobutyl aluminoxane (IBAO).

The aluminoxane could be used with one kind or as a mixture of two or more kinds.

The alkylaluminum is a compound having a general formula (III) as follows:

$$Al(R)_3 \qquad (III)$$

wherein R could be each independently identical or different, preferably identical, and could be each independently selected from the group consisting of a $C_1$-$C_8$ alkyl, preferably methyl, ethyl and iso-butyl, most preferably methyl.

Specifically, the alkylaluminum could be selected from the group consisting of trimethyl aluminum ($Al(CH_3)_3$), triethyl aluminum ($Al(CH_3CH_2)_3$), tripropyl aluminum ($Al(C_3H_7)_3$), triisobutyl aluminum ($Al(i\text{-}C_4H_9)_3$), tri-n-butyl aluminum ($Al(C_4H_9)_3$), triisoamyl aluminum ($Al(i\text{-}C_5H_{11})_3$), tri-n-amyl aluminum ($Al(C_5H_{11})_3$), trihexyl aluminum ($Al(C_6H_{13})_3$), tri-iso-hexyl aluminum ($Al(i\text{-}C_6H_{13})_3$), diethyl methyl aluminum ($Al(CH_3)(CH_3CH_2)_2$) and ethyl dimethyl aluminum ($Al(CH_3CH_2)(CH_3)_2$), and the like, wherein preference is given to trimethyl aluminum, triethyl aluminum, triisobutyl aluminum and tripropyl aluminum, most preferably triethyl aluminum and triisobutyl aluminum.

The alkylaluminum could be used with one kind or as a mixture of two or more kinds.

According to this invention, as the assistant chemical treating agent, used could be only the alkylaluminum or only the aluminoxane, or a mixture of the alkylaluminum and the aluminoxane. There is no limitation as to the ratio of the alkylaluminum and the aluminoxane in the combination, which could be determined by a person skilled in the art as needed.

In the pre-treating step, the ratio of the assistant chemical treating agent (based on Al) to the porous carrier (specifically, the Mg-treated porous carrier, if same is used herein) could be 0.25-4 mmol to 1 g, preferably 0.5-2 mmol to 1 g.

To conduct said pre-treating step, any process could be used, for example, as follows.

Firstly, a solution of said assistant chemical treating agent in a solvent is prepared, then the solution (containing a predetermined amount of the assistant chemical treating agent) is added to the porous carrier at a temperature ranging from the room temperature to that below the boiling point of the solvent in the solution. The treating reaction continues for 0.5 to 6 hours (accompanied by any stirring means, if necessary), a mixture mass containing the pre-treated porous carrier is obtained. The pre-treated porous carrier could be separated from the thus obtained mixture mass by filtration and washing (1 to 6 times, preferably 1 to 3 times), and preferably by drying, however, it is also acceptable to directly use the mixture mass in the next procedure without separation of the pre-treated porous carrier therefrom.

To prepare the solution of the assistant chemical treating agent, there is no limitation as to the solvent to be used, as long as the solvent can dissolve the assistant chemical treating agent. For example, exemplified is a C5 to C12 alkane or a halogenated C5 to C12 alkane, a C6 to C12 aromatic hydrocarbon, or a halogenated C6 to C12 aromatic hydrocarbon, and the like, preferably pentane, hexane, heptane, octane, nonane, decane, undecane, dodecane, cyclo hexane, toluene, ethyl benzene, xylene, chlorinated pentane, chlorinated hexane, chlorinated heptane, chlorinated octane, chlorinated nonane, chlorinated decane, chlorinated undecane, chlorinated dodecane, chlorinated cyclo hexane, chlorinated toluene, chlorinated ethyl benzene, chlorinated xylene, and the like, more preferably pentane, hexane, decane, cyclo hexane, and toluene, most preferably hexane and toluene.

It should be noted that since the Mg-treated porous carrier according to this invention contains the magnesium compound, any solvent (for example, an ether type solvent, or specifically, tetrahydrofuran) that can dissolve said magnesium compound can not be used in any process or procedure in which the Mg-treated porous carrier is involved.

The solvent could be used with one kind or as a mixture of two or more kinds.

Further, there is no limitation as to the concentration of the assistant chemical treating agent in the solution, which could be determined by a person skilled in the art as needed, as long as it is sufficient for the solution to deliver the predetermined amount of the assistant chemical treating agent to treat the porous carrier.

As mentioned aforesaid, the porous carrier according to this invention could be used directly in the treating step, and also, could be used in the treating step after pre-treated as aforesaid.

According to this invention, to conduct said treating step, one of the two: the chemical treating agent and the nonmetallocene ligand, is used to treat the porous carrier (the term "porous carrier" hereinafter is taken in its broadest sense, to refer to the porous carrier as such, the thermally-activated porous carrier, the Mg-treated porous carrier, the thermally-activated and then Mg-treated porous carrier, or further, a pre-treated version thereof as aforesaid, unless otherwise specifically indicated), so as to obtain the modified porous carrier.

In the first place, treatment of said porous carrier with the chemical treating agent is detailedly discussed as follows.

According to this invention, the chemical treating agent could be selected from the group consisting of a Group IVB metal compound. As said Group IVB metal compound, exemplified is a Group IVB metal halide, a Group IVB metal alkylate, a Group IVB metal alkoxylate, a Group IVB metal alkyl halide, and a Group IVB metal alkoxy halide.

As the Group IVB metal halide, the Group IVB metal alkylate, the Group IVB metal alkoxylate, the Group IVB metal alkyl halide and the Group IVB metal alkoxy halide, exemplified is a compound having the following general formula (IV).

$$M(OR^1)_m X_n R^2_{4-m-n} \qquad (IV)$$

wherein, m is 0, 1, 2, 3, or 4, n is 0, 1, 2, 3, or 4,

M is a Group IVB metal, for example, titanium, zirconium, hafnium and the like,

X is a halogen atom, for example, F, Cl, Br, and I, $R^1$ and $R^2$ are each independently selected from the group consisting of a $C_1$-$C_{30}$ alkyl, for example, methyl, ethyl, propyl, n-butyl, isobutyl and the like, $R^1$ and $R^2$ could be each independently identical or different.

Specifically, said Group IVB metal halide could use for example, titanium tetrafluoride ($TiF_4$), titanium tetrachloride ($TiCl_4$), titanium tetrabromide ($TiBr_4$), titanium tetraiodide ($TiI_4$), zirconium tetrafluoride ($ZrF_4$), zirconium tetrachloride ($ZrCl_4$), zirconium tetrabromide ($ZrBr_4$), zirconium tetraiodide ($ZrI_4$), hafnium tetrafluoride ($HfF_4$), hafnium tetrachloride ($HfCl_4$), hafnium tetrabromide ($HfBr_4$), hafnium tetraiodide ($HfI_4$).

said Group IVB metal alkylate could use for example, tetramethyl titanium ($Ti(CH_3)_4$), tetraethyl titanium ($Ti(CH_3CH_2)_4$), tetraisobutyl titanium ($Ti(i-C_4H_9)_4$), tetra-n-butyl titanium ($Ti(C_4H_9)_4$), triethylmethyl titanium ($Ti(CH_3)(CH_3CH_2)_3$), diethyldimethyl titanium ($Ti(CH_3)_2(CH_3CH_2)_2$), trimethylethyl titanium ($Ti(CH_3)_3(CH_3CH_2)$), triisobutylmethyl titanium ($Ti(CH_3)(i-C_4H_9)_3$), diisobutyldimethyl titanium ($Ti(CH_3)_2(i-C_4H_9)_2$), trimethylisobutyl titanium ($Ti(CH_3)_3(i-C_4H_9)$), triisobutylethyl titanium ($Ti(CH_3CH_2)(i-C_4H_9)_3$), diisobutyldiethyl titanium ($Ti(CH_3CH_2)_2(i-C_4H_9)_2$), triethylisobutyl titanium ($Ti(CH_3CH_2)_3(i-C_4H_9)$), tri-n-butylmethyl titanium ($Ti(CH_3)(C_4H_9)_3$), di-n-butyldimethyl titanium ($Ti(CH_3)_2(C_4H_9)_2$), trimethyl n-butyl titanium ($Ti(CH_3)_3(C_4H_9)$), tri-n-butylmethyl titanium ($Ti(CH_3CH_2)(C_4H_9)_3$), di-n-butyldiethyl titanium ($Ti(CH_3CH_2)_2(C_4H_9)_2$), triethyl n-butyl titanium ($Ti(CH_3CH_2)_3(C_4H_9)$) and the like, tetramethyl zirconium ($Zr(CH_3)_4$), tetraethyl zirconium ($Zr(CH_3CH_2)_4$), tetraisobutyl zirconium ($Zr(i-C_4H_9)_4$), tetra-n-butyl zirconium ($Zr(C_4H_9)_4$), triethylmethyl zirconium ($Zr(CH_3)(CH_3CH_2)_3$), diethyldimethyl zirconium ($Zr(CH_3)_2(CH_3CH_2)_2$), trimethylethyl zirconium ($Zr(CH_3)_3(CH_3CH_2)$), triisobutylmethyl zirconium ($Zr(CH_3)(i-C_4H_9)_3$), diisobutyldimethyl zirconium ($Zr(CH_3)_2(i-C_4H_9)_2$), trimethylisobutyl zirconium ($Zr(CH_3)_3(i-C_4H_9)$), triisobutylethyl zirconium ($Zr(CH_3CH_2)(i-C_4H_9)_3$), diisobutyldiethyl zirconium ($Zr(CH_3CH_2)_2(i-C_4H_9)_2$), triethylisobutyl zirconium ($Zr(CH_3CH_2)_3(i-C_4H_9)$), tri-n-butylmethyl zirconium ($Zr(CH_3)(C_4H_9)_3$), di-n-butyldimethyl zirconium ($Zr(CH_3)_2(C_4H_9)_2$), trimethyl n-butyl zirconium ($Zr(CH_3)_3(C_4H_9)$), tri-n-butylmethyl zirconium ($Zr(CH_3CH_2)(C_4H_9)_3$), di-n-butyldiethyl zirconium ($Zr(CH_3CH_2)_2(C_4H_9)_2$), triethyl n-butyl zirconium ($Zr(CH_3CH_2)_3(C_4H_9)$) and the like, tetramethyl hafnium ($Hf(CH_3)_4$), tetraethyl hafnium ($Hf(CH_3CH_2)_4$), tetraisobutyl hafnium ($Hf(i-C_4H_9)_4$), tetra-n-butyl hafnium ($Hf(C_4H_9)_4$), triethylmethyl hafnium ($Hf(CH_3)(CH_3CH_2)_3$), diethyldimethyl hafnium ($Hf(CH_3)_2(CH_3CH_2)_2$), trimethylethyl hafnium ($Hf(CH_3)_3(CH_3CH_2)$), triisobutylmethyl hafnium ($Hf(CH_3)(i-C_4H_9)_3$), diisobutyldimethyl hafnium ($Hf(CH_3)_2(i-C_4H_9)_2$), trimethylisobutyl hafnium ($Hf(CH_3)_3(i-C_4H_9)$), triisobutylethyl hafnium ($Hf(CH_3CH_2)(i-C_4H_9)_3$), diisobutyldiethyl hafnium ($Hf(CH_3CH_2)_2(i-C_4H_9)_2$), triethylisobutyl hafnium ($Hf(CH_3CH_2)_3(i-C_4H_9)$), tri-n-butylmethyl hafnium ($Hf(CH_3)$ ($C_4H_9)_3$), di-n-butyldimethyl hafnium (Hf($CH_3)_2(C_4H_9)_2$), trimethyl n-butyl hafnium (Hf($CH_3)_3(C_4H_9)$), tri-n-butylmethyl hafnium (Hf($CH_3CH_2)(C_4H_9)_3$), di-n-butyldiethyl hafnium (Hf($CH_3CH_2)_2(C_4H_9)_2$), triethyl n-butyl hafnium (Hf($CH_3CH_2)_3(C_4H_9)$)) and the like.

Said Group IVB metal alkoxylate could use for example, tetramethoxy titanium (Ti($OCH_3)_4$), tetraethoxy titanium (Ti($OCH_3CH_2)_4$), tetraisobutoxy titanium (Ti(i-$OC_4H_9)_4$), tetra-n-butoxy titanium (Ti($OC_4H_9)_4$), triethoxymethoxy titanium (Ti($OCH_3)(OCH_3CH_2)_3$), diethoxydimethoxy titanium (Ti($OCH_3)_2(OCH_3CH_2)_2$), trimethoxyethoxy titanium (Ti($OCH_3)_3(OCH_3CH_2)$), triisobutoxymethoxy titanium (Ti($OCH_3)(i-OC_4H_9)_3$), diisobutoxydimethoxy titanium (Ti($OCH_3)_2(i-OC_4H_9)_2$), trimethoxyisobutoxy titanium (Ti($OCH_3)_3(i-OC_4H_9)$), triisobutoxyethoxy titanium (Ti($OCH_3CH_2)(i-OC_4H_9)_3$), diisobutoxydiethoxy titanium (Ti($OCH_3CH_2)_2(i-OC_4H_9)_2$), triethoxyisobutoxy titanium (Ti($OCH_3CH_2)_3(i-OC_4H_9)$), tri-n-butoxymethoxy titanium (Ti($OCH_3)(OC_4H_9)_3$), di-n-butoxydimethoxy titanium (Ti($OCH_3)_2(OC_4H_9)_2$), trimethoxy n-butoxy titanium (Ti($OCH_3)_3(OC_4H_9)$), tri-n-butoxymethoxy titanium (Ti($OCH_3CH_2)(OC_4H_9)_3$), di-n-butoxydiethoxy titanium (Ti($OCH_3CH_2)_2(OC_4H_9)_2$), triethoxy n-butoxy titanium (Ti($OCH_3CH_2)_3(OC_4H_9)$)) and the like, tetramethoxy zirconium (Zr($OCH_3)_4$), tetraethoxy zirconium (Zr($OCH_3CH_2)_4$), tetraisobutoxy zirconium (Zr(i-$OC_4H_9)_4$), tetra-n-butoxy zirconium (Zr($OC_4H_9)_4$), triethoxymethoxy zirconium (Zr($OCH_3)(OCH_3CH_2)_3$), diethoxydimethoxy zirconium (Zr($OCH_3)_2(OCH_3CH_2)_2$), trimethoxyethoxy zirconium (Zr($OCH_3)_3(OCH_3CH_2)$), triisobutoxymethoxy zirconium (Zr($OCH_3)(i-OC_4H_9)_3$), diisobutoxydimethoxy zirconium (Zr($OCH_3)_2(i-OC_4H_9)_2$), trimethoxyisobutoxy zirconium (Zr($OCH_3)_3(i-C_4H_9)$), triisobutoxyethoxy zirconium (Zr($OCH_3CH_2)(i-OC_4H_9)_3$), diisobutoxydiethoxy zirconium (Zr($OCH_3CH_2)_2(i-OC_4H_9)_2$), triethoxyisobutoxy zirconium (Zr($OCH_3CH_2)_3(i-OC_4H_9)$), tri-n-butoxymethoxy zirconium (Zr($OCH_3)(OC_4H_9)_3$), di-n-butoxydimethoxy zirconium (Zr($OCH_3)_2(OC_4H_9)_2$) trimethoxy n-butoxy zirconium (Zr($OCH_3)_3(OC_4H_9))_2$ tri-n-butoxymethoxy zirconium (Zr($OCH_3CH_2)(OC_4H_9)_3$), di-n-butoxydiethoxy zirconium (Zr($OCH_3CH_2)_2(OC_4H_9)_2$), triethoxy n-butoxy zirconium (Zr($OCH_3CH_2)_3(OC_4H_9)$)) and the like, tetramethoxy hafnium (Hf($OCH_3)_4$), tetraethoxy hafnium (Hf($OCH_3CH_2)_4$), tetraisobutoxy hafnium (Hf(i-$OC_4H_9)_4$), tetra-n-butoxy hafnium (Hf($OC_4H_9)_4$), triethoxymethoxy hafnium (Hf($OCH_3)(OCH_3CH_2)_3$), diethoxydimethoxy hafnium (Hf($OCH_3)_2(OCH_3CH_2)_2$), trimethoxyethoxy hafnium (Hf($OCH_3)_3(OCH_3CH_2)$), triisobutoxymethoxy hafnium (Hf($OCH_3)(i-OC_4H_9)_3$), diisobutoxydimethoxy hafnium (Hf($OCH_3)_2(i-OC_4H_9)_2$), trimethoxyisobutoxy hafnium (Hf($OCH_3)_3(i-OC_4H_9)$), triisobutoxyethoxy hafnium (Hf($OCH_3CH_2)(i-OC_4H_9)_3$), diisobutoxydiethoxy hafnium (Hf($OCH_3CH_2)_2(i-OC_4H_9)_2$), triethoxyisobutoxy hafnium (Hf($OCH_3CH_2)_3(i-C_4H_9)$), tri-n-butoxymethoxy hafnium (Hf($OCH_3)(OC_4H_9)_3$), di-n-butoxydimethoxy hafnium (Hf($OCH_3)_2(OC_4H_9)_2$), trimethoxy n-butoxy hafnium (Hf($OCH_3)_3(OC_4H_9)$), tri-n-butoxymethoxy hafnium (Hf($OCH_3CH_2)(OC_4H_9)_3$), di-n-butoxydiethoxy hafnium (Hf($OCH_3CH_2)_2(OC_4H_9)_2$), triethoxy n-butoxy hafnium (Hf($OCH_3CH_2)_3(OC_4H_9)$)) and the like.

Said Group IVB metal alkyl halide could use for example, trimethylchloro titanium (TiCl($CH_3)_3$), triethylchloro titanium (TiCl($CH_3CH_2)_3$), triisobutylchloro titanium (TiCl(i-$C_4H_9)_3$), tri-n-butylchloro titanium (TiCl($C_4H_9)_3$), dimethyldichloro titanium (TiCl$_2(CH_3)_2$), diethyldichloro titanium (TiCl$_2(CH_3CH_2)_2$), diisobutyldichloro titanium (TiCl$_2$(i-$C_4H_9)_2$), tri-n-butylchloro titanium (TiCl($C_4H_9)_3$), methyltrichloro titanium (Ti($CH_3)Cl_3$), ethyltrichloro titanium (Ti($CH_3CH_2)Cl_3$), isobutyltrichloro titanium (Ti(i-$C_4H_9)Cl_3$), n-butyltrichloro titanium (Ti($C_4H_9)Cl_3$), trimethylbromo titanium (TiBr($CH_3)_3$), triethylbromo titanium (TiBr($CH_3CH_2)_3$), triisobutylbromo titanium (TiBr(i-$C_4H_9)_3$), tri-n-butylbromo titanium (TiBr($C_4H_9)_3$), dimethyldibromo titanium (TiBr$_2(CH_3)_2$), diethyldibromo titanium (TiBr$_2(CH_3CH_2)_2$), diisobutyldibromo titanium (TiBr$_2$(i-$C_4H_9)_2$), tri-n-butylbromo titanium (TiBr($C_4H_9)_3$), methyl tribromo titanium (Ti($CH_3)Br_3$), ethyl tribromo titanium (Ti($CH_3CH_2)Br_3$), isobutyl tribromo titanium (Ti(i-$C_4H_9)Br_3$), n-butyl tribromo titanium (Ti($C_4H_9)Br_3$), trimethylchloro zirconium (ZrCl($CH_3)_3$), triethylchloro zirconium (ZrCl($CH_3CH_2)_3$), triisobutylchloro zirconium (ZrCl(i-$C_4H_9)_3$), tri-n-butylchloro zirconium (ZrCl($C_4H_9)_3$), dimethyldichloro zirconium (ZrCl$_2(CH_3)_2$), diethyldichloro zirconium (ZrCl$_2(CH_3CH_2)_2$), diisobutyldichloro zirconium (ZrCl$_2$(i-$C_4H_9)_2$), tri-n-butylchloro zirconium (ZrCl($C_4H_9)_3$), methyltrichloro zirconium (Zr($CH_3)Cl_3$), ethyltrichloro zirconium (Zr($CH_3CH_2)Cl_3$), isobutyltrichloro zirconium (Zr(i-$C_4H_9)Cl_3$), n-butyltrichloro zirconium (Zr($C_4H_9)Cl_3$), trimethylbromo zirconium (ZrBr($CH_3)_3$), triethylbromo zirconium (ZrBr($CH_3CH_2)_3$), triisobutylbromo zirconium (ZrBr(i-$C_4H_9)_3$), tri-n-butylbromo zirconium (ZrBr($C_4H_9)_3$), dimethyldibromo zirconium (ZrBr$_2(CH_3)_2$), diethyldibromo zirconium (ZrBr$_2(CH_3CH_2)_2$), diisobutyldibromo zirconium (ZrBr$_2$(i-$C_4H_9)_2$), tri-n-butylbromo zirconium (ZrBr($C_4H_9)_3$), methyl tribromo zirconium (Zr($CH_3)Br_3$), ethyl tribromo zirconium (Zr($CH_3CH_2)Br_3$), isobutyl tribromo zirconium (Zr(i-$C_4H_9)Br_3$), n-butyl tribromo zirconium (Zr($C_4H_9)Br_3$), trimethylchloro hafnium (HfCl($CH_3)_3$), triethylchloro hafnium (HfCl($CH_3CH_2)_3$), triisobutylchloro hafnium (HfCl(i-$C_4H_9)_3$), tri-n-butylchloro hafnium (HfCl($C_4H_9)_3$), dimethyldichloro hafnium (HfCl$_2(CH_3)_2$), diethyldichloro hafnium (HfCl$_2(CH_3CH_2)_2$), diisobutyldichloro hafnium (HfCl$_2$(i-$C_4H_9)_2$), tri-n-butylchloro hafnium (HfCl($C_4H_9)_3$), methyltrichloro hafnium (Hf($CH_3)Cl_3$), ethyltrichloro hafnium (Hf($CH_3CH_2)Cl_3$), isobutyltrichloro hafnium (Hf(i-$C_4H_9)Cl_3$), n-butyltrichloro hafnium (Hf($C_4H_9)Cl_3$), trimethylbromo hafnium (HfBr($CH_3)_3$), triethylbromo hafnium (HfBr($CH_3CH_2)_3$), triisobutylbromo hafnium (HfBr(i-$C_4H_9)_3$), tri-n-butylbromo hafnium (HfBr($C_4H_9)_3$), dimethyldibromo hafnium (HfBr$_2(CH_3)_2$), diethyldibromo hafnium (HfBr$_2(CH_3CH_2)_2$), diisobutyldibromo hafnium (HfBr$_2$(i-$C_4H_9)_2$), tri-n-butylbromo hafnium (HfBr($C_4H_9)_3$), methyl tribromo hafnium (Hf($CH_3)Br_3$), ethyl tribromo hafnium (Hf($CH_3CH_2)Br_3$), isobutyl tribromo hafnium (Hf(i-$C_4H_9)Br_3$), n-butyl tribromo hafnium (Hf($C_4H_9)Br_3$).

Said Group IVB metal alkoxy halide could use for example, trimethoxychloro titanium (TiCl($OCH_3)_3$), triethoxychloro titanium (TiCl($OCH_3CH_2)_3$), triisobutoxychloro titanium (TiCl(i-$OC_4H_9)_3$), tri-n-butoxychloro titanium (TiCl($OC_4H_9)_3$), dimethoxydichloro titanium (TiCl$_2(OCH_3)_2$), diethoxydichloro titanium (TiCl$_2(OCH_3CH_2)_2$), diisobutoxydichloro titanium (TiCl$_2$(i-$OC_4H_9)_2$), tri-n-butoxychloro titanium (TiCl($OC_4H_9)_3$), methoxytrichloro titanium (Ti($OCH_3)Cl_3$), ethoxytrichloro titanium (Ti($OCH_3CH_2)Cl_3$), isobutoxytrichloro titanium (Ti(i-$C_4H_9)Cl_3$), n-butoxytrichloro titanium (Ti($OC_4H_9)Cl_3$), trimethoxybromo titanium (TiBr($OCH_3)_3$), triethoxybromo titanium (TiBr($OCH_3CH_2)_3$), triisobutoxybromo titanium (TiBr(i-$OC_4H_9)_3$), tri-n-butoxybromo titanium (TiBr($OC_4H_9)_3$), dimethoxydibromo titanium (TiBr$_2(OCH_3)_2$), diethoxydibromo titanium (TiBr$_2(OCH_3CH_2)_2$), diisobutoxydibromo titanium (TiBr$_2$(i-OC$_4$H$_9$)$_2$), tri-n-butoxybromo titanium (TiBr(OC$_4$H$_9$)$_3$), methoxy tribromo titanium (Ti(OCH$_3$)Br$_3$), ethoxy tribromo titanium (Ti(OCH$_3$CH$_2$)Br$_3$), isobutoxy tribromo titanium (Ti(i-C$_4$H$_9$)Br$_3$), n-butoxy tribromo titanium (Ti(OC$_4$H$_9$)Br$_3$), trimethoxychloro zirconium (ZrCl(OCH$_3$)$_3$), triethoxychloro zirconium (ZrCl(OCH$_3$CH$_2$)$_3$), triisobutoxychloro zirconium (ZrCl(i-OC$_4$H$_9$)$_3$), tri-n-butoxychloro zirconium (ZrCl(OC$_4$H$_9$)$_3$), dimethoxydichloro zirconium (ZrCl$_2$(OCH$_3$)$_2$), diethoxydichloro zirconium (ZrCl$_2$(OCH$_3$CH$_2$)$_2$), diisobutoxydichloro zirconium (ZrCl$_2$(i-OC$_4$H$_9$)$_2$), tri-n-butoxychloro zirconium (ZrCl(OC$_4$H$_9$)$_3$), methoxytrichloro zirconium (Zr(OCH$_3$)Cl$_3$), ethoxytrichloro zirconium (Zr(OCH$_3$CH$_2$)Cl$_3$), isobutoxytrichloro zirconium (Zr(i-C$_4$H$_9$)Cl$_3$), n-butoxytrichloro zirconium (Zr(OC$_4$H$_9$)Cl$_3$), trimethoxybromo zirconium (ZrBr(OCH$_3$)$_3$), triethoxybromo zirconium (ZrBr(OCH$_3$CH$_2$)$_3$), triisobutoxybromo zirconium (ZrBr(i-OC$_4$H$_9$)$_3$), tri-n-butoxybromo zirconium (ZrBr(OC$_4$H$_9$)$_3$), dimethoxydibromo zirconium (ZrBr$_2$(OCH$_3$)$_2$), diethoxydibromo zirconium (ZrBr$_2$(OCH$_3$CH$_2$)$_2$), diisobutoxydibromo zirconium (ZrBr$_2$(i-OC$_4$H$_9$)$_2$), tri-n-butoxybromo zirconium (ZrBr(OC$_4$H$_9$)$_3$), methoxy tribromo zirconium (Zr(OCH$_3$)Br$_3$), ethoxy tribromo zirconium (Zr(OCH$_3$CH$_2$)Br$_3$), isobutoxy tribromo zirconium (Zr(i-C$_4$H$_9$)Br$_3$), n-butoxy tribromo zirconium (Zr(OC$_4$H$_9$)Br$_3$), trimethoxychloro hafnium (HfCl(OCH$_3$)$_3$), triethoxychloro hafnium (HfCl(OCH$_3$CH$_2$)$_3$), triisobutoxychloro hafnium (HfCl(i-OC$_4$H$_9$)$_3$), tri-n-butoxychloro hafnium (HfCl(OC$_4$H$_9$)$_3$), dimethoxydichloro hafnium (HfCl$_2$(OCH$_3$)$_2$), diethoxydichloro hafnium (HfCl$_2$(OCH$_3$CH$_2$)$_2$), diisobutoxydichloro hafnium (HfCl$_2$(i-OC$_4$H$_9$)$_2$), tri-n-butoxychloro hafnium (HfCl(OC$_4$H$_9$)$_3$), methoxytrichloro hafnium (Hf(OCH$_3$)Cl$_3$), ethoxytrichloro hafnium (Hf(OCH$_3$CH$_2$)Cl$_3$), isobutoxytrichloro hafnium (Hf(i-C$_4$H$_9$)Cl$_3$), n-butoxytrichloro hafnium (Hf(OC$_4$H$_9$)Cl$_3$), trimethoxybromo hafnium (HfBr(OCH$_3$)$_3$), triethoxybromo hafnium (HfBr(OCH$_3$CH$_2$)$_3$), triisobutoxybromo hafnium (HfBr(i-OC$_4$H$_9$)$_3$), tri-n-butoxybromo hafnium (HfBr(OC$_4$H$_9$)$_3$), dimethoxydibromo hafnium (HfBr$_2$(OCH$_3$)$_2$), diethoxydibromo hafnium (HfBr$_2$(OCH$_3$CH$_2$)$_2$), diisobutoxydibromo hafnium (HfBr$_2$(i-OC$_4$H$_9$)$_2$), tri-n-butoxybromo hafnium (HfBr(OC$_4$H$_9$)$_3$), methoxy tribromo hafnium (Hf(OCH$_3$)Br$_3$), ethoxy tribromo hafnium (Hf(OCH$_3$CH$_2$)Br$_3$), isobutoxy tribromo hafnium (Hf(i-C$_4$H$_9$)Br$_3$), n-butoxy tribromo hafnium (Hf(OC$_4$H$_9$)Br$_3$).

As said Group IVB metal compound, preference is given to the Group IVB metal halide, more preferably TiCl$_4$, TiBr$_4$, ZrCl$_4$, ZrBr$_4$, HfCl$_4$, and HfBr$_4$, and most preferably TiCl$_4$ and ZrCl$_4$.

The Group IVB metal compound could be used with one kind or as a mixture of two or more kinds.

There is no limitation as to how to conduct said treating step, as long as it is possible for the porous carrier to be treated with said chemical treating agent, so as to obtain the modified porous carrier, for example, as follows.

In case a solid chemical treating agent (for example ZrCl4) is used, a solution of said chemical treating agent is prepared, then the solution of the chemical treating agent is added (preferably dropwise) to the porous carrier, with a predetermined amount of the chemical treating agent. In case a liquid chemical treating agent (for example TiCl4) is used, it is acceptable to add (preferably dropwise) a predetermined amount of the chemical treating agent as such (or after dissolved in a solvent) to the porous carrier. The treating reaction continues (facilitated by any stirring means, if necessary) for 0.5 to 24 hours, preferably 1 to 8 hours, more preferably 2 to 6 hours, most preferably 2 to 4 hours. Then, the resultant is filtrated, washed and dried, so as to obtain the modified porous carrier according to this invention.

The filtration, washing (1 to 8 times, preferably 2 to 6 times, most preferably 2 to 4 times) and drying can be conducted in a conventional manner, wherein the washing solvent could be the same as that used for dissolving the solid chemical treating agent.

In preparation of the solution of the chemical treating agent, there is no limitation as to the solvent to be used. For example, that for preparing the solution of the assistant chemical treating agent can be used herein. Further, the solvent could be used with one kind or as a mixture of two or more kinds.

Further, there is no limitation as to the concentration of the chemical treating agent in the solution, which could be determined by a person skilled in the art as needed, as long as it is sufficient for the solution to deliver the predetermined amount of the chemical treating agent to treat the porous carrier.

It should be noted that since the Mg-treated porous carrier according to this invention contains the magnesium compound, when the treating step necessitates use of the Mg-treated porous carrier, any solvent (for example, an ether type solvent, or specifically, tetrahydrofuran) that can dissolve said magnesium compound can not be used in this step.

According to this invention, there is no limitation as to the temperature at which the treating step is conducted. A high reaction temperature helps to promote the reaction of the chemical treating agent with the porous carrier, and the reaction time could be decreased accordingly. In light of the fact that different solvents have different boiling points, it is well known for a person skilled in the art that the reaction temperature must be below the boiling point of the solvent used in the treating step. For example, the reaction temperature could be at 20 to 65° C. for hexane, and 20 to 105° C. for toluene, and so on. Therefore, since the reaction temperature depends upon the solvent, one can not uniformly specify same in this regard. However, generally speaking, the reaction temperature could be at 5 to 10° C. below the boiling point of the solvent, without any limitation to the lower limit of the reaction temperature. There is no special limitation to the reaction time, generally it could be 0.5 to 24 hours. In case of an elevated reaction temperature, the reaction time could be shortened accordingly.

It needs to be pointed out that in the treating step, it is not always necessary to use a solvent. That is to say, the reaction of the chemical treating agent with the porous carrier can be carried out in absence of a solvent. To this end, the chemical treating agent must be in a liquid state. In this case, the reaction temperature and the reaction time could be predetermined as needed. Generally speaking, the reaction temperature could be at least 5 to 10° C. below the boiling point of the chemical treating agent, and the reaction time could be 2 to 24 hours. As a rule, the more drastic the reaction between the chemical treating agent and the porous carrier is, the lower the reaction temperature should be set, resulting in a prolonged reaction time. For example, when the chemical treating agent is TiCl4, the reaction temperature could range from −30° C. to 126° C., the corresponding reaction time could be between 2 to 12 hours.

Next, the treating step of reacting said porous carrier with the nonmetallocene ligand is detailedly described as follows.

According to this invention, the nonmetallocene ligand is a compound having the following structure.

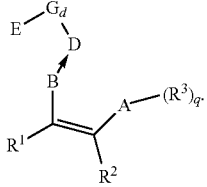

In a further embodiment, the nonmetallocene ligand is selected from the group consisting of the following structures (A) and (B).

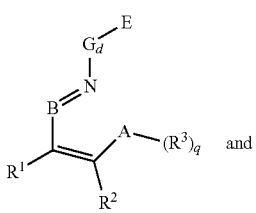

(A)

and

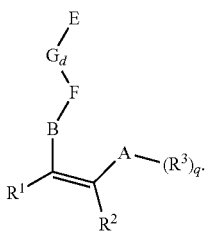

(B)

In a still further embodiment, the nonmetallocene ligand is selected from the group consisting of the following structures A-1 to A-4 and B-1 to B-4.

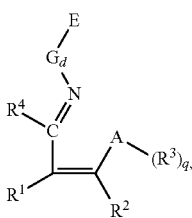

A-1

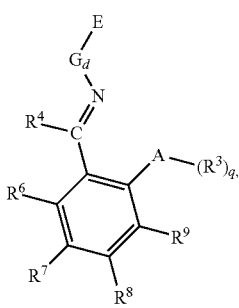

A-2

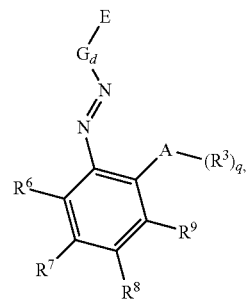

A-3

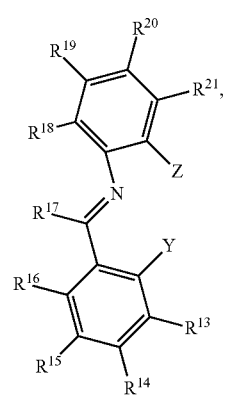

A-4

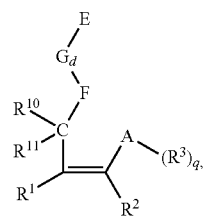

B-1

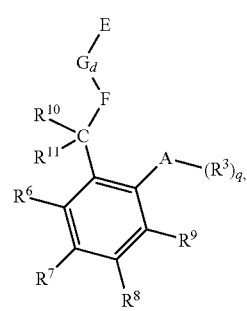

B-2

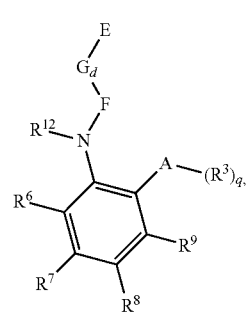

B-3

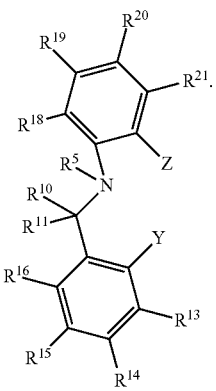

B-4

In all of the aforementioned structures:
q is 0 or 1;
d is 0 or 1;
A is selected from the group consisting of an oxygen atom, a sulfur atom, a selenium atom,

$-NR^{23}R^{24}$, $-N(O)R^{25}R^{26}$,

$-PR^{28}R^{29}$, $-P(O)R^{30}OR^{31}$, a sulfone group, a sulfoxide group or $-Se(O)R^{39}$;

B is selected from the group consisting of a nitrogen-containing group, a phosphor-containing group, or a $C_1$-$C_{30}$ hydrocarbyl;

D is selected from the group consisting of an oxygen atom, a sulfur atom, a selenium atom, a nitrogen-containing $C_1$-$C_{30}$ hydrocarbyl, a phosphor-containing $C_1$-$C_{30}$ hydrocarbyl, a sulfone group, a sulfoxide group,

$-N(O)R^{25}R^{26}$,

or $-P(O)R^{32}(OR^{33})$, wherein N, O, S, Se and P each represent a coordination atom;

E is selected from the group consisting of a nitrogen-containing group, an oxygen-containing group, a sulfur-containing group, a selenium-containing group or a phosphor-containing group, wherein N, O, S, Se and P each represent a coordination atom;

F is selected from the group consisting of a nitrogen-containing group, an oxygen-containing group, a sulfur-containing group, a selenium-containing group or a phosphor-containing group, wherein N, O, S, Se and P each represent a coordination atom;

G is selected from the group consisting of a $C_1$-$C_{30}$ hydrocarbyl, a substituted $C_1$-$C_{30}$ hydrocarbyl or an inert functional group;

Y and Z are each independently selected from the group consisting of a nitrogen-containing group, an oxygen-containing group, a sulfur-containing group, a selenium-containing group or a phosphor-containing group, for example, $-NR^{23}R^{24}$, $-N(O)R^{25}R^{26}$, $-PR^{28}R^{29}$, $-P(O)R^{30}R^{31}$, $-OR^{34}$, $-SR^{35}$, $-S(O)R^{36}$, $-SeR^{38}$ and $-Se(O)R^{39}$, wherein N, O, S, Se and P each represent a coordination atom;

→ represents a single bond or a double bond;

— represents a covalent bond or an ionic bond;

$R^1$ to $R^4$, $R^6$ to $R^{36}$ and $R^{38}$ to $R^{39}$ are each independently selected from the group consisting of hydrogen, a $C_1$-$C_{30}$ hydrocarbyl, a halogen atom, a substituted $C_1$-$C_{30}$ hydrocarbyl (preferably the corresponding halogenated hydrocarbyl, for example, $-CH_2Cl$ and $-CH_2CH_2Cl$) or an inert functional group, wherein these groups could be identical to or different with each other, and any adjacent groups, for example, $R^1$ with $R^2$ and $R^3$, $R^3$ with $R^4$, $R^6$, $R^7$, $R^8$ and $R^9$, $R^{23}$ with $R^{24}$, or $R^{25}$ with $R^{26}$, could form a bond or a ring together;

$R^5$ is selected from the group consisting of the lone pair electron on the nitrogen atom, hydrogen, a $C_1$-$C_{30}$ hydrocarbyl, a substituted $C_1$-$C_{30}$ hydrocarbyl, an oxygen-containing group (including a hydroxyl group and an alkoxy group, for example, $-OR^{34}$ or $-T-OR^{34}$), a sulfur-containing group (for example, $-SR^{35}$, $-T-SR^{35}$), a selenium-containing group (for example, $-SeR^{38}$, $-T-SeR^{38}$, $-Se(O)R^{39}$, or $-T-Se(O)R^{39}$), a nitrogen-containing group (for example, $-NR^{23}R^{24}$, $-T-NR^{23}R^{24}$), a phosphor-containing group (for example, $-PR^{28}R^{29}$, $-T-PR^{28}R^{29}$, $-T-P(O)R^{30}R^{31}$), with proviso that when $R^5$ is selected from the group consisting of the oxygen-containing group, the sulfur-containing group, the nitrogen-containing group, the selenium-containing group or the phosphor-containing group, N, O, S, P and Se in the group $R^5$ each represent a coordination atom, and is able to coordinate with the Group IVB transition metal atom.

In the context of this invention, the halogen atom is selected from the group consisting of F, Cl, Br and I, the nitrogen-containing group is selected from the group consisting of

$-NR^{23}R^{24}$, $-T-NR^{23}R^{24}$ or $-N(O)R^{25}R^{26}$, the phosphor-containing group is selected from the group consisting of

—PR$^{28}$R$^{29}$, —P(O)R$^{30}$R$^{31}$ or —P(O)R$^{32}$(OR$^{33}$), the oxygen-containing group is selected from the group consisting of hydroxy and the alkoxy group, for example, —OR$^{34}$ and -T-OR$^{34}$, the sulfur-containing group is selected from the group consisting of —SR$^{35}$, -T-SR$^{35}$, —S(O)R$^{36}$ or -T-SO$_2$R$^{37}$, the selenium-containing group is selected from the group consisting of —SeR$^{38}$, -T-SeR$^{38}$, —Se(O)R$^{39}$ or -T-Se(O)R$^{39}$, the group T is selected from the group consisting of the C$_1$-C$_{30}$ hydrocarbyl, the substituted C$_1$-C$_{30}$ hydrocarbyl or the inert functional group, R$^{37}$ is selected from the group consisting of hydrogen, the C$_1$-C$_{30}$ hydrocarbyl, the halogen atom, the substituted C$_1$-C$_{30}$ hydrocarbyl or the inert functional group.

According to this invention, the C$_1$-C$_{30}$ hydrocarbyl is selected from the group consisting of a C$_1$-C$_{30}$ alkyl group, a C$_2$-C$_{30}$ cyclic alkyl group, a C$_2$-C$_{30}$ alkenyl group, a C$_2$-C$_{30}$ alkynyl group, a C$_6$-C$_{30}$ aryl group, a C$_8$-C$_{30}$ fused-ring group or a C$_4$-C$_{30}$ heterocycle group, the substituted C$_1$-C$_{30}$ hydrocarbyl refers to a C$_1$-C$_{30}$ hydrocarbyl having one or more inert substituent(s). By inert, it means that the substituents show no substantial interference with the coordination of the central metal atom. Unless otherwise specifically indicated, the substituted C$_1$-C$_{30}$ hydrocarbyl generally refers to a halogenated C$_1$-C$_{30}$ hydrocarbyl group, a halogenated C$_6$-C$_{30}$ aryl group, a halogenated C$_8$-C$_{30}$ fused-ring group or a halogenated C$_4$-C$_{30}$ heterocycle group, the inert functional group refers to any inert functional group other than a hydrocarbyl and a substituted hydrocarbyl. According to this invention, the inert functional group could be, for example, the halogen atom, the oxygen-containing group, the nitrogen-containing group, a silicon-containing group, a germanium-containing group, the sulfur-containing group or a tin-containing group, for example, an ether group (for example, —OR$^{34}$ or -TOR$^{35}$), a C$_1$-C$_{10}$ ester group, a C$_1$-C$_{10}$ amine group, a C$_1$-C$_{10}$ alkoxy group and a nitro group, and the like.

According to this invention, the inert functional group:

(1) does not interfere with the coordination of the Group IVB metal atom;

(2) is different from each of the groups A, D, E, F, Y and Z in the structure, and (3) is less liable to coordinate with the Group IVB metal atom than each of the groups A, D, E, F, Y and Z, and therefore will not coordinate with the Group IVB metal atom in place of these groups.

The silicon-containing group is selected from the group consisting of —SiR$^{42}$R$^{43}$R$^{44}$, and -T-SiR$^{45}$, the germanium-containing group is selected from the group consisting of —GeR$^{46}$R$^{47}$R$^{48}$, and -T-GeR$^{49}$, the tin-containing group is selected from the group consisting of —SnR$^{50}$R$^{51}$R$^{52}$, -T-SnR$^{53}$ or -T-Sn(O)R$^{54}$, R$^{42}$ to R$^{54}$ are each independently selected from the group consisting of hydrogen, the C$_1$-C$_{30}$ hydrocarbyl, the halogen atom, the substituted C$_1$-C$_{30}$ hydrocarbyl or the inert functional group.

As the nonmetallocene ligand, exemplified is the following compounds.

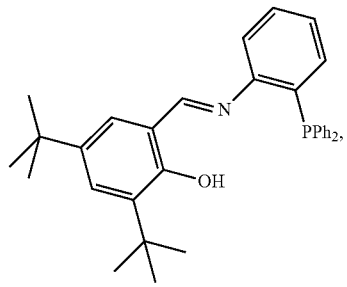

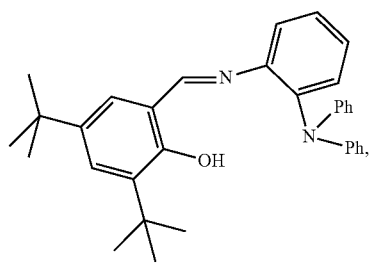

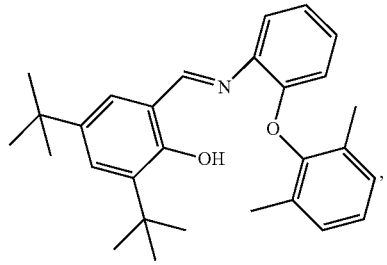

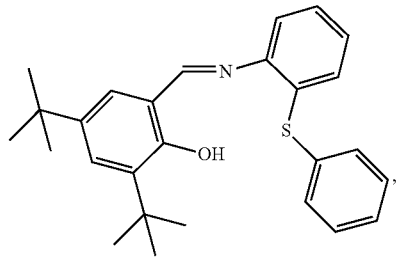

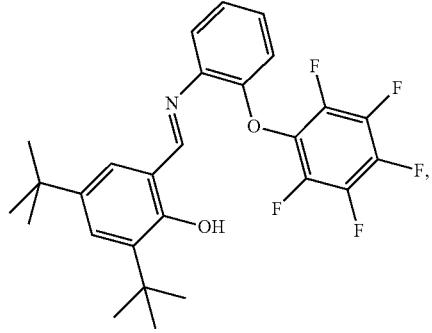

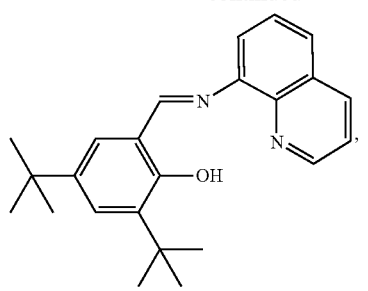
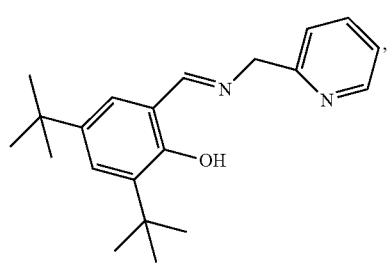
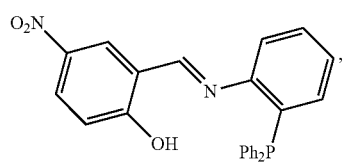
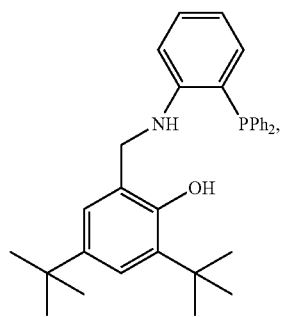
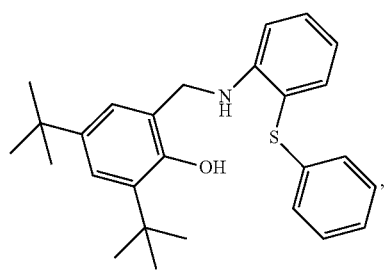
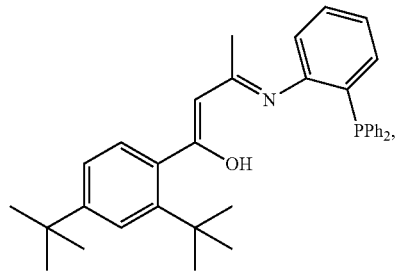
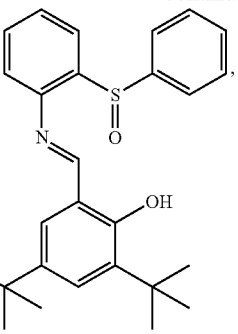
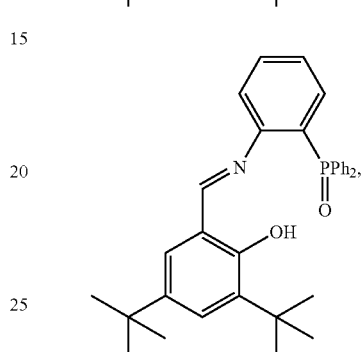
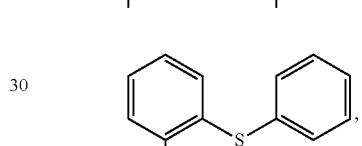
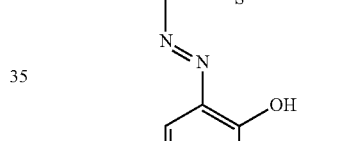
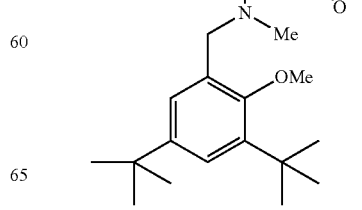

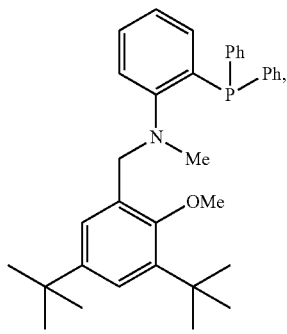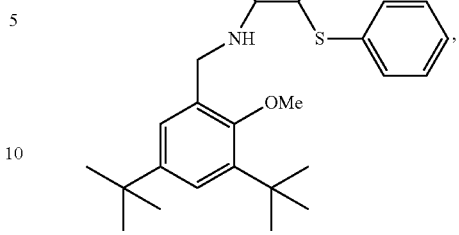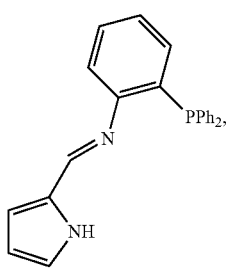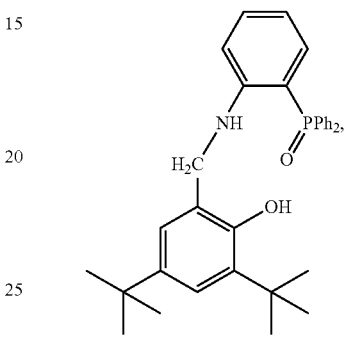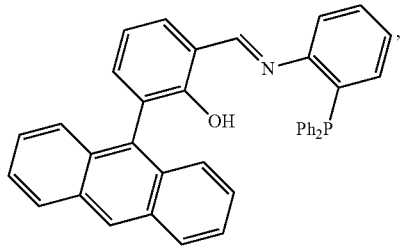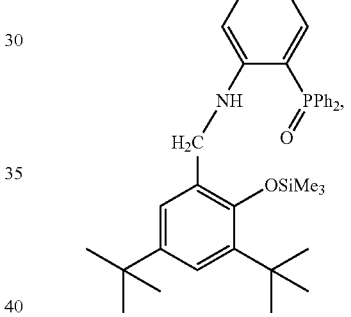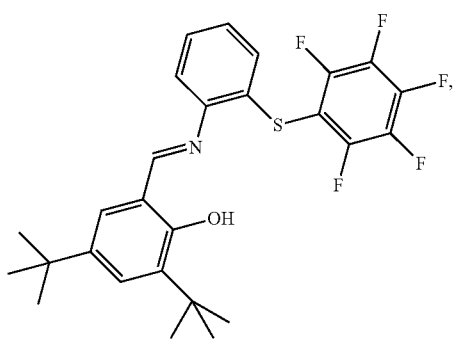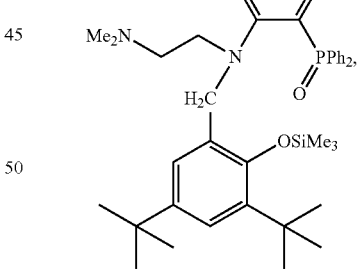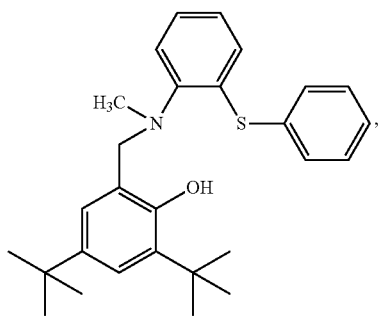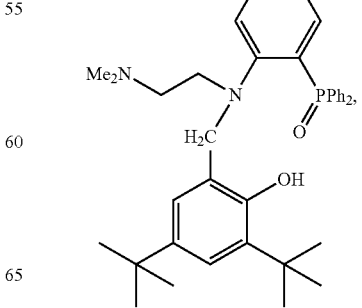

-continued
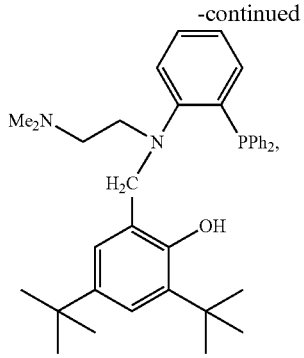
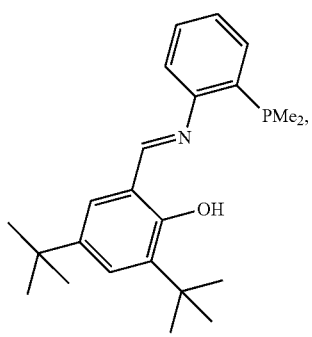
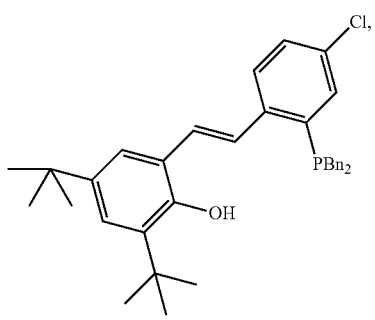
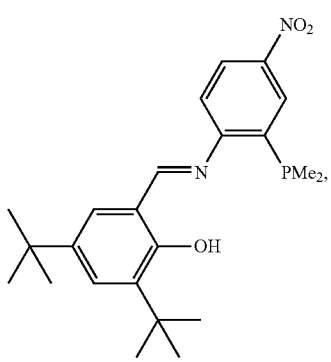
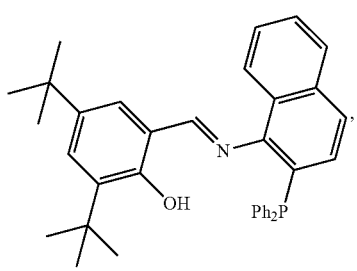
-continued
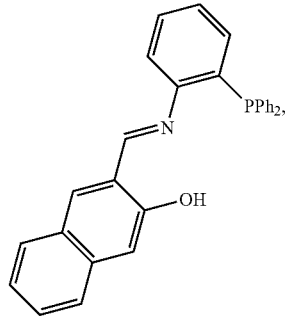
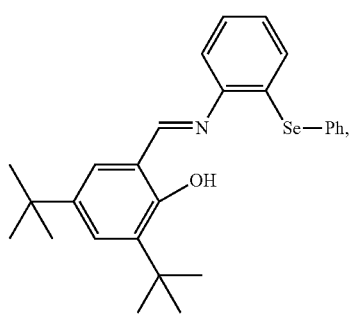
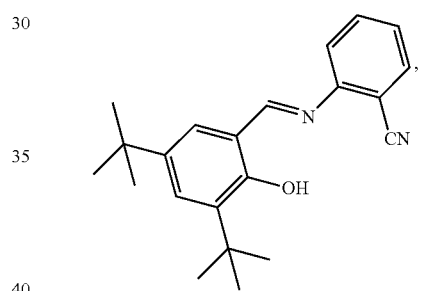
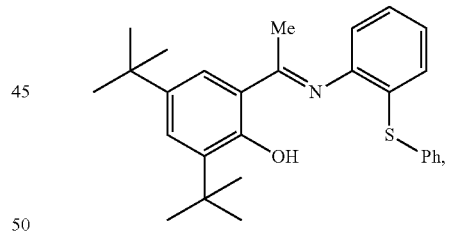
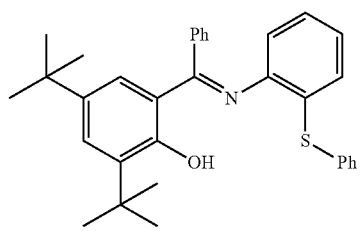
In a preferred embodiment, the nonmetallocene ligand is selected from the group consisting of the following compounds.

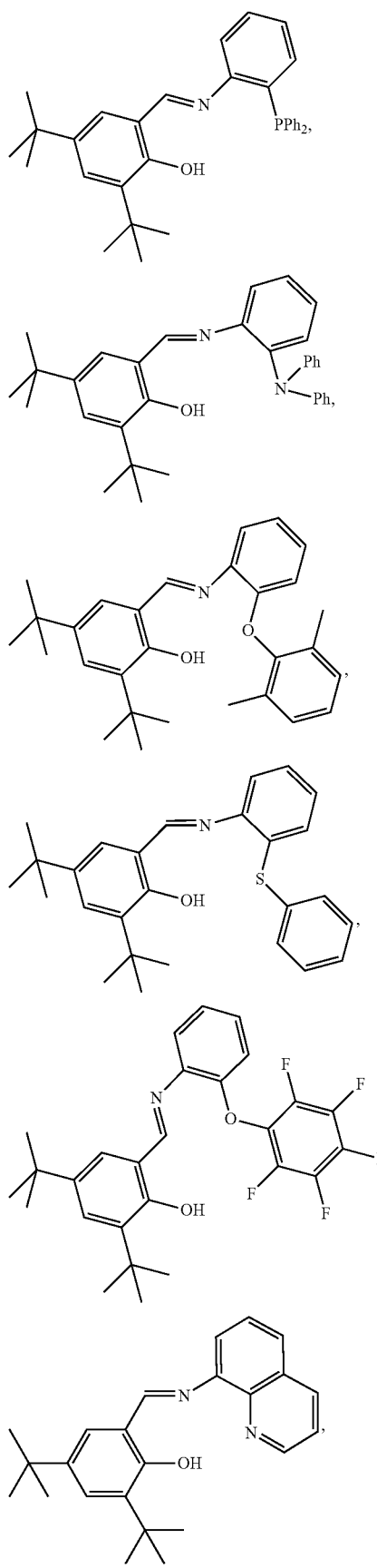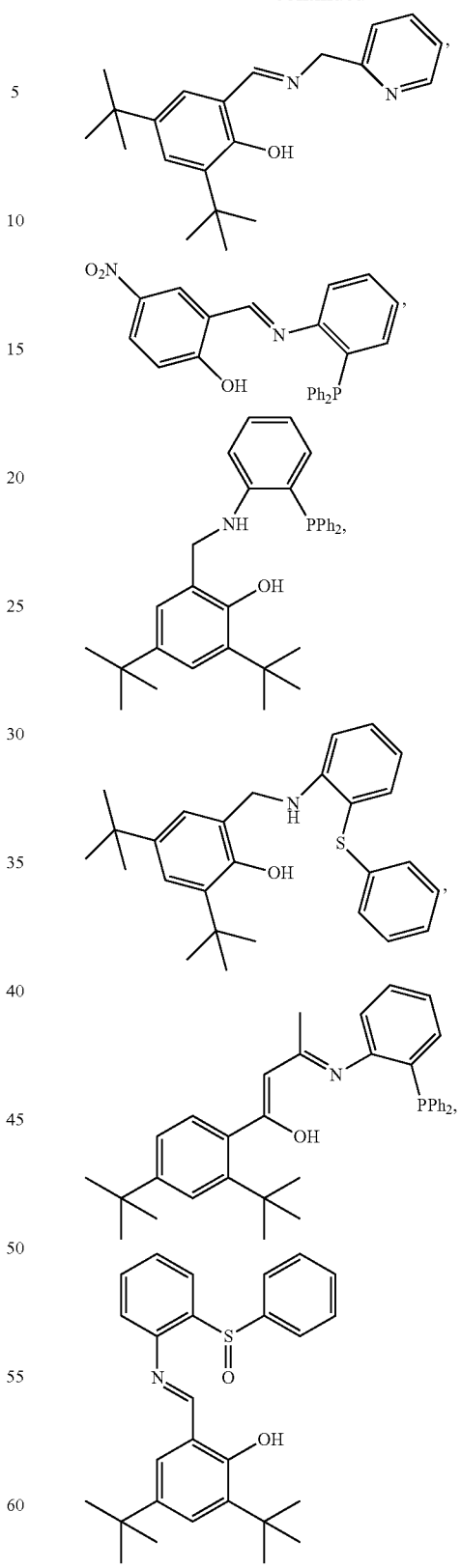
In a further preferred embodiment, the nonmetallocene ligand is selected from the group consisting of the following compounds.

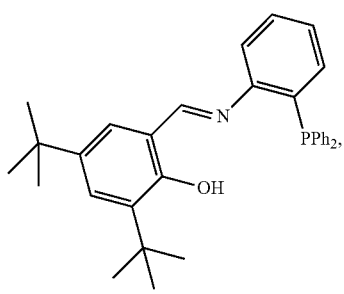

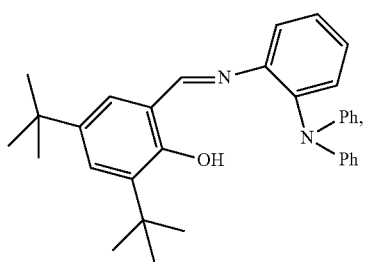

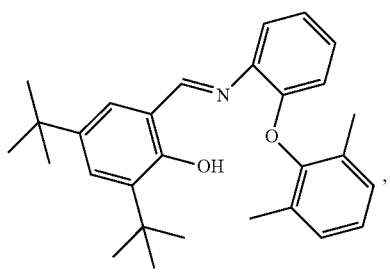

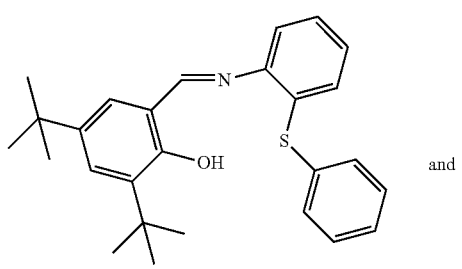

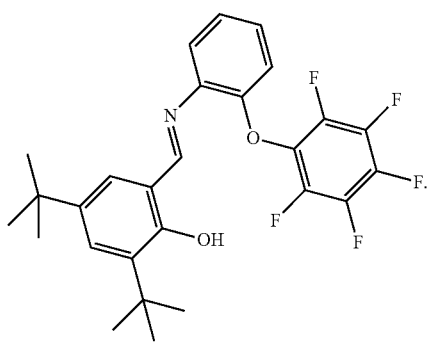

In a most preferred embodiment, the nonmetallocene ligand is selected from the group consisting of the following two compounds.

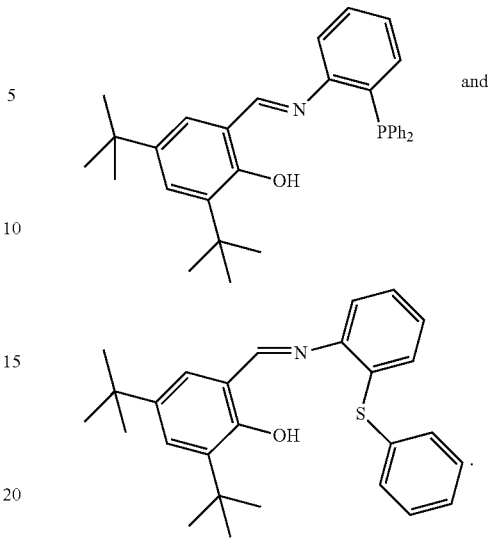

The nonmetallocene ligand could be used with one kind or as a mixture of two or more kinds.

In case the nonmetallocene ligand is used to treat said porous carrier, there is no limitation as to how to conduct said treating step, as long as it is possible for the porous carrier to be treated with said nonmetallocene ligand so as to obtain the modified porous carrier, for example, as follows.

Firstly, a solution of said nonmetallocene ligand in a solvent is prepared. To facilitate dissolution of said nonmetallocene ligand in the solvent, heat could be applied during the dissolution, if necessary. Further, if needed, any stirring means could be used in the dissolution, whose rotational speed could be 10 to 500 r/min. To achieve the predetermined amount of the nonmetallocene ligand in the final supported nonmetallocene catalyst, taking into consideration of the dissolving ability of the solvent to the nonmetallocene ligand in this stage, the concentration by mass of the nonmetallocene ligand in the solution is generally 0.02 to 0.30 g/ml, preferably 0.05 to 0.15 g/ml.

To prepare said solution, there is no limitation as to the solvent to be used, as long as the solvent can dissolve the nonmetallocene ligand. For example, exemplified is an alkane, for example, pentane, hexane, heptane, octane, nonane, or decane, and the like, a cyclic alkane, for example, cyclo pentane, cyclo hexane, cyclo heptane, cyclo nonane, or cyclo decane, and the like, a halogenated alkane, for example, dichloro methane, dichloro hexane, dichloro heptane, trichloro methane, trichloro ethane, trichloro butane, dibromo methane, dibromo ethane, dibromo heptane, tribromo methane, tribromo ethane, tribromo butane and the like, a halogenated cyclic alkane, for example, chlorinated cyclo hexane, chlorinated cyclo pentane, chlorinated cyclo heptane, chlorinated cyclo decane, chlorinated cyclo nonane, chlorinated cyclo octane, brominated cyclo hexane, brominated cyclo pentane, brominated cyclo heptane, brominated cyclo decane, brominated cyclo nonane, brominated cyclo octane, and the like, an aromatic hydrocarbon, for example, toluene, xylene, trimethyl benzene, ethyl benzene, diethyl benzene and the like, and a halogenated aromatic hydrocarbon, for example, chlorinated toluene, chlorinated ethyl benzene, brominated ethyl benzene, brominated toluene and the like.

Preference is given to the alkane, the halogenated alkane and the aromatic hydrocarbon, more preferably hexane, dichloro methane, and toluene.

The solvent could be used with one kind or as a mixture of two or more kinds.

It should be noted that since the Mg-treated porous carrier according to this invention contains the magnesium compound, when the treating step necessitates use of the Mg-treated porous carrier, any solvent (for example, an ether type solvent, or specifically, tetrahydrofuran) that can dissolve said magnesium compound can not be used in this step.

Then, the porous carrier is added to the nonmetallocene ligand solution under a temperature ranging from the room temperature to that 5° C. below the boiling point of the solvent for dissolving said nonmetallocene ligand, under sufficient stirring, and the treating reaction continues for 0.5 to 24 hours. The stirring means could be a ribbon stirrer, an anchor stirrer and the like. For the ribbon stirrer, the speed could be 5 to 50 r/min, while for the anchor stirrer, the speed could be 5 to 200 r/min.

In case the porous carrier to be treated in said treating step does not represent the Mg-treated porous carrier, but represents only the porous carrier as such, the thermally-activated porous carrier, or any pre-treated version thereof (i.e., pre-treated by the assistant chemical treating agent), the ratio of the chemical treating agent (based on the Group IVB metal) to the porous carrier could be 1-100 mmol to 1 g, preferably 5-40 mmol to 1 g. Further, the ratio of the nonmetallocene ligand to the porous carrier could be 0.02-1.00 mmol to 1 g, preferably 0.08-0.53 mmol to 1 g.

In case the Mg-treated porous carrier is obtained by drying the slurry (i.e., in case said porous carrier is previously treated by the slurry-drying process), by mass, the ratio of the non-metallocene ligand to the Mg-treated porous carrier could be 0.05-0.50 to 1, preferably 0.10-0.30 to 1. Further, the ratio by molar of the chemical treating agent (based on the Group IVB metal) to the nonmetallocene ligand could be 1 to 0.1-1, preferably 1 to 0.3-0.9.

In case the Mg-treated porous carrier is obtained by introducing the precipitating agent into the slurry (i.e., in case said porous carrier is previously treated by the slurry-precipitating process), the ratio by molar of the nonmetallocene ligand to the magnesium compound (based on Mg) could be 1 to 1-10, preferably 1 to 1.5-4. Further, the ratio by molar of the chemical treating agent (based on the Group IVB metal) to the magnesium compound (based on Mg) could be 0.05 to 0.50, preferably 0.10 to 0.30.

Then, at the end of the reaction, the resultant mixture is subjected to filtration, washing and drying, or direct drying without filtration and washing, so as to obtain the modified porous carrier. Generally speaking, in case the resultant mixture has a low solid content, the former way is preferred, while the resultant mixture has a high solid content, the latter way is preferred. If needed, the washing could be conducted for 1 to 8 times, preferably 2 to 6 times, most preferably 2 to 4 times. The drying could be conducted in a conventional way, for example, drying under an inert gas atmosphere, vacuum drying, or vacuum drying under heat, preferably vacuum drying. Generally speaking, the drying duration could be 2 to 24 hours, however in practice, one could determine the end of the drying by sampling the mixture being dried and analyzing the weight loss of the sample by a thermal weight-loss method. Specifically, in case the temperature at which the modified porous carrier is dried is 5 to 45° C. below the boiling point of the solvent used in the reaction, a weight-loss of less than 5% could be determined as the end of the drying. In case a comparatively low boiling point solvent is used, a comparatively short drying duration is preferred, while a comparatively high boiling point solvent is used, a accordingly comparatively long drying duration is preferred. The drying temperature is generally 5 to 45° C. below the boiling point of the solvent used. For example, in case toluene is used as the solvent, the drying temperature could range from 65° C. to 105° C., while in case dichloro methane is used, the drying temperature could range from 0° C. to 37° C.

Further, in an embodiment according to this invention, the mixture mass (without separation of the pre-treated porous carrier therefrom) obtained in the aforesaid pre-treating step could be used, instead of the porous carrier, in the treating step, to react with the nonmetallocene ligand or the chemical treating agent. In this case, since the mixture mass contains an amount of solvent, it is possible to reduce or eliminate use of solvent in the treating step.

Then, according to this invention, the contacting step is conducted by contacting the thus produced modified porous carrier with the other of the two: the nonmetallocene ligand and the chemical treating agent, so as to obtain the supported nonmetallocene catalyst according to this invention.

In other words, in case the chemical treating agent is used in the treating step, only the nonmetallocene ligand is used in this subsequent contacting step; in case the nonmetallocene ligand is used in the treating step, only the chemical treating agent is used in this subsequent contacting step.

According to this invention, by contacting said nonmetallocene ligand (or said chemical treating agent) with said modified porous carrier, reaction occurs between said nonmetallocene ligand (or said chemical treating agent) with the chemical treating agent (or the nonmetallocene ligand) supported on said modified porous carrier, so as to in-situ form a nonmetallocene complex (hereinafter referred as the in-situ supporting reaction), whereby obtaining the supported nonmetallocene catalyst according to this invention.

There is no limitation as to how to conduct the contacting step, as long as the in-situ supporting reaction could occur.

Specifically, in case the nonmetallocene ligand is used to conduct said contacting step, as the process for conducting said contacting step, exemplified is the same process (for example, the same reaction conditions and the same amount of the agent to be used) as aforesaid for conducting the treating step by using a nonmetallocene ligand, except that the porous carrier (referring to the porous carrier as such, the thermally-activated porous carrier, the Mg-treated porous carrier, the thermally-activated and then Mg-treated porous carrier, or further, the pre-treated version thereof) is necessarily replaced by the modified porous carrier.

For the same reason, in case the chemical treating agent is used to conduct said contacting step, as the process for conducting said contacting step, exemplified is the same process (for example, the same reaction conditions and the same amount of the agent to be used) as aforesaid for conducting the treating step by using a chemical treating agent, except that the porous carrier (referring to the porous carrier as such, the thermally-activated porous carrier, the Mg-treated porous carrier, the thermally-activated and then Mg-treated porous carrier, or further, the pre-treated version thereof) is necessarily replaced by the modified porous carrier.

Further, in favor of the interaction between the modified porous carrier with the chemical treating agent or the nonmetallocene ligand used in the contacting step, the mixture mass obtained with the contacting step is usually aged for 0.5 to 24 hours under a sealed condition and at the room temperature, so as to enhance the bonding strength therebetween.

It is well known that the aforementioned processes and steps are all required to be carried out under a substantial anhydrous condition in absence of oxygen. By substantial anhydrous condition in absence of oxygen, it means that water and oxygen in the system concerned is continuously controlled to be less than 10 ppm. Further, the support nonmetallocene catalyst according to this invention, after prepared, is usually stored in a sealed container with a nitrogen seal under a slightly positive pressure before use.

In one embodiment, this invention relates to a supported nonmetallocene catalyst produced as aforesaid.

In a further embodiment according to this invention, the supported nonmetallocene catalyst according to this invention, in combination with a co-catalyst, constitutes a catalyst system for olefin homopolymerization/copolymerization.

In this connection, the supported nonmetallocene catalyst according to this invention is used as the main catalyst, one or more selected from the group consisting of an aluminoxane, an alkylaluminum, a halogenated alkyl aluminum, a fluoroborane, an alkylboron and an alkylboron ammonium salt is/are used as the co-catalyst, so as for catalyzing the olefin homopolymerization/copolymerization.

There is no limitation as to how to conduct said olefin homopolymerization/copolymerization, any conventional process that is familiar to a person skilled in the art can be used, for example, a slurry process, an emulsion process, a solution process, a bulk process or a gas phase process.

The olefins to be used is selected from the group consisting of a $C_2$ to $C_{10}$ mono-olefin, a diolefin, a cyclic olefin or other ethylenic unsaturated compounds. For example, as said $C_2$ to $C_{10}$ mono-olefin, exemplified is ethylene, propene, 1-butene, 1-hexene, 1-heptene, 4-methyl-1-pentene, 1-octene, 1-decene, 1-undecene, 1-dodecene, 1-cyclopentene, norbornene, norbornadiene, and styrene, as said diolefin, exemplified is 1,4-butadiene, 2,5-pentadiene, 1,6-hexadiene, and 1,7-octadiene, as said other ethylenic unsaturated compounds, exemplified is vinyl acetate, and (meth)acrylates. In this specification, it is required to point out that, by homopolymerization, it refers to the polymerization of a single olefin, by copolymerization, it refers to the polymerization of two or more olefins.

As aforesaid, the co-catalyst is selected from the group consisting of an aluminoxane, an alkylaluminum, a halogenated alkyl aluminum, a fluoroborane, an alkylboron and an alkylboron ammonium salt, preferably the aluminoxane and the alkylaluminum.

As the aluminoxane and the alkylaluminum, exemplified is that as aforesaid as the assistant chemical treating agent, preferably methyl aluminoxane (MAO) and triethyl aluminum.

The process for producing the supported nonmetallocene catalyst according to this invention is simple and feasible, and it is easy to adjust the load of the nonmetallocene ligand on the porous carrier, and therefore it is possible to significantly increase the load.

Further, by using different amounts of the chemical treating agent, it is possible to freely adjust the polymerization activity of the obtained supported nonmetallocene catalyst as needed, from low to high, thereby adapting same for different olefin polymerization requirements.

According to the process of this invention, the nonmetallocene ligand and the porous carrier bond firmly, so as to significantly decrease the influence of any un-bonded ligand on the polymerization performance of the supported nonmetallocene catalyst, whereby rendering the performance of said catalyst more stable and reliable.

When a catalyst system is constituted by using the catalyst according to this invention in combination with a co-catalyst (for example, methyl aluminoxane or triethyl aluminum), only a comparatively small amount of the co-catalyst is needed to achieve a comparatively high polymerization activity. Further, the polymer product (for example, polyethylene) obtained therewith boasts desirable polymer morphology and a high bulk density.

EXAMPLE

The present invention is further illustrated by using the following examples, but the present invention is not confined to same.

The bulk density of the polymer is measured according to the Chinese Standard GB 1636-79 (unit: g/cm$^3$).

The content of the Group IVB metal in the supported nonmetallocene catalyst is determined by the ICP-AES method, while the content of the nonmetallocene ligand in the supported nonmetallocene catalyst is determined by the element analysis method.

The polymerization activity of the catalyst is calculated as follows.

At the end of the polymerization, the polymer product in the reactor is filtered, dried and weighed for its weight (by mass). Then, the polymerization activity of the catalyst is expressed by a value obtained by dividing the weight of the polymer product by the amount (by mass) of the catalyst used in the polymerization (unit: kg polymer per 1 g Cat).

Example I-1

A silica gel (ES757, from the Ineos company) was used as the porous carrier, which had been thermally activated at 600° C. under a N$_2$ atmosphere for 4 hours before use.

5 g of the thermally activated silica gel was weighted, and 50 nil of hexane as the solvent in this step was added thereto. Then, TiCl4 (as the chemical treating agent) was dropwise added thereto over a period of 30 minutes under stirring, and was reacted for 4 hours at 60° C. under stirring. The resultant was then filtered, washed by hexane for 3 times (25 ml per time), and dried at 60° C. for 2 hours, so as to obtain a modified porous carrier.

In this step, the ratio of TiCl4 to the porous carrier was 9.4 mmol to 1 g.

A nonmetallocene ligand of the structure

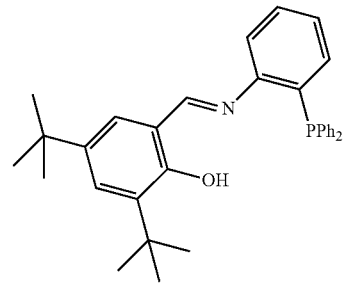

was dissolved in hexane (as the solvent for dissolving the nonmetallocene ligand), then the modified porous carrier was added thereto, and the reaction continued under stirring for 4 hours. After filtrated, washed by hexane for 2 times (25 ml per time), and dried at 25° C. for 6 hours, a supported nonmetallocene catalyst was obtained.

In this step, the concentration by mass of the nonmetallocene ligand was 0.045 g/ml, and the ratio of the nonmetallocene ligand to the porous carrier was 0.193 mmol to 1 g.

The catalyst obtained was named as CAT-I-1.

Example I-1-1

Substantially the same as the Example I-1, except for the following changes:

Al$_2$O$_3$ was used as the porous carrier, and the thermal activation was conducted at 800° C. under a N$_2$ gas atmosphere for 12 hours.

The ratio of titanium tetrachloride to the porous carrier was 14 mmol to 1 g, and the solvent in this step was changed to decane.

The nonmetallocene ligand was changed to

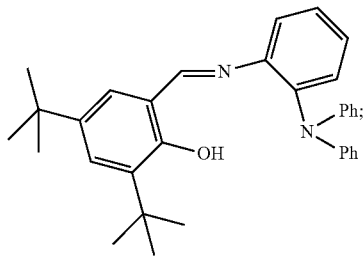

the concentration by mass of the nonmetallocene ligand was 0.12 g/ml;

the ratio of the nonmetallocene ligand to the porous carrier was 0.386 mmol to 1 g; and the solvent for dissolving the nonmetallocene ligand was changed to decane.

Example I-1-2

Substantially the same as the Example I-1, except for the following changes:

Polystyrene having a carboxy group on its surface was used as the porous carrier, and the thermal activation was conducted at 200° C. under a N$_2$ gas atmosphere for 2 hours.

The chemical treating agent was changed to ZrCl4, which was dissolved in toluene before use, the ratio of ZrCl4 to the porous carrier was 18.7 mmol to 1 g, and the solvent in this step was changed to toluene.

The nonmetallocene ligand was changed to

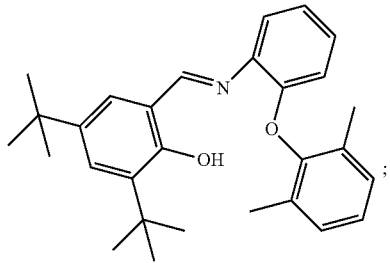

the concentration by mass of the nonmetallocene ligand was 0.16 g/ml;

the ratio of the nonmetallocene ligand to the porous carrier was 0.508 mmol to 1 g; and the solvent for dissolving the nonmetallocene ligand was changed to toluene.

Example I-1-3

Substantially the same as the Example I-1, except for the following changes:

Montmorillonite having a hydroxy group on its surface was used as the porous carrier, and the thermal activation was conducted at 300° C. under a N$_2$ gas atmosphere for 6 hours.

The chemical treating agent was changed to TiBr4, the ratio of TiBr4 to the porous carrier was 5.2 mmol to 1 g, and the solvent in this step was changed to pentane.

The nonmetallocene ligand was changed to

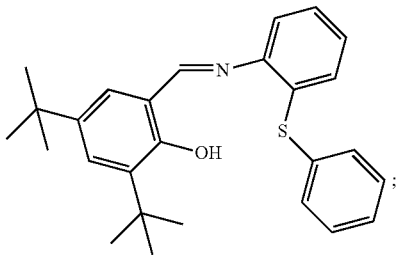

the concentration by mass of the nonmetallocene ligand was 0.02 g/ml;

the ratio of the nonmetallocene ligand to the porous carrier was 0.841 mmol to 1 g; and the solvent for dissolving the nonmetallocene ligand was changed to pentane.

Example I-1-4

Substantially the same as the Example I-1, except for the following changes:

Polypropylene having a hydroxy group on its surface was used as the porous carrier, and the thermal activation was conducted at 200° C. under a N$_2$ gas atmosphere for 2 hours.

The chemical treating agent was changed to ZrBr4, the ratio of ZrBr4 to the porous carrier was 47 mmol to 1 g, and the solvent in this step was changed to dichloro methane.

The nonmetallocene ligand was changed to

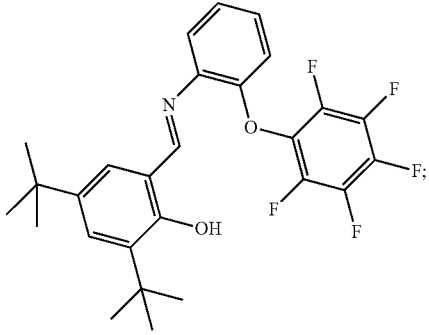

the concentration by mass of the nonmetallocene ligand was 0.28 g/ml;

the ratio of the nonmetallocene ligand to the porous carrier was 0.02 mmol to 1 g; and the solvent for dissolving the nonmetallocene ligand was changed to dichloro methane.

Example I-1-5

Substantially the same as the Example I-1, except for the following changes:

Silica produced by pyrohydrolysis of SiCl4 was used as the porous carrier, and the thermal activation was conducted at 600° C. under a dry N$_2$ gas atmosphere for 8 hours.

The chemical treating agent was changed to tetramethyl titanium, the ratio of tetramethyl titanium to the porous carrier was 15.1 mmol to 1 g, and the solvent in this step was changed to ethyl benzene.

The nonmetallocene ligand was changed to

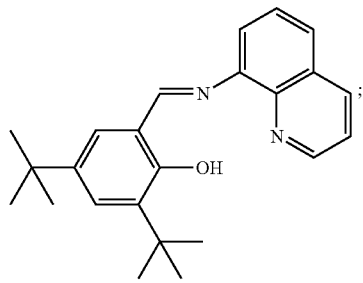

and
the solvent for dissolving the nonmetallocene ligand was changed to ethyl benzene.

Example I-1-6

Substantially the same as the Example I-1, except for the following changes:

TiO2 was used as the porous carrier, and the thermal activation was conducted at 400° C. under a dry $N_2$ gas atmosphere for 4 hours.

The chemical treating agent was changed to tetraethyl titanium, and the solvent in this step was changed to cyclohexane.

The nonmetallocene ligand was changed to

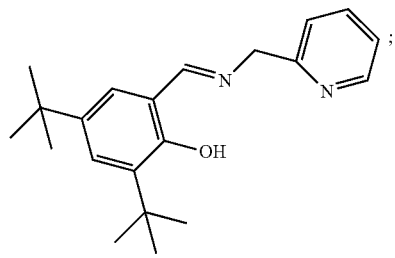

and
the solvent for dissolving the nonmetallocene ligand was changed to cyclohexane.

Example I-1-7

Substantially the same as the Example I-1, except for the following changes:

The MCM-41 molecular sieve was used as the porous carrier, and the thermal activation was conducted at 450° C. under a $N_2$ gas atmosphere for 8 hours.

The chemical treating agent was changed to tetramethoxy titanium, and the solvent in this step was changed to methyl cyclohexane.

The nonmetallocene ligand was changed to

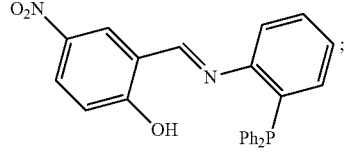

and
the solvent for dissolving the nonmetallocene ligand was changed to methyl cyclohexane.

Example I-1-8

Substantially the same as the Example I-1, except for the following changes:

Kaolin having a hydroxy group on its surface was used as the porous carrier, and the thermal activation was conducted at 250° C. under vacuum for 6 hours.

The chemical treating agent was changed to tetramethyl zirconium.

The nonmetallocene ligand was changed to

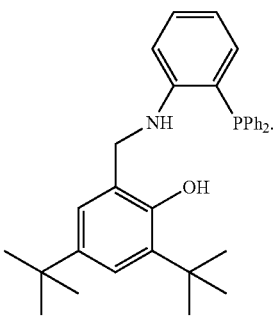

Example I-1-9

Substantially the same as the Example I-1, except for the following changes:

Kieselguhr having a hydroxy group on its surface was used as the porous carrier, and the thermal activation was conducted at 800° C. under a $N_2$ gas atmosphere for 12 hours.

The chemical treating agent was changed to tetramethoxy zirconium.

The nonmetallocene ligand was changed to

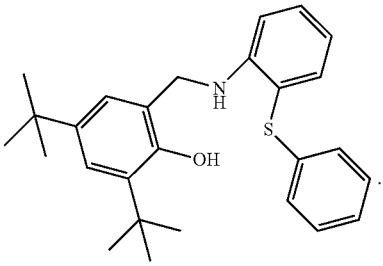

Example I-2

A silica gel (ES757, from the Ineos company) was used as the porous carrier, which had been thermally activated at 600° C. under a $N_2$ atmosphere for 4 hours before use.

In the following examples, a composite chemical treating agent was used, which referred to the combination of a chemical treating agent and an assistant chemical treating agent.

To 5 g of the thermally activated silica gel, a solution of triethyl aluminum in hexane was dropwise added over a period of 15 minutes, and the reaction continued for 1 hour. Then, TiCl4 (as the chemical treating agent) was dropwise added thereto over a period of 30 minutes, and the reaction continued for 2 hours at 60° C. under stirring. The resultant was then filtered, washed by hexane for 3 times (30 ml per time), and dried at 25° C. for 6 hours, so as to obtain a modified porous carrier.

In this step, the ratio of TiCl4 to the porous carrier was 9.4 mmol to 1 g, and the ratio of triethyl aluminum to the porous carrier was 1 mmol to 1 g.

A nonmetallocene ligand of the structure

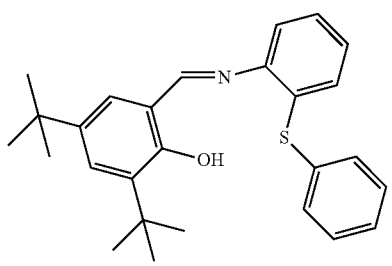

was dissolved in hexane (as the solvent for dissolving the nonmetallocene ligand), then the modified porous carrier was added thereto, and the reaction continued under stirring for 4 hours. After filtrated, washed by hexane for 2 times (25 ml per time), and dried at 25° C. for 2 hours, a supported nonmetallocene catalyst was obtained.

In this step, the concentration by mass of the nonmetallocene ligand was 0.045 g/ml, and the ratio of the nonmetallocene ligand to the porous carrier was 0.193 mmol to 1 g.

The catalyst obtained was named as CAT-I-2, in which the content by mass of Ti was 3.29%, and the content by mass of the nonmetallocene ligand was 0.96%.

Example I-2-1

Substantially the same as the Example I-2, except for the following changes:

A solution of methyl aluminoxane in toluene was dropwise added over a period of 15 minutes, and the reaction continued for 4 hours. Then, TiCl4 was dropwise added over a period of 30 minutes, and the reaction continued for 0.5 hour at 105° C. under stirring. The resultant was filtered and washed by toluene.

In this step, the ratio of TiCl4 to the porous carrier was 20 mmol to 1 g, and the ratio of methyl aluminoxane to the porous carrier was 0.6 mmol to 1 g.

Example I-2-2

Substantially the same as the Example I-2, except for the following changes:

A solution of triethyl aluminum in heptane was dropwise added over a period of 15 minutes, and the reaction continued for 0.5 hour. Then, TiBr4 was dropwise added over a period of 30 minutes, and the reaction continued for 6 hours at 65° C. under stirring. The resultant was filtered and washed by heptane.

In this step, the ratio of TiBr4 to the porous carrier was 35 mmol to 1 g, and the ratio of triethyl aluminum to the porous carrier was 1.5 mmol to 1 g.

Example I-2-3

Substantially the same as the Example I-2, except for the following changes:

A solution of triethyl aluminum in decane was dropwise added over a period of 15 minutes, and the reaction continued for 1 hour. Then, a solution of ZrCl4 in decane was dropwise added over a period of 30 minutes, and the reaction continued for 1 hour at 110° C. under stirring. The resultant was filtered and washed by decane.

In this step, the ratio of ZrCl4 to the porous carrier was 16 mmol to 1 g, and the ratio of triethyl aluminum to the porous carrier was 4 mmol to 1 g.

Example I-2-4

Substantially the same as the Example I-2, except for the following changes:

A solution of triethyl aluminum in pentane was dropwise added over a period of 15 minutes, and the reaction continued for 1 hour. Then, a solution of ZrBr4 in pentane was dropwise added over a period of 30 minutes, and the reaction continued for 8 hours at 30° C. under stirring. The resultant was filtered and washed by xylene.

In this step, the ratio of ZrBr4 to the porous carrier was 6 mmol to 1 g, and the ratio of triethyl aluminum to the porous carrier was 3.1 mmol to 1 g.

Example I-2-5

Substantially the same as the Example I-2, except for the following changes:

Triisobutyl aluminum was dropwise added over a period of 15 minutes, and the reaction continued for 1 hour. Then, TiCl4 was dropwise added over a period of 30 minutes, and the reaction continued for 8 hours at 30° C. under stirring. The resultant was filtered and washed by ethyl benzene.

Example I-2-6

Substantially the same as the Example I-2, except for the following changes:

Triethoxy aluminum was dropwise added over a period of 15 minutes, and the reaction continued for 1 hour. Then, TiCl4 was dropwise added over a period of 30 minutes.

Example I-2-7

Substantially the same as the Example I-2, except for the following changes:

Isobutyl aluminoxane was dropwise added over a period of 15 minutes, and the reaction continued for 1 hour. Then, TiCl4 was dropwise added over a period of 30 minutes.

Example I-2-8

Substantially the same as the Example I-2, except for the following change:

The nonmetallocene ligand was changed to

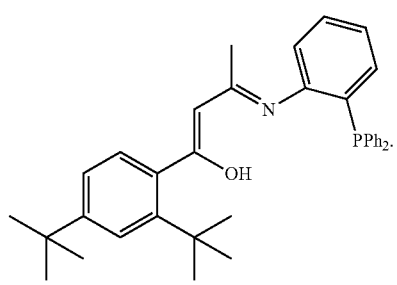

Example I-2-9

Substantially the same as the Example I-2, except for the following change:

The nonmetallocene ligand was changed to

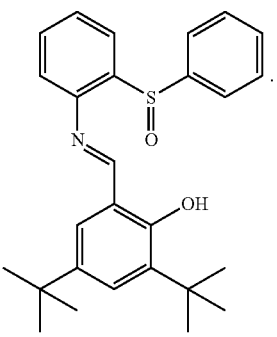

Example I-2-10

Substantially the same as the Example I-2, except for the following change:
The nonmetallocene ligand was changed to

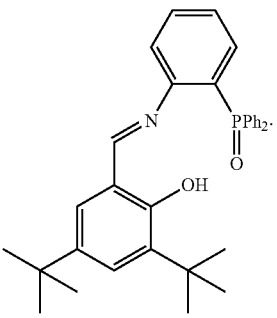

Reference Example I-2-1

Substantially the same as the Example I-2, except for the following changes:
The ratio of the nonmetallocene ligand to the porous carrier was 0.386 mmol to 1 g.
In the obtained supported nonmetallocene catalyst, the content by mass of Ti was 2.87%, and the content by mass of the nonmetallocene ligand was 1.81%.
The catalyst obtained was named as CAT-1-A.
As can be seen from this Reference Example, the same process was used while the content of Ti in the resultant catalyst was reduced, which was achieved by increasing the load of the supported nonmetallocene catalyst on the porous carrier as a result of an increased amount of the nonmetallocene ligand used during the preparation process. The result indicates that by using the process according to this invention, it is possible to freely adjust the load of the nonmetallocene ligand on the porous carrier, from low to high.

Reference Example I-2-2

Substantially the same as the Example I-2, except for the following changes:
The ratio of the nonmetallocene ligand to the porous carrier was 0.064 mmol to 1 g.
In the obtained supported nonmetallocene catalyst, the content by mass of Ti was 3.64%, and the content by mass of the nonmetallocene ligand was 0.45%.

The catalyst obtained was named as CAT-I-B.
As can be seen from this Reference Example, at the same amount of the nonmetallocene ligand to be used, the polymerization activity of the supported nonmetallocene catalyst can be increased by increasing the content of Ti therein, which indicates that by using the process according to this invention, it is possible to freely adjust (preferably, to a high degree) the polymerization activity of the resultant supported nonmetallocene catalyst by altering the amount of the chemical treating agent to be used during the preparation.

Example I-3

A silica gel (ES757, from the Ineos company) was used as the porous carrier, which had been thermally activated at 600° C. under a $N_2$ atmosphere for 4 hours before use.
A nonmetallocene ligand of the structure

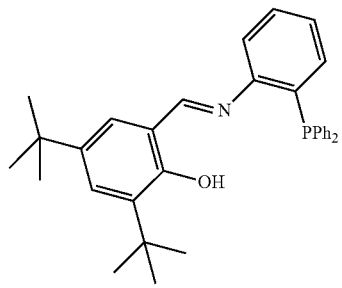

was dissolved in 50 ml hexane (as the solvent for dissolving the nonmetallocene ligand), then 5 g of the thermally activated silica gel was added thereto. The reaction continued for 4 hours at 25° C. under stirring. The resultant was then filtered, washed by hexane for 2 times (25 ml per time), and dried under vacuum at 25° C. for 2 hours, so as to obtain a modified porous carrier.

50 ml hexane was added thereto, then TiCl4 (as the chemical treating agent) was dropwise added thereto over a period of 30 minutes under stirring, and the reaction continued for 4 hours at 60° C. under stirring. The resultant was then filtered, washed by hexane for 3 times (25 ml per time), and dried under vacuum at 25° C. for 6 hours, a supported nonmetallocene catalyst was obtained.

In this example, the ratio of TiCl4 to the porous carrier was 9.4 mmol to 1 g, the concentration by mass of the nonmetallocene ligand was 0.045 g/ml, and the ratio of the nonmetallocene ligand to the porous carrier was 0.193 mmol to 1 g.

The catalyst obtained was named as CAT-I-3.

Example I-3-1

Substantially the same as the Example I-3, except for the following changes:
$Al_2O_3$ was used as the porous carrier, and the thermal activation was conducted at 800° C. under a $N_2$ gas atmosphere for 12 hours.
The ratio of TiCl4 to the porous carrier was 14 mmol to 1 g, and the solvent used was changed to decane.

The nonmetallocene ligand was changed to

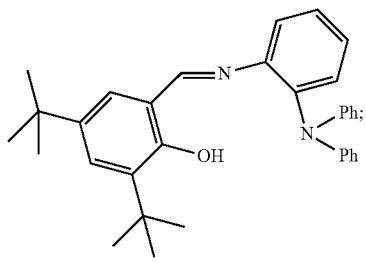

the concentration by mass of the nonmetallocene ligand was 0.12 g/ml;

the ratio of the nonmetallocene ligand to the porous carrier was 0.386 mmol to 1 g; and the solvent for dissolving the nonmetallocene ligand was changed to decane.

Example I-3-2

Substantially the same as the Example I-3, except for the following changes:

Polystyrene having a carboxy group on its surface was used as the porous carrier, and the thermal activation was conducted at 200° C. under a $N_2$ gas atmosphere for 2 hours.

The chemical treating agent was changed to a solution of ZrCl4 in toluene, the ratio of ZrCl4 to the porous carrier was 18.7 mmol to 1 g, and the solvent in this step was changed to toluene.

The nonmetallocene ligand was changed to

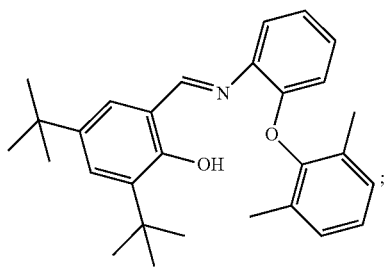

the concentration by mass of the nonmetallocene ligand was 0.16 g/ml;

the ratio of the nonmetallocene ligand to the porous carrier was 0.508 mmol to 1 g; and the solvent for dissolving the nonmetallocene ligand was changed to toluene.

Example I-3-3

Substantially the same as the Example I-3, except for the following changes:

Montmorillonite having a hydroxy group on its surface was used as the porous carrier, and the thermal activation was conducted at 300° C. under a $N_2$ gas atmosphere for 6 hours.

The chemical treating agent was changed to TiBr4, the ratio of TiBr4 to the porous carrier was 5.2 mmol to 1 g, and the solvent in this step was changed to pentane.

The nonmetallocene ligand was changed to

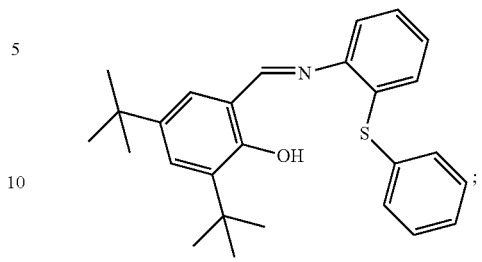

the concentration by mass of the nonmetallocene ligand was 0.02 g/ml;

the ratio of the nonmetallocene ligand to the porous carrier was 0.841 mmol to 1 g; and the solvent for dissolving the nonmetallocene ligand was changed to pentane.

Example I-3-4

Substantially the same as the Example I-3, except for the following changes:

Polypropylene having a hydroxy group on its surface was used as the porous carrier, and the thermal activation was conducted at 200° C. under a $N_2$ gas atmosphere for 2 hours.

The chemical treating agent was changed to ZrBr4, the ratio of ZrBr4 to the porous carrier was 47 mmol to 1 g, and the solvent in this step was changed to dichloro methane.

The nonmetallocene ligand was changed to

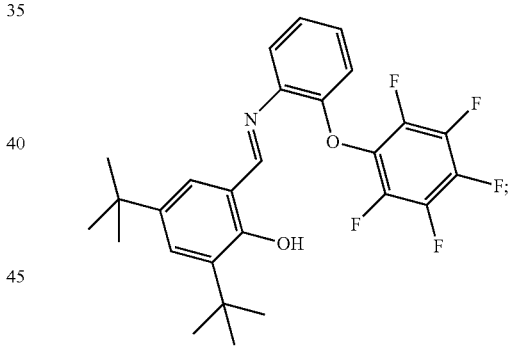

the concentration by mass of the nonmetallocene ligand was 0.28 g/ml;

the ratio of the nonmetallocene ligand to the porous carrier was 0.02 mmol to 1 g; and the solvent for dissolving the nonmetallocene ligand was changed to dichloro methane.

Example I-3-5

Substantially the same as the Example I-3, except for the following changes:

Silica produced by pyrohydrolysis of SiCl4 was used as the porous carrier, and the thermal activation was conducted at 600° C. under a dry $N_2$ gas atmosphere for 8 hours.

The chemical treating agent was changed to tetramethyl titanium, the ratio of tetramethyl titanium to the porous carrier was 15.1 mmol to 1 g, and the solvent in this step was changed to ethyl benzene.

The nonmetallocene ligand was changed to

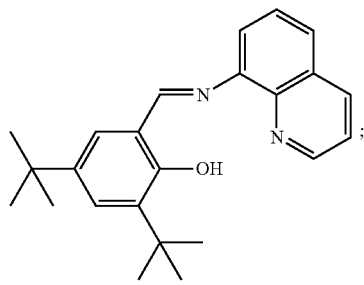

and
the solvent for dissolving the nonmetallocene ligand was changed to ethyl benzene.

Example I-3-6

Substantially the same as the Example I-3, except for the following changes:
TiO2 was used as the porous carrier, and the thermal activation was conducted at 400° C. under a dry Ar gas atmosphere for 4 hours.
The chemical treating agent was changed to tetraethyl titanium, and the solvent in this step was changed to cyclohexane.
The nonmetallocene ligand was changed to

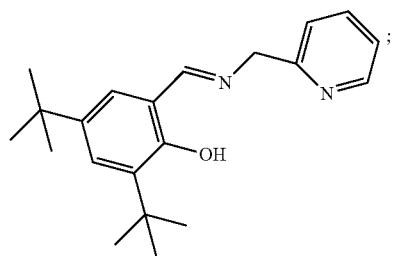

and
the solvent for dissolving the nonmetallocene ligand was changed to cyclohexane.

Example I-3-7

Substantially the same as the Example I-3, except for the following changes:
The MCM-41 molecular sieve was used as the porous carrier, and the thermal activation was conducted at 450° C. under a $N_2$ gas atmosphere for 8 hours.
The chemical treating agent was changed to tetramethoxy titanium, and the solvent in this step was changed to methyl cyclohexane.
The nonmetallocene ligand was changed to

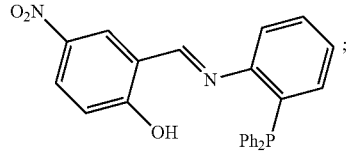

and
the solvent for dissolving the nonmetallocene ligand was changed to methyl cyclohexane.

Example I-3-8

Substantially the same as the Example I-3, except for the following changes:
Kaolin having a hydroxy group on its surface was used as the porous carrier, and the thermal activation was conducted at 250° C. under vacuum for 6 hours.
The chemical treating agent was changed to tetramethyl zirconium.
The nonmetallocene ligand was changed to

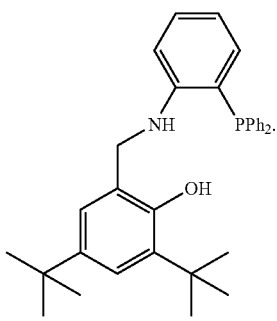

Example I-3-9

Substantially the same as the Example I-3, except for the following changes:
Kieselguhr having a hydroxy group on its surface was used as the porous carrier, and the thermal activation was conducted at 800° C. under a $N_2$ gas atmosphere for 12 hours.
The chemical treating agent was changed to tetramethoxy zirconium.
The nonmetallocene ligand was changed to

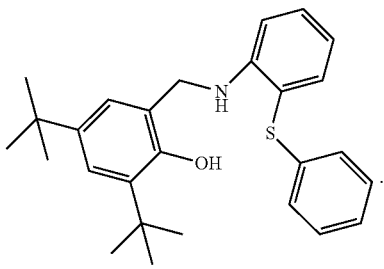

Example I-4

A silica gel (ES757, from the Ineos company) was used as the porous carrier, which had been thermally activated at 600° C. under a $N_2$ atmosphere for 4 hours before use.
To 5 g of the thermally activated silica gel, a solution of triethyl aluminum in hexane was dropwise added over a period of 15 minutes under stirring, and the reaction continued for 1 hour. The resultant was filtered and washed by hexane for 2 times (25 ml per time), to obtain a pre-treated porous carrier.

Then, a solution of the nonmetallocene ligand of the structure

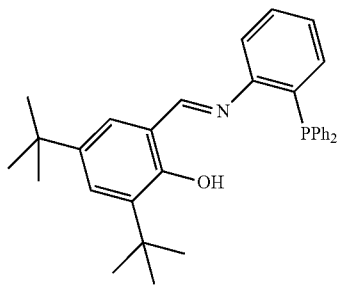

in hexane was added to the pre-treated porous carrier. The reaction continued for 2 hours under stirring. The resultant was then filtered, washed by hexane for 2 times (25 ml per time), and dried at 25° C. for 2 hours, so as to obtain a modified porous carrier.

50 ml hexane was added thereto, then TiCl4 (as the chemical treating agent) was dropwise added thereto over a period of 30 minutes under stirring, and the reaction continued for 4 hours at 60° C. under stirring. The resultant was then filtered, washed by hexane for 3 times (25 ml per time), and dried at the room temperature for 4 hours, a supported nonmetallocene catalyst was obtained.

In this example, the ratio of TiCl4 to the porous carrier was 9.4 mmol to 1 g, and the ratio of triethyl aluminum to the porous carrier was 1 mmol to 1 g.

The concentration by mass of the nonmetallocene ligand was 0.045 g/ml, and the ratio of the nonmetallocene ligand to the porous carrier was 0.193 mmol to 1 g.

The catalyst obtained was named as CAT-I-4.

Example I-4-1

Substantially the same as the Example I-4, except for the following changes:

A solution of methyl aluminoxane in toluene was dropwise added over a period of 15 minutes, and the reaction continued for 4 hours. Then, TiCl4 was dropwise added over a period of 30 minutes, and the reaction continued for 0.5 hour at 105° C. under stirring. The resultant was filtered and washed by toluene.

In this step, the ratio of TiCl4 to the porous carrier was 20 mmol to 1 g, and the ratio of methyl aluminoxane to the porous carrier was 0.6 mmol to 1 g.

Example I-4-2

Substantially the same as the Example I-4, except for the following changes:

A solution of triethyl aluminum in heptane was dropwise added over a period of 15 minutes, and the reaction continued for 0.5 hour. Then, TiBr4 was dropwise added over a period of 30 minutes, and the reaction continued for 6 hours at 65° C. under stirring. The resultant was filtered and washed by heptane.

In this step, the ratio of TiBr4 to the porous carrier was 35 mmol to 1 g, and the ratio of triethyl aluminum to the porous carrier was 1.5 mmol to 1 g.

Example I-4-3

Substantially the same as the Example I-4, except for the following changes:

A solution of triethyl aluminum in decane was dropwise added over a period of 15 minutes, and the reaction continued for 1 hour. Then, a solution of ZrCl4 in decane was dropwise added over a period of 30 minutes, and the reaction continued for 1 hour at 110° C. under stirring. The resultant was filtered and washed by decane.

In this step, the ratio of ZrCl4 to the porous carrier was 16 mmol to 1 g, and the ratio of triethyl aluminum to the porous carrier was 4 mmol to 1 g.

Example I-4-4

Substantially the same as the Example I-4, except for the following changes:

A solution of triethyl aluminum in pentane was dropwise added over a period of 15 minutes, and the reaction continued for 1 hour. Then, a solution of ZrBr4 in pentane was dropwise added over a period of 30 minutes, and the reaction continued for 8 hours at 30° C. under stirring. The resultant was filtered and washed by xylene.

In this step, the ratio of ZrBr4 to the porous carrier was 6 mmol to 1 g, and the ratio of triethyl aluminum to the porous carrier was 3.1 mmol to 1 g.

Example I-4-5

Substantially the same as the Example I-4, except for the following changes:

Triisobutyl aluminum was dropwise added over a period of 15 minutes, and the reaction continued for 1 hour. Then, TiCl4 was dropwise added over a period of 30 minutes, and the reaction continued for 8 hours at 30° C. under stirring. The resultant was filtered and washed by ethyl benzene.

Example I-4-6

Substantially the same as the Example I-4, except for the following changes:

Triethoxy aluminum was dropwise added over a period of 15 minutes, and the reaction continued for 1 hour. Then, TiCl4 was dropwise added over a period of 30 minutes.

Example I-4-7

Substantially the same as the Example I-4, except for the following changes:

Isobutyl aluminoxane was dropwise added over a period of 15 minutes, and the reaction continued for 1 hour. Then, TiCl4 was dropwise added over a period of 30 minutes.

Example I-4-8

Substantially the same as the Example I-4, except for the following change:

The nonmetallocene ligand was changed to

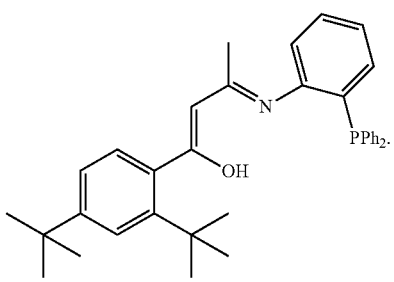

Example I-4-9

Substantially the same as the Example I-4, except for the following change:

The nonmetallocene ligand was changed to

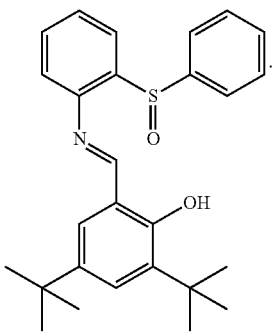

Example I-4-10

Substantially the same as the Example I-4, except for the following change:
The nonmetallocene ligand was changed to

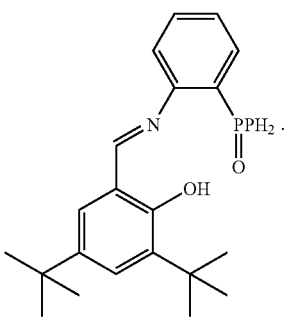

Example I-5 (Application)

The catalysts CAT-I-1, CAT-I-2, CAT-I-3, and CAT-I-4 produced according to the Examples and the catalysts CAT-I-A and CAT-I-B produced according to the Reference Examples were each used for ethylene homopolymerization under the following conditions.

Reactor: 2 L autoclave for polymerization;
Polymerization method: slurry polymerization;
Conditions: 1 L hexane as the solvent, the total polymerization pressure of 0.8 MPa, the polymerization temperature of 85° C., the partial pressure of hydrogen gas of 0.2 MPa, and the polymerization time of 2 hours.

1 L hexane was added to the autoclave, and the stirring means was started. A mixture of the supported nonmetallocene catalyst and a co-catalyst was added thereto, then hydrogen gas was supplied thereto up to 0.2 MPa, and finally ethylene was supplied continuously thereto to keep the total polymerization pressure at 0.8 MPa. After the polymerization, the inside of the autoclave was vented to the atmosphere, and the thus produced polymer product was discharged and weighed for its weight (by mass) after drying. The results of the polymerization were listed in the following Table I-1.

TABLE I-1

| No. | Catalyst No. | Co-catalyst | Ratio by molar of Al to Ti | Poly activity (kgPE/gCat) | Bulk density (g/cm$^3$) |
|---|---|---|---|---|---|
| 1 | CAT-I-1 | triethyl aluminum | 140 | 1.04 | 0.20 |
| 2 | CAT-I-1 | methyl aluminoxane | 100 | 1.62 | 0.27 |
| 3 | CAT-I-2 | triethyl aluminum | 140 | 1.51 | 0.25 |
| 4 | CAT-I-2 | triethyl aluminum | 500 | 1.58 | 0.25 |
| 5 | CAT-I-2 | methyl aluminoxane | 100 | 1.94 | 0.30 |
| 6 | CAT-I-2 | methyl aluminoxane | 250 | 2.07 | 0.31 |
| 7 | CAT-I-A | triethyl aluminum | 140 | 1.25 | 0.25 |
| 8 | CAT-I-B | triethyl aluminum | 140 | 2.34 | 0.25 |
| 9 | CAT-I-3 | triethyl aluminum | 140 | 2.67 | 0.28 |
| 10 | CAT-I-3 | methyl aluminoxane | 100 | 3.41 | 0.31 |
| 11 | CAT-I-4 | triethyl aluminum | 140 | 3.94 | 0.31 |
| 12 | CAT-I-4 | methyl aluminoxane | 100 | 5.22 | 0.33 |

As can be seen from a comparison of the results obtained with the experiment Nos. 3 and 4 (or 5 and 6) in the Table I-1, when the amount of the co-catalyst to be used was increased, i.e., the ratio by molar of aluminum to titanium was increased, the polymerization activity of the supported nonmetallocene catalyst and the bulk density of the polymer product did not change to a substantial degree. This fact indicates that, if the supported nonmetallocene catalyst according to this invention is used for olefin polymerization, high polymerization activity can be achieved at a comparatively less amount of the co-catalyst. Further, the polymer product (for example polyethylene) thus obtained is characterized by desirable polymer morphology and high polymer bulk density.

Further, as can be seen from a comparison of the results obtained with the experiment Nos. 9 and 1 (or 11 and 3) in the Table I-1, by using the process according to this invention, a supported nonmetallocene catalyst having comparatively higher polymerization activity can be obtained when the nonmetallocene ligand is added prior to the chemical treating agent.

Still further, as can be seen from a comparison of the results obtained with the experiment Nos. 1 and 2 (or 3 and 5, or 9 and 10, or 11 and 12) in the Table I-1, use of methyl aluminoxane as the co-catalyst is favorable for obtaining a polymer product having a comparatively high bulk density.

Example II-1

A silica gel (ES757, from the Ineos company) was used as the porous carrier, which had been thermally activated at 600° C. under a $N_2$ atmosphere for 4 hours before use. Anhydrous magnesium chloride was used as the magnesium compound, ethanol was used as the alcohol, and TiCl4 was used as the chemical treating agent.

5 g of the anhydrous magnesium chloride was weighted, and tetrahydrofuran and anhydrous ethanol were added thereto. The mixture was heated to 60° C. to form a homogeneous solution. Then, 10 g of the thermally activated silica gel was added to the thus obtained solution when it was still warm. After stirred sufficiently, the thus obtained mixture was allowed to stand for 12 hours. Then, the mixture was dried at 90° C. under vacuum, so as to obtain 19.6 g of a Mg-treated porous carrier.

5 g of the Mg-treated porous carrier was weighted, and 50 ml hexane as the solvent in this step was added thereto. Then, TiCl4 (as the chemical treating agent) was dropwise added thereto over a period of 30 minutes under stirring, and was reacted for 4 hours at 60° C. under stirring. The resultant was then filtered, washed by hexane for 3 times (25 ml per time), and dried at 90° C. for 4 hours, so as to obtain a modified porous carrier.

A nonmetallocene ligand of the structure

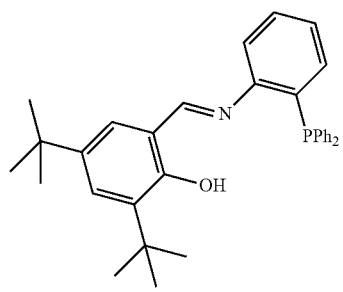

was dissolved in hexane (as the solvent for dissolving the nonmetallocene ligand), then the modified porous carrier was added thereto, and the reaction continued under stirring for 4 hours. After filtrated, washed by hexane for 2 times (25 ml per time), and dried at 25° C. for 4 hours, a supported nonmetallocene catalyst was obtained.

In this example, the ratio by molar of magnesium chloride to tetrahydrofuran was 1:14, the ratio by molar of magnesium chloride to ethanol was 1:3.5, the ratio by mass of magnesium chloride to the porous carrier was 1:2, the ratio by molar of TiCl4 to the nonmetallocene ligand was 1:0.5, the concentration by mass of the nonmetallocene ligand was 0.05 g/ml, and the ratio by mass of the nonmetallocene ligand to the Mg-treated porous carrier was 0.15:1.

The catalyst obtained was named as CAT-II-1, in which the content by mass of Ti was 2.94%, and the content by mass of the nonmetallocene ligand was 0.87%.

Example II-1-1

Substantially the same as the Example II-1, except for the following changes:

$Al_2O_3$ was used as the porous carrier, and the thermal activation was conducted at 700° C. under a $N_2$ gas atmosphere for 6 hours.

The magnesium compound was changed to magnesium bromide, the alcohol was changed to butanol, and the chemical treating agent was changed to TiBr4.

The nonmetallocene ligand was changed to

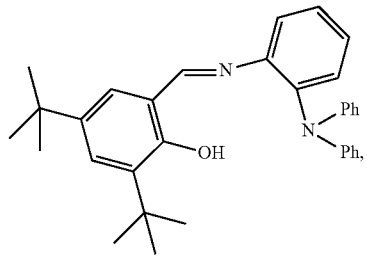

and the solvent for dissolving the nonmetallocene ligand was changed to decane.

In this example, the ratio by molar of magnesium bromide to tetrahydrofuran was 1:20, the ratio by molar of magnesium bromide to butanol was 1:2, the ratio by mass of magnesium bromide to the porous carrier was 1:1, the ratio by molar of TiBr4 to the nonmetallocene ligand was 1:0.3, the concentration by mass of the nonmetallocene ligand was 0.11 g/ml, and the ratio by mass of the nonmetallocene ligand to the Mg-treated porous carrier was 0.22:1.

Example II-1-2

Substantially the same as the Example II-1, except for the following changes:

The molecular sieve was used as the porous carrier, and the thermal activation was conducted at 450° C. under an Ar gas atmosphere for 4 hours.

The magnesium compound was changed to ethoxy magnesium chloride ($MgCl(OC_2H_5)$), the alcohol was changed to phenyl ethanol, and the chemical treating agent was changed to $ZrCl_4$.

The nonmetallocene ligand was changed to

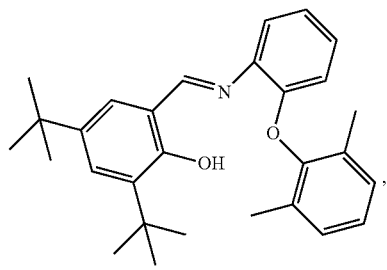

and the solvent for dissolving the nonmetallocene ligand was changed to dichloro methane.

In this example, the ratio by molar of the magnesium compound to tetrahydrofuran was 1:12, the ratio by molar of the magnesium compound to the alcohol was 1:1, the ratio by mass of the magnesium compound to the porous carrier was 1:1.7, the ratio by molar of the chemical treating agent to the nonmetallocene ligand was 1:0.8, the concentration by mass of the nonmetallocene ligand was 0.15 g/ml, and the ratio by mass of the nonmetallocene ligand to the Mg-treated porous carrier was 0.30:1.

Example II-1-3

Substantially the same as the Example II-1, except for the following changes:

TiO2 was used as the porous carrier, and the thermal activation was conducted at 550° C. under an Ar gas atmosphere for 2 hours.

The magnesium compound was changed to ethoxy magnesium (Mg(OC2H5)2), the alcohol was changed to ethyl cyclo hexanol, and the chemical treating agent was changed to tetramethyl titanium.

The nonmetallocene ligand was changed to and the solvent for dissolving the nonmetallocene ligand was changed to cyclohexane.

In this example, the ratio by molar of the magnesium compound to tetrahydrofuran was 1:16, the ratio by molar of the magnesium compound to the alcohol was 1:3, the ratio by mass of the magnesium compound to the porous carrier was 1:0.5, the ratio by molar of the chemical treating agent to the nonmetallocene ligand was 1:0.4, the concentration by mass of the nonmetallocene ligand was 0.02 g/ml, and the ratio by mass of the nonmetallocene ligand to the Mg-treated porous carrier was 0.48:1.

Example II-1-4

Substantially the same as the Example II-1, except for the following changes:

Montmorillonite was used as the porous carrier, and the thermal activation was conducted at 400° C. under a $N_2$ gas atmosphere for 8 hours.

The magnesium compound was changed to ethyl magnesium chloride (Mg(C2H5)Cl), the alcohol was changed to trichloro methanol, and the chemical treating agent was changed to tetramethoxy titanium.

The nonmetallocene ligand was changed to and the solvent for dissolving the nonmetallocene ligand was changed to toluene.

In this example, the ratio by molar of the magnesium compound to tetrahydrofuran was 1:12, the ratio by molar of the magnesium compound to the alcohol was 1:1, the ratio by mass of the magnesium compound to the porous carrier was 1:3.4, the ratio by molar of the chemical treating agent to the nonmetallocene ligand was 1:0.5, the concentration by mass of the nonmetallocene ligand was 0.28 g/ml, and the ratio by mass of the nonmetallocene ligand to the Mg-treated porous carrier was 0.05:1.

Example II-1-5

Substantially the same as the Example II-1, except for the following changes:

A $SiO_2$—$Al_2O_3$ composite oxide (containing 60% by mass of $SiO_2$) was used as the porous carrier, and the thermal activation was conducted at 600° C. under a $N_2$ gas atmosphere for 12 hours.

The magnesium compound was changed to isobutoxy magnesium (Mg(i-OC4H9)2), the alcohol was changed to ethylene glycol ethyl ether, and the chemical treating agent was changed to tetramethoxy zirconium.

The nonmetallocene ligand was changed to and the solvent for dissolving the nonmetallocene ligand was changed to xylene.

In this example, the concentration by mass of the nonmetallocene ligand was 0.05 g/ml, and the ratio by mass of the nonmetallocene ligand to the Mg-treated porous carrier was 0.10:1.

Example II-1-6

Substantially the same as the Example II-1, except for the following changes:

A silica gel obtained by pyrohydrolysis of SiCl4 was used as the porous carrier, and the thermal activation was conducted at 650° C. under an Ar gas atmosphere for 6 hours.

The magnesium compound was changed to ethyl magnesium (Mg(C2H5)2).

The nonmetallocene ligand was changed to and the solvent for dissolving the nonmetallocene ligand was changed to cyclohexane.

Example II-1-7

Substantially the same as the Example II-1, except for the following changes:

Spherical polystyrene was used as the porous carrier, and the thermal activation was conducted at 200° C. under a nitrogen gas atmosphere for 8 hours.

The magnesium compound was changed to isobutyl magnesium (Mg(i-C4H9)2).

The nonmetallocene ligand was changed to

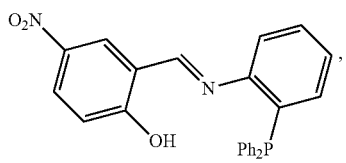

and the solvent for dissolving the nonmetallocene ligand was changed to methyl cyclohexane.

Reference Example II-1-1

Substantially the same as the Example II-1, except for the following changes:

The ratio by mass of the nonmetallocene ligand to the Mg-treated porous carrier was 0.20:1.

In the obtained supported nonmetallocene catalyst, the content by mass of Ti was 2.77%, and the content by mass of the nonmetallocene ligand was 1.52%.

The catalyst obtained was named as CAT-II-A.

As can be seen from this Reference Example, the same process was used while the content of Ti in the resultant catalyst was reduced, which was achieved by increasing the load of the supported nonmetallocene catalyst on the porous carrier as a result of an increased amount of the nonmetallocene ligand used during the preparation process. The result indicates that by using the process according to this invention, it is possible to freely adjust the load of the nonmetallocene ligand on the porous carrier, from low to high.

Reference Example II-1-2

Substantially the same as the Example II-1, except for the following changes:

The ratio by mass of the nonmetallocene ligand to the Mg-treated porous carrier was 0.05:1.

In the obtained supported nonmetallocene catalyst, the content by mass of Ti was 3.00%, and the content by mass of the nonmetallocene ligand was 0.91%.

The catalyst obtained was named as CAT-II-B.

As can be seen from this Reference Example, at the same amount of the nonmetallocene ligand to be used, the polymerization activity of the supported nonmetallocene catalyst can be increased by increasing the content of Ti therein, which indicates that by using the process according to this invention, it is possible to freely adjust (preferably, to a high degree) the polymerization activity of the resultant supported nonmetallocene catalyst by altering the amount of the chemical treating agent to be used during the preparation.

Example II-2

Substantially the same as the Example II-1, except for the following changes:

In the following examples, a composite chemical treating agent was used, which referred to the combination of a chemical treating agent and an assistant chemical treating agent.

The composite chemical treating agent was a combination of TiCl4 (as the chemical treating agent) and triethyl aluminum (as the assistant chemical treating agent).

A solution of triethyl aluminum in hexane was dropwise added to react for 1.5 hours. The resultant was then filtered, and washed by 50 ml hexane for 1 time. Then, TiCl4 was dropwise added thereto over a period of 30 minutes, and the reaction continued for 2 hours at 60° C. under stirring. The resultant was then filtered, washed by hexane for 3 times (25 ml per time), and dried at 90° C. under vacuum for 4 hours, so as to obtain a modified porous carrier.

A nonmetallocene ligand of the structure

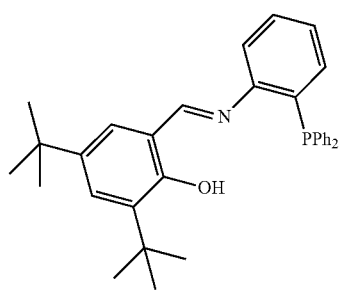

was dissolved in hexane (as the solvent for dissolving the nonmetallocene ligand), then the modified porous carrier was added thereto, and the reaction continued under stirring for 4 hours. After filtrated, washed by hexane for 2 times (25 ml per time), and dried at 25° C. for 4 hours, a supported nonmetallocene catalyst was obtained.

In this example, the ratio by molar of the chemical treating agent to the nonmetallocene ligand was 1:0.5, the ratio of the assistant chemical treating agent to the Mg-treated porous carrier was 1 mmol to 1 g, the concentration by mass of the nonmetallocene ligand was 0.05 g/ml, and the ratio by mass of the nonmetallocene ligand to the Mg-treated porous carrier was 0.15 to 1.

The catalyst obtained was named as CAT-II-2, in which the content by mass of Ti was 3.08%.

Example II-2-1

Substantially the same as the Example II-2, except for the following changes:

The Mg-treated porous carrier was prepared according to the Example II-1-1.

The nonmetallocene ligand was changed to

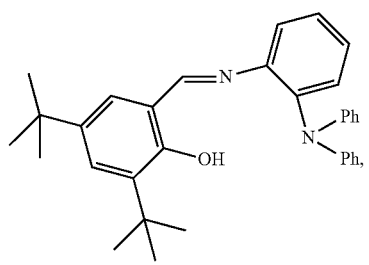

and the solvent for dissolving the nonmetallocene ligand was changed to cyclohexane.

The composite chemical treating agent was a combination of TiCl4 (as the chemical treating agent) and methyl aluminoxane (as the assistant chemical treating agent).

A solution of methyl aluminoxane in toluene was dropwise added to react for 1.5 hours. The resultant was filtered, and washed by pentane for 1 time. Then, TiCl4 was dropwise added over a period of 30 minutes.

In this example, the ratio by molar of the chemical treating agent to the nonmetallocene ligand was 1:0.5, the ratio of the assistant chemical treating agent to the Mg-treated porous carrier was 0.6 mmol: 1 g, the concentration by mass of the nonmetallocene ligand was 0.02 g/ml, and the ratio by mass of the nonmetallocene ligand to the Mg-treated porous carrier was 0.48:1.

Example II-2-2

Substantially the same as the Example II-2, except for the following changes:

The Mg-treated porous carrier was prepared according to the Example II-1-2.

The nonmetallocene ligand was changed to

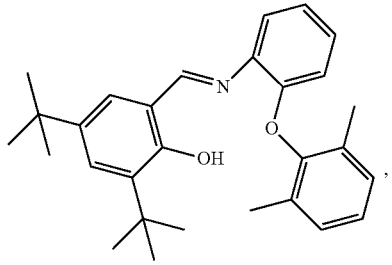

and the solvent for dissolving the nonmetallocene ligand was changed to toluene.

The composite chemical treating agent was a combination of TiCl4 (as the chemical treating agent) and isobutyl aluminoxane (as the assistant chemical treating agent).

A solution of isobutyl aluminoxane in toluene was dropwise added to react for 1.5 hours. The resultant was filtered, and washed by toluene for 1 time. Then, TiCl4 was dropwise added.

In this example, the ratio by molar of the chemical treating agent to the nonmetallocene ligand was 1:0.3, the ratio of the assistant chemical treating agent to the Mg-treated porous carrier was 1.5 mmol:1 g, the concentration by mass of the nonmetallocene ligand was 0.28 g/ml, and the ratio by mass of the nonmetallocene ligand to the Mg-treated porous carrier was 0.05:1.

Example II-2-3

Substantially the same as the Example II-2, except for the following changes:

The Mg-treated porous carrier was prepared according to the Example II-1-3.

The nonmetallocene ligand was changed to

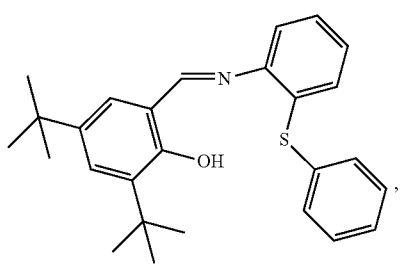

and the solvent for dissolving the nonmetallocene ligand was changed to xylene.

The composite chemical treating agent was a combination of TiCl4 (as the chemical treating agent) and triethyl aluminum (as the assistant chemical treating agent).

A solution of triethyl aluminum in hexane was dropwise added to react for 1.5 hours. The resultant was filtered, and washed by xylene for 1 time. Then, TiCl4 was dropwise added.

In this example, the ratio by molar of the chemical treating agent to the nonmetallocene ligand was 1:0.7, the ratio of the assistant chemical treating agent to the Mg-treated porous carrier was 0.54 mmol:1 g, the concentration by mass of the nonmetallocene ligand was 0.05 g/ml, and the ratio by mass of the nonmetallocene ligand to the Mg-treated porous carrier was 0.10:1.

Example II-2-4

Substantially the same as the Example II-2, except for the following changes:

The Mg-treated porous carrier was prepared according to the Example II-1-4.

The nonmetallocene ligand was changed to

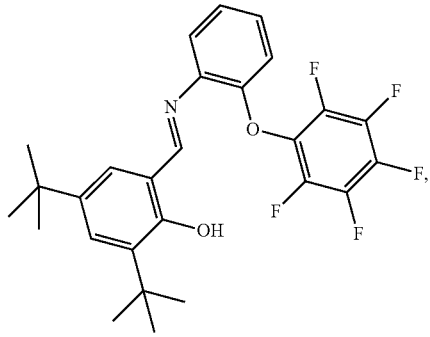

and the solvent for dissolving the nonmetallocene ligand was changed to chloro hexane.

The composite chemical treating agent was a combination of TiCl4 (as the chemical treating agent) and triisobutyl aluminum (as the assistant chemical treating agent).

A solution of triisobutyl aluminum in hexane was dropwise added to react for 1.5 hours. The resultant was filtered, and washed by chloro hexane for 1 time. Then, TiCl4 was dropwise added.

In this example, the ratio by molar of the chemical treating agent to the nonmetallocene ligand was 1:0.9, and the ratio of the assistant chemical treating agent to the Mg-treated porous carrier was 2 mmol:1 g.

Example II-2-5

Substantially the same as the Example II-2, except for the following changes:

The Mg-treated porous carrier was prepared according to the Example II-1-5.

The nonmetallocene ligand was changed to

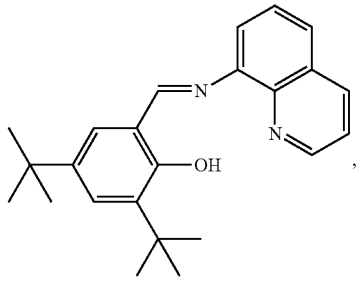

and the solvent for dissolving the nonmetallocene ligand was changed to methyl cyclohexane.

The composite chemical treating agent was a combination of ZrCl4 (as the chemical treating agent) and methyl aluminoxane (as the assistant chemical treating agent).

A solution of methyl aluminoxane in toluene was dropwise added to react for 1.5 hours. The resultant was filtered, and washed by methyl cyclohexane for 1 time. Then, a solution of ZrCl4 in toluene was dropwise added.

In this example, the ratio by molar of the chemical treating agent to the nonmetallocene ligand was 1:0.6, and the ratio of the assistant chemical treating agent to the Mg-treated porous carrier was 3 mmol:1 g.

Example II-2-6

Substantially the same as the Example II-2, except for the following changes:

The Mg-treated porous carrier was prepared according to the Example II-1-6.

The nonmetallocene ligand was changed to

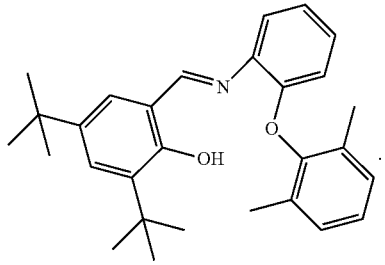

The composite chemical treating agent was a combination of ZrCl4 (as the chemical treating agent) and triethyl aluminum (as the assistant chemical treating agent).

A solution of triethyl aluminum in hexane was dropwise added to react for 1.5 hours. The resultant was filtered, and washed by chlorohexane for 1 time. Then, a solution of ZrCl4 in toluene was dropwise added.

Example II-2-7

Substantially the same as the Example II-2, except for the following changes:

The Mg-treated porous carrier was prepared according to the Example II-1-7.

The nonmetallocene ligand was changed to

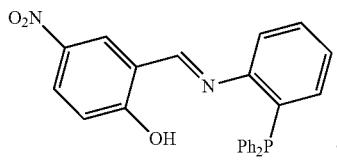

The composite chemical treating agent was a combination of tetraethyl titanium (as the chemical treating agent) and triethyl aluminum (as the assistant chemical treating agent).

A solution of triethyl aluminum in hexane was dropwise added to react for 1.5 hours. The resultant was filtered, and washed by cyclohexane for 1 time. Then, a solution of tetraethyl titanium in cyclohexane was dropwise added.

Example II-3

The Mg-treated porous carrier was prepared according to the Example II-1.

A nonmetallocene ligand of the structure

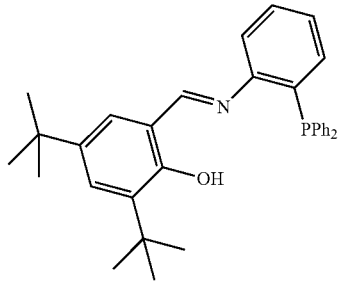

was dissolved in 50 ml hexane (as the solvent for dissolving the nonmetallocene ligand), then 5 g of the Mg-treated porous carrier was added thereto, and the reaction continued under stirring for 4 hours at 25° C. After filtrated, washed by hexane for 2 times (25 ml per time), and dried at 25° C. under vacuum for 2 hours.

Then, 50 ml hexane was added thereto, and TiCl4 (as the chemical treating agent) was dropwise added thereto over a period of 30 minutes under stirring, and was reacted for 4 hours at 60° C. under stirring. The resultant was then filtered, washed by hexane for 3 times (25 ml per time), and dried at 25° C. under vacuum for 6 hours, so as to obtain a supported nonmetallocene catalyst.

In this example, the ratio by molar of the chemical treating agent to the nonmetallocene ligand was 1:0.5, the concentration by mass of the nonmetallocene ligand was 0.05 g/ml, and the ratio by mass of the nonmetallocene ligand to the Mg-treated porous carrier was 0.15:1.

The catalyst obtained was named as CAT-II-3, in which the content by mass of Ti was 3.27%.

Example II-3-1

Substantially the same as the Example II-3, except for the following changes:

The Mg-treated porous carrier was prepared according to the Example II-1-1.

The nonmetallocene ligand was changed to

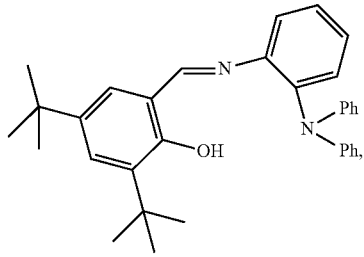

and the solvent for dissolving the nonmetallocene ligand was changed to decane.

The chemical treating agent was changed to TiBr4.

In this example, the ratio by molar of the chemical treating agent to the nonmetallocene ligand was 1:0.3, the concentration by mass of the nonmetallocene ligand was 0.11 g/ml, and the ratio by mass of the nonmetallocene ligand to the Mg-treated porous carrier was 0.22:1.

Example II-3-2

Substantially the same as the Example II-3, except for the following changes:

The Mg-treated porous carrier was prepared according to the Example II-1-2.

The nonmetallocene ligand was changed to

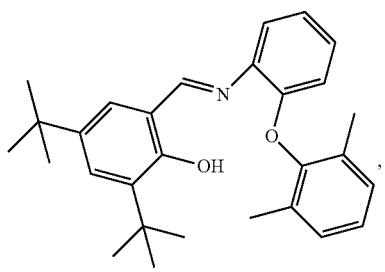

and the solvent for dissolving the nonmetallocene ligand was changed to dichloro methane.

The chemical treating agent was changed to ZrCl4, which was previously dissolved in toluene as a solution containing same at 10% by mass.

In this example, the ratio by molar of the chemical treating agent to the nonmetallocene ligand was 1:0.8, the concentration by mass of the nonmetallocene ligand was 0.15 g/ml, and the ratio by mass of the nonmetallocene ligand to the Mg-treated porous carrier was 0.30:1.

Example II-3-3

Substantially the same as the Example II-3, except for the following changes:

The Mg-treated porous carrier was prepared according to the Example II-1-3.

The nonmetallocene ligand was changed to

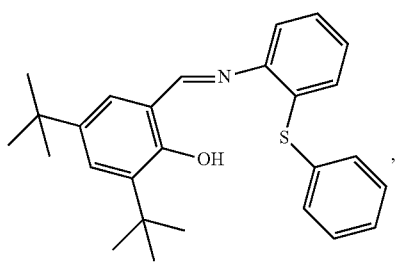

and the solvent for dissolving the nonmetallocene ligand was changed to cyclohexane.

The chemical treating agent was changed to tetramethyl titanium.

In this example, the ratio by molar of the chemical treating agent to the nonmetallocene ligand was 1:0.4, the concentration by mass of the nonmetallocene ligand was 0.02 g/ml, and the ratio by mass of the nonmetallocene ligand to the Mg-treated porous carrier was 0.48:1.

Example II-3-4

Substantially the same as the Example II-3, except for the following changes:

The Mg-treated porous carrier was prepared according to the Example II-1-4.

The nonmetallocene ligand was changed to

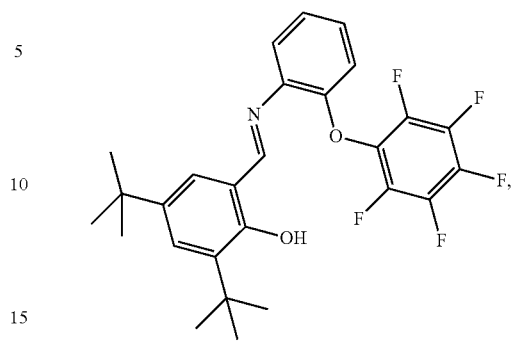

and the solvent for dissolving the nonmetallocene ligand was changed to toluene.

The chemical treating agent was changed to tetramethoxy titanium.

In this example, the ratio by molar of the chemical treating agent to the nonmetallocene ligand was 1:0.5, the concentration by mass of the nonmetallocene ligand was 0.28 g/ml, and the ratio by mass of the nonmetallocene ligand to the Mg-treated porous carrier was 0.05:1.

Example II-3-5

Substantially the same as the Example II-3, except for the following changes:

The Mg-treated porous carrier was prepared according to the Example II-1-5.

The nonmetallocene ligand was changed to

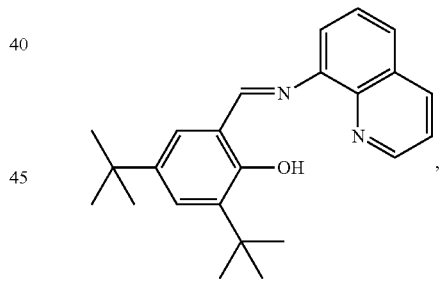

and the solvent for dissolving the nonmetallocene ligand was changed to xylene.

The chemical treating agent was changed to tetramethoxy zirconium.

In this example, the concentration by mass of the nonmetallocene ligand was 0.05 g/ml, and the ratio by mass of the nonmetallocene ligand to the Mg-treated porous carrier was 0.10:1.

Example II-3-6

Substantially the same as the Example II-3, except for the following changes:

The Mg-treated porous carrier was prepared according to the Example II-1-6.

The nonmetallocene ligand was changed to

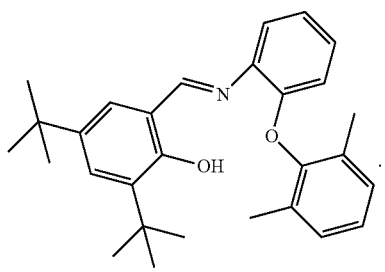

and the solvent for dissolving the nonmetallocene ligand was changed to cyclohexane.

Example II-3-7

Substantially the same as the Example II-3, except for the following changes:

The Mg-treated porous carrier was prepared according to the Example II-1-7.

The nonmetallocene ligand was changed to

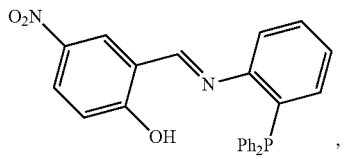

and the solvent for dissolving the nonmetallocene ligand was changed to methyl cyclohexane.

Example II-4

The Mg-treated porous carrier was prepared according to the Example II-1.

The composite chemical treating agent was a combination of TiCl4 (as the chemical treating agent) and triethyl aluminum (as the assistant chemical treating agent).

A solution of triethyl aluminum in hexane was dropwise added to the Mg-treated porous carrier over a period of 15 minutes to react for 1 hour. The resultant was filtered, and washed by hexane for 2 time (25 ml per time). Then, a solution of the nonmetallocene ligand of the structure

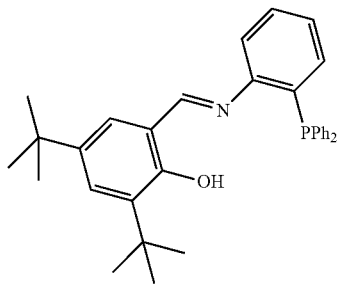

in hexane (as the solvent for dissolving the nonmetallocene ligand) was added thereto, and the reaction continued under stirring for 2 hours. After filtrated, washed by hexane for 2 times (25 ml per time), and dried at 25° C. for 2 hours.

Then, 50 ml hexane was added thereto, and TiCl4 was dropwise added thereto over a period of 30 minutes under stirring, and was reacted for 4 hours at 60° C. under stirring. The resultant was then filtered, washed by hexane for 3 times (25 ml per time), and dried at the room temperature for 4 hours, so as to obtain a supported nonmetallocene catalyst.

In this example, the ratio of the assistant chemical treating agent to the Mg-treated porous carrier was 1 mmol:1 g, the concentration by mass of the nonmetallocene ligand was 0.05 g/ml, the ratio by mass of the nonmetallocene ligand to the Mg-treated porous carrier was 0.15:1, and the ratio by molar of the chemical treating agent to the nonmetallocene ligand was 1:0.5.

The catalyst obtained was named as CAT-II-4, in which the content by mass of Ti was 3.23%.

Example II-4-1

Substantially the same as the Example II-4, except for the following changes:

The Mg-treated porous carrier was prepared according to the Example II-1-1.

The composite chemical treating agent was a combination of TiCl4 (as the chemical treating agent) and methyl aluminoxane (as the assistant chemical treating agent).

A solution of methyl aluminoxane in toluene was dropwise added, then the resultant was filtered, washed by toluene, and dried. Then, the nonmetallocene ligand was added.

The nonmetallocene ligand was changed to

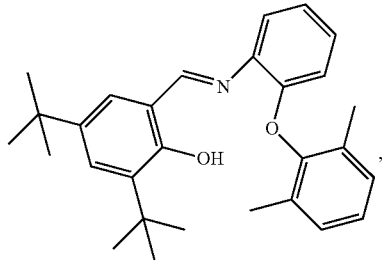

and the solvent for dissolving the nonmetallocene ligand was changed to cyclohexane.

In this example, the ratio of the assistant chemical treating agent to the Mg-treated porous carrier was 0.5 mmol:1 g, the concentration by mass of the nonmetallocene ligand was 0.02 g/ml, the ratio by mass of the nonmetallocene ligand to the Mg-treated porous carrier was 0.48:1, and the ratio by molar of the chemical treating agent to the nonmetallocene ligand was 1:0.48.

Example II-4-2

Substantially the same as the Example II-4, except for the following changes:

The Mg-treated porous carrier was prepared according to the Example II-1-2.

The composite chemical treating agent was a combination of TiCl4 (as the chemical treating agent) and isobutyl aluminoxane (as the assistant chemical treating agent).

A solution of isobutyl aluminoxane in toluene was dropwise added first.

The nonmetallocene ligand was changed to

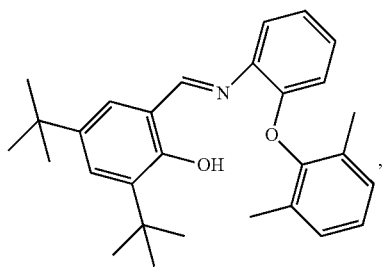

and the solvent for dissolving the nonmetallocene ligand was changed to toluene.

In this example, the ratio of the assistant chemical treating agent to the Mg-treated porous carrier was 1.2 mmol:1 g, the concentration by mass of the nonmetallocene ligand was 0.28 g/ml, the ratio by mass of the nonmetallocene ligand to the Mg-treated porous carrier was 0.05:1, and the ratio by molar of the chemical treating agent to the nonmetallocene ligand was 1:0.3.

Example II-4-3

Substantially the same as the Example II-4, except for the following changes:

The Mg-treated porous carrier was prepared according to the Example II-1-3.

The composite chemical treating agent was a combination of TiCl4 (as the chemical treating agent) and triethyl aluminum (as the assistant chemical treating agent).

A solution of triethyl aluminum in hexane was dropwise added first.

The nonmetallocene ligand was changed to

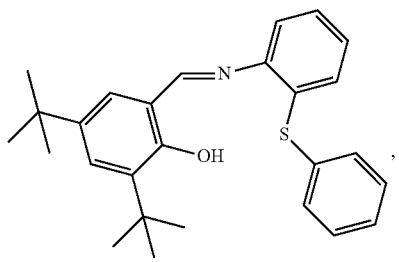

and the solvent for dissolving the nonmetallocene ligand was changed to xylene.

In this example, the ratio of the assistant chemical treating agent to the Mg-treated porous carrier was 2 mmol:1 g, the concentration by mass of the nonmetallocene ligand was 0.05 g/ml, the ratio by mass of the nonmetallocene ligand to the Mg-treated porous carrier was 0.10:1, and the ratio by molar of the chemical treating agent to the nonmetallocene ligand was 1:0.7.

Example II-4-4

Substantially the same as the Example II-4, except for the following changes:

The Mg-treated porous carrier was prepared according to the Example II-1-4.

The composite chemical treating agent was a combination of TiCl4 (as the chemical treating agent) and triisobutyl aluminum (as the assistant chemical treating agent).

A solution of triisobutyl aluminum in hexane was dropwise added first.

The nonmetallocene ligand was changed to

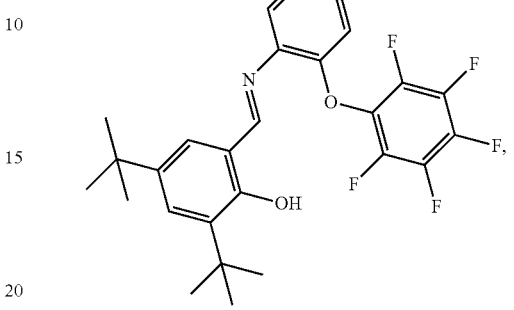

and the solvent for dissolving the nonmetallocene ligand was changed to chloro hexane.

Example II-4-5

Substantially the same as the Example II-4, except for the following changes:

The Mg-treated porous carrier was prepared according to the Example II-1-5.

The composite chemical treating agent was a combination of ZrCl4 (as the chemical treating agent) and methyl aluminoxane (as the assistant chemical treating agent).

A solution of methyl aluminoxane in toluene was dropwise added to react for 1.5 hours, then the resultant was filtered, and washed by methyl cyclohexane for 1 time.

The nonmetallocene ligand was changed to

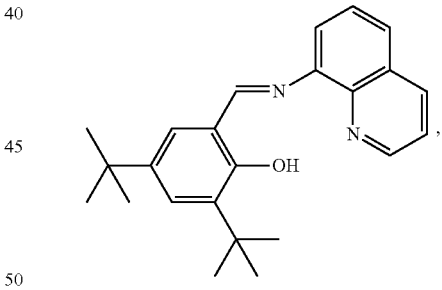

and the solvent for dissolving the nonmetallocene ligand was changed to methyl cyclohexane.

Example II-4-6

Substantially the same as the Example II-4, except for the following changes:

The Mg-treated porous carrier was prepared according to the Example II-1-6.

The composite chemical treating agent was a combination of ZrCl4 (as the chemical treating agent) and triethyl aluminum (as the assistant chemical treating agent).

A solution of triethyl aluminum in hexane was dropwise added to react for 1.5 hours, then the resultant was filtered, washed by chloro hexane for 1 time, and dried under vacuum for 2 hours.

The nonmetallocene ligand was changed to

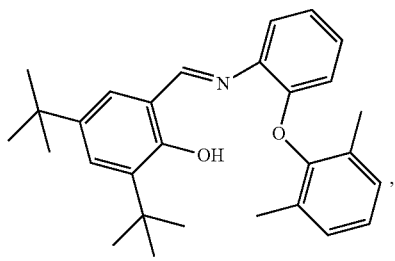

and the solvent for dissolving the nonmetallocene ligand was changed to chloro hexane.

Example II-4-7

Substantially the same as the Example II-4, except for the following changes:

The Mg-treated porous carrier was prepared according to the Example II-1-7.

The composite chemical treating agent was a combination of tetraethyl titanium (as the chemical treating agent) and triethyl aluminum (as the assistant chemical treating agent).

A solution of triethyl aluminum in hexane was dropwise added to react for 1.5 hours, then the resultant was filtered, washed by cyclohexane for 1 time, and dried under vacuum for 2 hours. Then, a solution of tetraethyl titanium in cyclohexane was dropwise added.

The nonmetallocene ligand was changed to

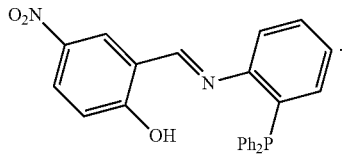

Example II-5

Application

The catalysts CAT-II-1, CAT-II-2, CAT-II-3, and CAT-II-4 produced according to the Examples and the catalysts CAT-II-A and CAT-II-B produced according to the Reference Examples were each used for ethylene homopolymerization under the following conditions.

Reactor: 2 L autoclave for polymerization;

Polymerization method: slurry polymerization;

Conditions: 1 L hexane as the solvent, the total polymerization pressure of 0.8 MPa, the polymerization temperature of 85° C., the partial pressure of hydrogen gas of 0.2 MPa, and the polymerization time of 2 hours.

1 L hexane was added to the autoclave, and the stirring means was started. A mixture of the supported nonmetallocene catalyst and a co-catalyst was added thereto, then hydrogen gas was supplied thereto up to 0.2 MPa, and finally ethylene was supplied continuously thereto to keep the total polymerization pressure at 0.8 MPa. After the polymerization, the inside of the autoclave was vented to the atmosphere, and the thus produced polymer product was discharged and weighed for its weight (by mass) after drying. The results of the polymerization were listed in the following Table II-1.

When conducting copolymerization of ethylene with other olefins (i.e., comonomer), the conditions were the same as aforesaid for the homopolymerization except for the followings.

After ethylene has been supplied for 5 minutes, the commoner(s) was pumped all at once into the polymerization by a metering pump at a predetermined amount, i.e., 1 g of the commoner per 1 mg of the supported nonmetallocene catalyst.

TABLE II-1

| No. | Catalyst No. | Co-catalyst | Poly type | Comonomer | Ratio by molar of Al to Ti | Poly activity (kgPE/gCat) | Bulk density (g/cm$^3$) |
|---|---|---|---|---|---|---|---|
| 1 | CAT-II-1 | triethyl aluminum | homopolymerization | | 140 | 6.44 | 0.33 |
| 2 | CAT-II-1 | triethyl aluminum | homopolymerization | | 500 | 6.53 | 0.33 |
| 3 | CAT-II-1 | triethyl aluminum | copolymerization | butylene-1 | 140 | 7.73 | 0.35 |
| 4 | CAT-II-1 | triethyl aluminum | copolymerization | Hexylene-1 | 140 | 7.51 | 0.36 |
| 5 | CAT-II-1 | methyl aluminoxane | homopolymerization | | 100 | 7.27 | 0.35 |
| 6 | CAT-II-1 | methyl aluminoxane | homopolymerization | | 250 | 7.42 | 0.35 |
| 7 | CAT-II-2 | triethyl aluminum | homopolymerization | | 140 | 6.84 | 0.33 |
| 8 | CAT-II-2 | triethyl aluminum | copolymerization | butylene-1 | 140 | 8.12 | 0.35 |
| 9 | CAT-II-2 | methyl aluminoxane | homopolymerization | | 100 | 7.95 | 0.35 |
| 10 | CAT-II-3 | triethyl aluminum | homopolymerization | | 140 | 7.11 | 0.34 |
| 11 | CAT-II-3 | triethyl aluminum | copolymerization | butylene-1 | 140 | 8.67 | 0.37 |
| 12 | CAT-II-3 | methyl aluminoxane | homopolymerization | | 100 | 7.85 | 0.37 |
| 13 | CAT-II-4 | triethyl aluminum | homopolymerization | | 140 | 8.31 | 0.36 |
| 14 | CAT-II-4 | triethyl aluminum | copolymerization | butylene-1 | 140 | 9.27 | 0.39 |

TABLE II-1-continued

| No. | Catalyst No. | Co-catalyst | Poly type | Comonomer | Ratio by molar of Al to Ti | Poly activity (kgPE/gCat) | Bulk density (g/cm³) |
|---|---|---|---|---|---|---|---|
| 15 | CAT-II-4 | methyl aluminoxane | homopolymerization | | 100 | 8.88 | 0.40 |
| 16 | CAT-II-A | triethyl aluminum | homopolymerization | | 140 | 6.01 | 0.33 |
| 17 | CAT-II-A | triethyl aluminum | copolymerization | butylene-1 | 140 | 7.04 | 0.35 |
| 18 | CAT-II-B | triethyl aluminum | homopolymerization | | 140 | 6.74 | 0.33 |
| 19 | CAT-II-B | triethyl aluminum | copolymerization | butylene-1 | 140 | 7.26 | 0.34 |

As can be seen from a comparison of the results obtained with the experiment Nos. 1 and 2 (or 5 and 6) in the Table II-1, when the amount of the co-catalyst (for example, triethyl aluminum or methyl aluminoxane) to be used was increased, i.e., the ratio by molar of aluminum to titanium was increased, the polymerization activity of the supported nonmetallocene catalyst and the bulk density of the polymer product did not change to a substantial degree. This fact indicates that, if the supported nonmetallocene catalyst according to this invention is used for olefin polymerization, high polymerization activity can be achieved at a comparatively less amount of the co-catalyst. Further, the polymer product (for example polyethylene) thus obtained is characterized by desirable polymer morphology and high polymer bulk density.

Further, as can be seen from a comparison of the results obtained with the experiment Nos. 3, 4 and 1 (or 8 and 7, or 11 and 10, or 17 and 16, or 19 and 18) in the Table II-1, the supported nonmetallocene catalyst according to this invention boasts a high copolymerization effect. That is to say, under the same polymerization conditions, the copolymerization activity of the catalyst is higher than its homopolymerization activity, and under the same polymerization conditions, the bulk density of the resultant copolymer is higher than that of the homopolymer.

Still further, as can be seen from a comparison of the results obtained with the experiment Nos. 16, 17 with 1, 3, or 18, 19 and 1, 3 with CAT-II-A and CAT-II-1, and CAT-II-B and CAT-II-1, the homopolymerization activity of the CAT-II-A is lower than that of the CAT-II-1, however, increment in the copolymerization effect is higher than the latter. Then, the homopolymerization activity of the CAT-II-B is higher than that of the CAT-II-1, however, increment in the copolymerization effect is lower than the latter. The fact indicates that the nonmetallocene ligand plays a main part in the copolymerization effect, while the polymerization activity depends mainly on the content of the active metal in the supported nonmetallocene catalyst.

Example III-1

A silica gel (ES757, from the Ineos company) was used as the porous carrier, which had been thermally activated at 600° C. under a N₂ atmosphere for 4 hours before use.

5 g of anhydrous magnesium chloride (as the magnesium compound) was weighted, and a mixed solvent of tetrahydrofuran and ethanol (as the alcohol) was added thereto. The mixture was heated to 60° C. under stirring for 1.5 hours to form a solution. Then, the thermally activated silica gel was added to the thus obtained solution. After stirred at 60° C. for 2 hours to form a transparent system, hexane (as the precipitating agent) was added thereto to precipitate the solid. The resultant was filtered, washed for 1 time by 50 ml hexane, and dried by suction so as to obtain a Mg-treated porous carrier.

50 ml of hexane as the solvent in this step was added to the Mg-treated porous carrier. Then, TiCl4 (as the chemical treating agent) was dropwise added thereto over a period of 30 minutes under stirring, and was reacted for 4 hours at 60° C. under stirring. The resultant was then filtered, washed by hexane for 3 times (25 ml per time), and dried at 90° C. for 2 hours, so as to obtain a modified porous carrier.

A nonmetallocene ligand of the structure

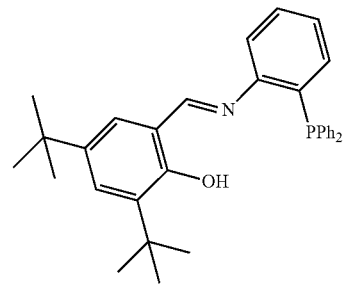

was dissolved in hexane (as the solvent for dissolving the nonmetallocene ligand), then the modified porous carrier was added thereto, and the reaction continued under stirring for 4 hours. After filtrated, washed by hexane for 2 times (25 ml per time), and dried at 25° C. for 2 hours, a supported nonmetallocene catalyst was obtained.

In this example, the ratio by molar of the magnesium compound to tetrahydrofuran was 1:12, the ratio by molar of the magnesium compound to the alcohol was 1:4, the ratio by volume of the precipitating agent to tetrahydrofuran was 1:1.25, the ratio by mass of the magnesium compound to the porous carrier was 1:1, the ratio by molar of the chemical treating agent to the magnesium compound was 0.2, the concentration by mass of the nonmetallocene ligand was 0.05 g/ml, and the ratio by molar of the nonmetallocene ligand to the magnesium compound was 1:3.

The catalyst obtained was named as CAT-III-1.

Example III-1-1

Substantially the same as the Example III-1, except for the following changes:

The magnesium compound was changed to magnesium bromide, the alcohol was changed to propanol, and the precipitating agent was changed to decane. Then, the washing was performed by using decane for 3 times.

The nonmetallocene ligand was changed to

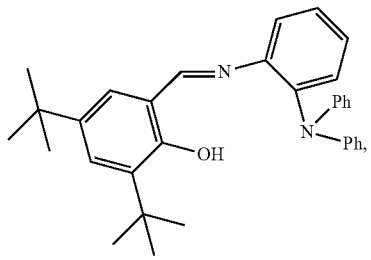

and the solvent for dissolving the nonmetallocene ligand was changed to toluene.

In this example, the ratio by molar of the magnesium compound to tetrahydrofuran was 1:40, the ratio by molar of the magnesium compound to the alcohol was 1:5.7, the ratio by volume of the precipitating agent to tetrahydrofuran was 1:2, the ratio by mass of the magnesium compound to the porous carrier was 1:2, the ratio by molar of the chemical treating agent to the magnesium compound was 0.45, the concentration by mass of the nonmetallocene ligand was 0.05 g/ml, and the ratio by molar of the nonmetallocene ligand to the magnesium compound was 1:2.7.

Example III-1-2

Substantially the same as the Example III-1, except for the following changes:

The magnesium compound was changed to diethoxy magnesium, the alcohol was changed to butanol, and the precipitating agent was changed to pentane. Then, the washing was performed by using pentane for 3 times.

The chemical treating agent was changed to ZrCl4, which was previously dissolved in toluene.

The nonmetallocene ligand was changed to

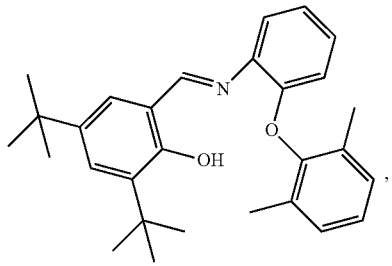

and the solvent for dissolving the nonmetallocene ligand was changed to dichloro methane.

In this example, the ratio by mass of the magnesium compound to the porous carrier was 1:4, the ratio by molar of the magnesium compound to tetrahydrofuran was 1:20, the ratio by molar of the magnesium compound to the alcohol was 1:2, the ratio by volume of the precipitating agent to tetrahydrofuran was 1:4, the ratio by molar of the chemical treating agent to the magnesium compound was 0.26, the concentration by mass of the nonmetallocene ligand was 0.15 g/ml, and the ratio by molar of the nonmetallocene ligand to the magnesium compound was 1:3.5.

Example III-1-3

Substantially the same as the Example III-1, except for the following changes:

The magnesium compound was changed to diethyl magnesium, the alcohol was changed to hexanol, and the precipitating agent was changed to cyclohexane. Then, the washing was performed by using cyclohexane.

The chemical treating agent was changed to TiBr4.

The nonmetallocene ligand was changed to

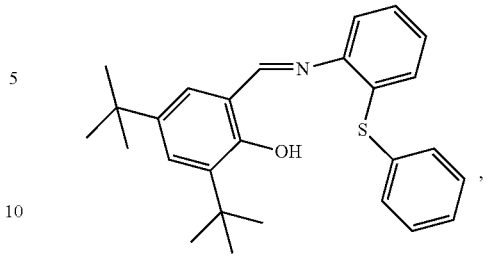

and the solvent for dissolving the nonmetallocene ligand was changed to cyclohexane.

In this example, the ratio by mass of the magnesium compound to the porous carrier was 1:3, the ratio by molar of the magnesium compound to tetrahydrofuran was 1:14, the ratio by molar of the magnesium compound to the alcohol was 1:3.5, the ratio by volume of the precipitating agent to tetrahydrofuran was 1:4, the ratio by molar of the chemical treating agent to the magnesium compound was 0.15, the concentration by mass of the nonmetallocene ligand was 0.02 g/ml, and the ratio by molar of the nonmetallocene ligand to the magnesium compound was 1:6.

Example III-1-4

Substantially the same as the Example III-1, except for the following changes:

The magnesium compound was changed to dibutyl magnesium, the alcohol was changed to heptanol, and the chemical treating agent was changed to ZrBr4.

The nonmetallocene ligand was changed to

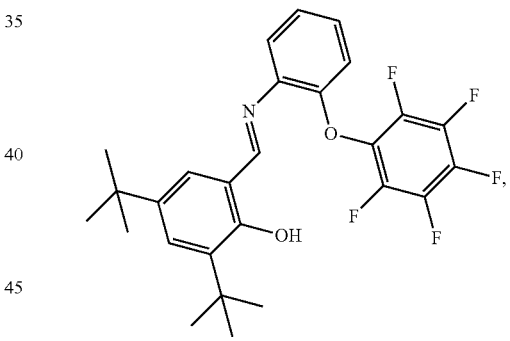

and the solvent for dissolving the nonmetallocene ligand was changed to ethyl benzene.

In this example, the ratio by mass of the magnesium compound to the porous carrier was 1:3, the ratio by molar of the magnesium compound to tetrahydrofuran was 1:10, the ratio by molar of the magnesium compound to the alcohol was 1:4, the ratio by volume of the precipitating agent to tetrahydrofuran was 1:1, the ratio by molar of the chemical treating agent to the magnesium compound was 0.22, the concentration by mass of the nonmetallocene ligand was 0.28 g/ml, and the ratio by molar of the nonmetallocene ligand to the magnesium compound was 1:1.

Example III-1-5

Substantially the same as the Example III-1, except for the following changes:

The magnesium compound was changed to methoxy magnesium, and the alcohol was changed to cyclohexanol.

The nonmetallocene ligand was changed to

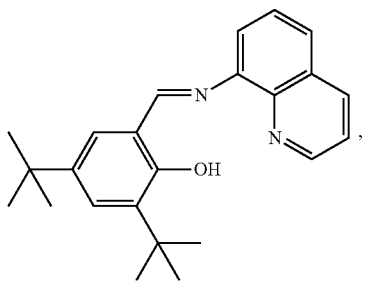

and the solvent for dissolving the nonmetallocene ligand was changed to xylene.

Example III-1-6

Substantially the same as the Example III-1, except for the following changes:
The magnesium compound was changed to ethyl magnesium chloride, and the alcohol was changed to phenyl butanol.
The nonmetallocene ligand was changed to

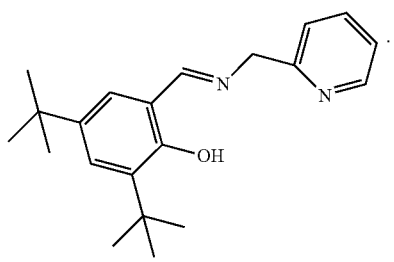

Example III-1-7

Substantially the same as the Example III-1, except for the following changes:
Al2O3 was used as the porous carrier, which had been thermally activated at 800° C. under a $N_2$ atmosphere for 12 hours.
The alcohol was changed to cyclohexanol.
The nonmetallocene ligand was changed to

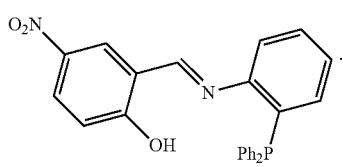

Example III-1-8

Substantially the same as the Example III-1, except for the following changes:
Polystyrene having a carboxy group on its surface was used as the porous carrier, and the thermal activation was conducted at 200° C. under a $N_2$ gas atmosphere for 2 hours.
The alcohol was changed to methyl cyclohexanol.

The nonmetallocene ligand was changed to

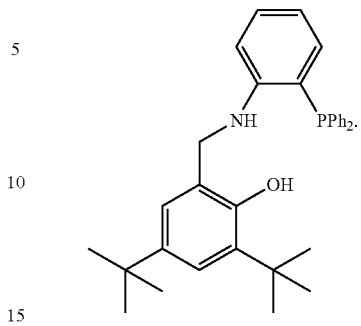

Example III-1-9

Substantially the same as the Example III-1, except for the following changes:
Montmorillonite having a hydroxy group on its surface was used as the porous carrier, and the thermal activation was conducted at 300° C. under a $N_2$ gas atmosphere for 6 hours.
The magnesium compound was changed to propoxy magnesium, and the alcohol was changed to phenyl ethanol.
The nonmetallocene ligand was changed to

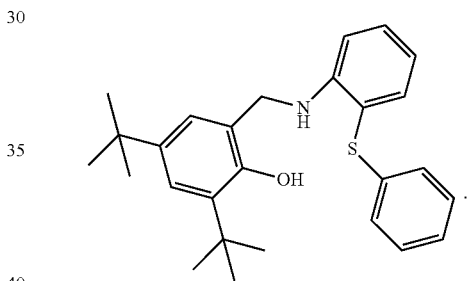

Example III-1-10

Substantially the same as the Example III-1, except for the following changes:
Silica produced by pyrohydrolysis of SiCl4 was used as the porous carrier, and the thermal activation was conducted at 600° C. under a dry $N_2$ gas atmosphere for 8 hours.
The magnesium compound was changed to butoxy magnesium, and the alcohol was changed to heptanol.
The nonmetallocene ligand was changed to

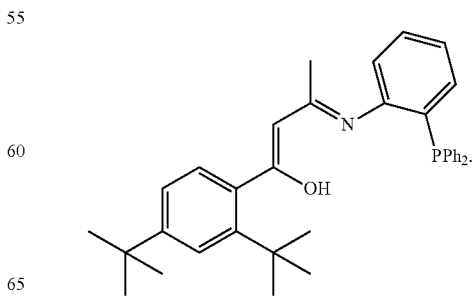

Example III-1-11

Substantially the same as the Example III-1, except for the following changes:

TiO2 was used as the porous carrier, and the thermal activation was conducted at 400° C. under a dry Ar gas atmosphere for 4 hours.

The magnesium compound was changed to methyl magnesium chloride, and the alcohol was changed to phenyl propanol.

The nonmetallocene ligand was changed to

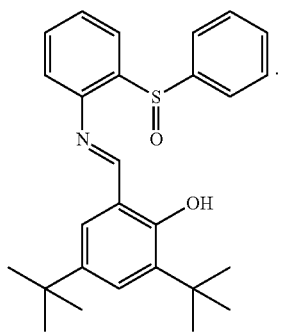

Example III-1-12

Substantially the same as the Example III-1, except for the following changes:

The MCM-41 molecular sieve was used as the porous carrier, and the thermal activation was conducted at 450° C. under a $N_2$ gas atmosphere for 8 hours.

The magnesium compound was changed to ethyl magnesium chloride, and the alcohol was changed to phenyl butanol.

The nonmetallocene ligand was changed to

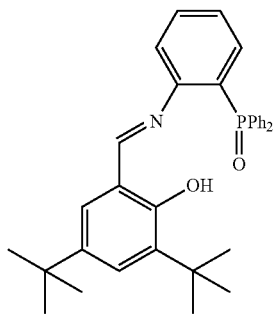

Example III-1-13

Substantially the same as the Example III-1, except for the following changes:

The magnesium compound was changed to propyl magnesium chloride, and the alcohol was changed to phenyl pentanol.

The nonmetallocene ligand was changed to

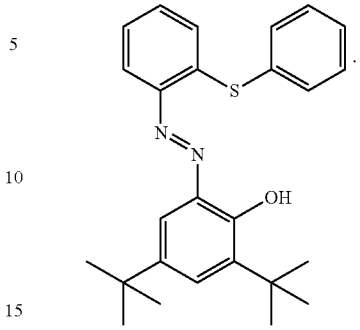

Example III-1-14

Substantially the same as the Example III-1, except for the following changes:

The magnesium compound was changed to butyl magnesium chloride.

The nonmetallocene ligand was changed to

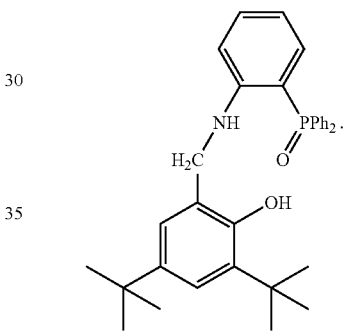

Example III-2

A silica gel (ES757, from the Ineos company) was used as the porous carrier, which had been thermally activated at 600° C. under a $N_2$ atmosphere for 4 hours before use.

5 g of anhydrous magnesium chloride (as the magnesium compound) was weighted, and a mixed solvent of tetrahydrofuran and ethanol (as the alcohol) was added thereto. The mixture was heated to 60° C. under stirring for 1.5 hours to form a solution. Then, the thermally activated silica gel was added to the thus obtained solution. After stirred at 60° C. for 2 hours to form a transparent system, hexane (as the precipitating agent) was added thereto to precipitate the solid. The resultant was filtered, washed for 1 time by 50 ml hexane, and dried by suction so as to obtain a Mg-treated porous carrier.

In the following examples, a composite chemical treating agent was used, which referred to the combination of a chemical treating agent and an assistant chemical treating agent.

To the Mg-treated porous carrier, a solution of triethyl aluminum (as the assistant chemical treating agent) in hexane was dropwise added under stirring over a period of 15 minutes, and the reaction continued for 1 hour. Then, TiCl4 (as the chemical treating agent) was dropwise added thereto over a period of 30 minutes, and the reaction continued for 2 hours at 60° C. under stirring. The resultant was then filtered, washed by hexane for 3 times (30 ml per time), and dried at 25° C. for 6 hours, so as to obtain a modified porous carrier.

A nonmetallocene ligand of the structure

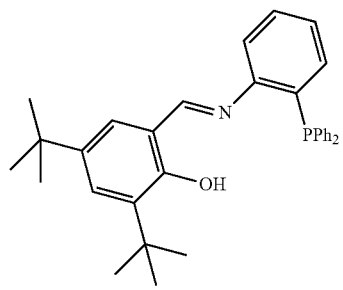

was dissolved in hexane (as the solvent for dissolving the nonmetallocene ligand), then the modified porous carrier was added thereto, and the reaction continued under stirring for 4 hours. After filtrated, washed by hexane for 2 times (25 ml per time), and dried at 25° C. for 2 hours, a supported nonmetallocene catalyst was obtained.

In this example, the ratio by mass of the magnesium compound to the porous carrier was 1:1, the ratio by molar of the magnesium compound to tetrahydrofuran was 1:12, the ratio by molar of the magnesium compound to the alcohol was 1:4, the ratio by volume of the precipitating agent to tetrahydrofuran was 1:1.25, the ratio by molar of the chemical treating agent to the magnesium compound was 0.2, the ratio of the assistant chemical treating agent to the Mg-treated porous carrier was 1 mmol/1 g, the concentration by mass of the nonmetallocene ligand was 0.05 g/ml, and the ratio by molar of the nonmetallocene ligand to the magnesium compound was 1:3.

The catalyst obtained was named as CAT-III-2, in which the content by mass of Ti was 2.86%, and the content by mass of the nonmetallocene ligand was 0.9%.

Example III-2-1

Substantially the same as the Example III-2, except for the following changes:

A solution of methyl aluminoxane in toluene was dropwise added to react for 4 hours. Then, TiCl4 was dropwise added. The reaction continued for 0.5 hour at 105° C. under stirring, then the resultant was filtered, and washed by toluene.

In this example, the ratio of the assistant chemical treating agent to the Mg-treated porous carrier was 2 mmol/1 g.

The nonmetallocene ligand was changed to

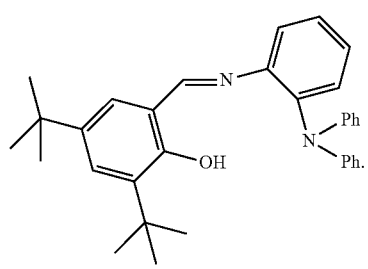

Example III-2-2

Substantially the same as the Example III-2, except for the following changes:

A solution of triethyl aluminum in heptane was dropwise added to react for 0.5 hour. Then, TiBr4 was dropwise added. The reaction continued for 6 hours at 65° C. under stirring, then the resultant was filtered, and washed by heptane.

In this example, the ratio of the assistant chemical treating agent to the Mg-treated porous carrier was 4 mmol/1 g.

The nonmetallocene ligand was changed to

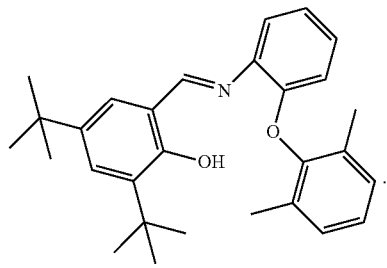

Example III-2-3

Substantially the same as the Example III-2, except for the following changes:

A solution of triethyl aluminum in decane was dropwise added. Then, a solution of ZrCl4 in decane was dropwise added. The reaction continued for 1 hour at 110° C. under stirring, then the resultant was filtered, and washed by decane.

In this example, the ratio of the assistant chemical treating agent to the Mg-treated porous carrier was 0.25 mmol/1 g.

The nonmetallocene ligand was changed to

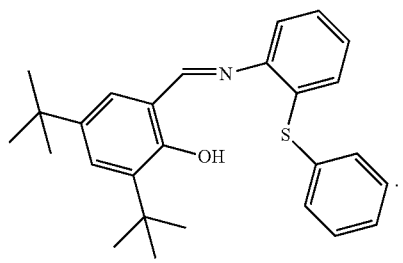

Example III-2-4

Substantially the same as the Example III-2, except for the following changes:

A solution of triethyl aluminum in pentane was dropwise added. Then, a solution of ZrBr4 in xylene was dropwise added. The reaction continued for 8 hours at 30° C. under stirring, then the resultant was filtered, and washed by xylene.

The nonmetallocene ligand was changed to

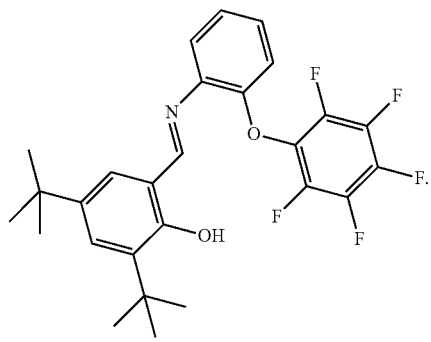

Example III-2-5

Substantially the same as the Example III-2, except for the following changes:

Triisobutyl aluminum was dropwise added, and then TiCl4. The reaction continued for 8 hours at 30° C. under stirring, then the resultant was filtered, and washed by ethyl benzene.

The nonmetallocene ligand was changed to

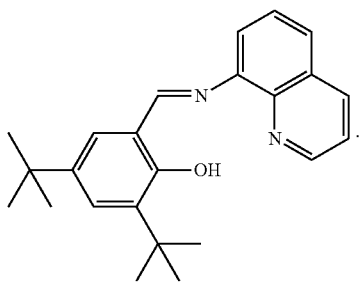

Example III-2-6

Substantially the same as the Example III-2, except for the following changes:

Triethoxy aluminum was dropwise added, and then TiCl4. The nonmetallocene ligand was changed to

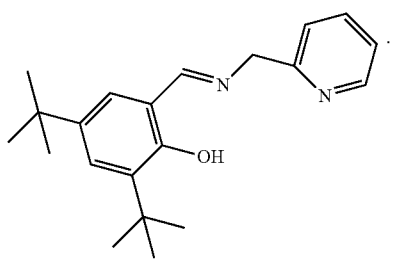

Example III-2-7

Substantially the same as the Example III-2, except for the following changes:

Isobutyl aluminoxane was dropwise added, and then TiCl4.

The nonmetallocene ligand was changed to

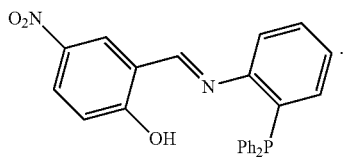

Reference Example III-2-1

Substantially the same as the Example III-2, except for the following changes:

The ratio by molar of the nonmetallocene ligand to the magnesium compound was 1:1.5.

In the obtained supported nonmetallocene catalyst, the content by mass of Ti was 2.27%, and the content by mass of the nonmetallocene ligand was 1.77%.

The catalyst obtained was named as CAT-III-A.

As can be seen from this Reference Example, the same process was used while the content of Ti in the resultant catalyst was reduced, which was achieved by increasing the load of the supported nonmetallocene catalyst on the porous carrier as a result of an increased amount of the nonmetallocene ligand used during the preparation process. The result indicates that by using the process according to this invention, it is possible to freely adjust the load of the nonmetallocene ligand on the porous carrier, from low to high.

Reference Example III-2-2

Substantially the same as the Example III-2, except for the following changes:

The ratio by molar of the nonmetallocene ligand to the magnesium compound was 1:6.

In the obtained supported nonmetallocene catalyst, the content by mass of Ti was 2.93%, and the content by mass of the nonmetallocene ligand was 0.42%.

The catalyst obtained was named as CAT-III-B.

As can be seen from this Reference Example, at the same amount of the nonmetallocene ligand to be used, the polymerization activity of the supported nonmetallocene catalyst can be increased by increasing the content of Ti therein, which indicates that by using the process according to this invention, it is possible to freely adjust (preferably, to a high degree) the polymerization activity of the resultant supported nonmetallocene catalyst by altering the amount of the chemical treating agent to be used during the preparation.

Example III-3

A silica gel (ES757, from the Ineos company) was used as the porous carrier, which had been thermally activated at 600° C. under a $N_2$ atmosphere for 4 hours before use.

5 g of anhydrous magnesium chloride (as the magnesium compound) was weighted, and a mixed solvent of tetrahydrofuran and ethanol (as the alcohol) was added thereto. The mixture was heated to 60° C. under stirring for 1.5 hours to form a solution. Then, the thermally activated silica gel was added to the thus obtained solution. After stirred at 60° C. for 2 hours to form a transparent system, hexane (as the precipitating agent) was added thereto to precipitate the solid. The resultant was filtered, washed for 1 time by 50 ml hexane, and dried by suction so as to obtain a Mg-treated porous carrier.

A nonmetallocene ligand of the structure

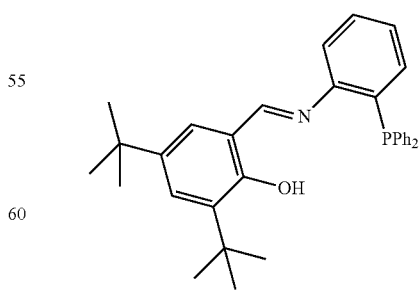

was dissolved in hexane (as the solvent for dissolving the nonmetallocene ligand), then the Mg-treated porous carrier was added thereto, and the reaction continued under stirring for 2 hours. After filtrated, washed by hexane for 2 times (25 ml per time), and dried at 25° C. for 2 hours.

Then, 50 ml hexane was added thereto, and TiCl4 was dropwise added thereto over a period of 30 minutes under stirring, and was reacted for 4 hours at 60° C. under stirring. The resultant was then filtered, washed by hexane for 3 times (25 ml per time), and dried at the room temperature for 4 hours, so as to obtain a supported nonmetallocene catalyst.

In this example, the ratio by mass of the magnesium compound to the porous carrier was 1:1, the ratio by molar of the magnesium compound to tetrahydrofuran was 1:12, the ratio by molar of the magnesium compound to the alcohol was 1:4, the ratio by volume of the precipitating agent to tetrahydrofuran was 1:1.25, the ratio by molar of the chemical treating agent to the magnesium compound was 0.2, the concentration by mass of the nonmetallocene ligand was 0.05 g/ml, and the ratio by molar of the nonmetallocene ligand to the magnesium compound was 1:3.

The catalyst obtained was named as CAT-III-3.

Example III-3-1

Substantially the same as the Example III-3, except for the following changes:

The magnesium compound was changed to magnesium bromide, the alcohol was changed to propanol, and the precipitating agent was changed to decane. Then, the washing was performed by using decane for 3 times.

The nonmetallocene ligand was changed to

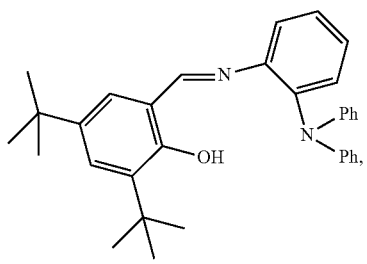

and the solvent for dissolving the nonmetallocene ligand was changed to toluene.

In this example, the ratio by molar of the magnesium compound to tetrahydrofuran was 1:40, the ratio by molar of the magnesium compound to the alcohol was 1:5.7, the ratio by volume of the precipitating agent to tetrahydrofuran was 1:2, the ratio by mass of the magnesium compound to the porous carrier was 1:2, the ratio by molar of the chemical treating agent to the magnesium compound was 0.45, the concentration by mass of the nonmetallocene ligand was 0.05 g/ml, and the ratio by molar of the nonmetallocene ligand to the magnesium compound was 1:2.7.

Example III-3-2

Substantially the same as the Example III-3, except for the following changes:

The magnesium compound was changed to diethoxy magnesium, the alcohol was changed to butanol, and the precipitating agent was changed to pentane. Then, the washing was performed by using pentane for 3 times.

The chemical treating agent was changed to ZrCl4, which was previously dissolved in toluene.

The nonmetallocene ligand was changed to

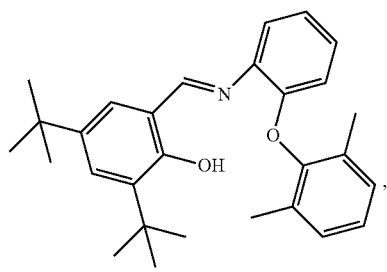

and the solvent for dissolving the nonmetallocene ligand was changed to dichloro methane.

In this example, the ratio by mass of the magnesium compound to the porous carrier was 1:4, the ratio by molar of the magnesium compound to tetrahydrofuran was 1:20, the ratio by molar of the magnesium compound to the alcohol was 1:2, the ratio by volume of the precipitating agent to tetrahydrofuran was 1:4, the ratio by molar of the chemical treating agent to the magnesium compound was 0.26, the concentration by mass of the nonmetallocene ligand was 0.15 g/ml, and the ratio by molar of the nonmetallocene ligand to the magnesium compound was 1:3.5.

Example III-3-3

Substantially the same as the Example III-3, except for the following changes:

The magnesium compound was changed to diethyl magnesium, the alcohol was changed to hexanol, and the precipitating agent was changed to cyclohexane. Then, the washing was performed by using cyclohexane.

The chemical treating agent was changed to TiBr4.

The nonmetallocene ligand was changed to

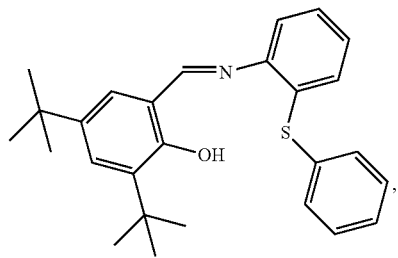

and the solvent for dissolving the nonmetallocene ligand was changed to cyclohexane.

In this example, the ratio by mass of the magnesium compound to the porous carrier was 1:3, the ratio by molar of the magnesium compound to tetrahydrofuran was 1:14, the ratio by molar of the magnesium compound to the alcohol was 1:3.5, the ratio by volume of the precipitating agent to tetrahydrofuran was 1:4, the ratio by molar of the chemical treating agent to the magnesium compound was 0.15, the concentration by mass of the nonmetallocene ligand was 0.02 g/ml, and the ratio by molar of the nonmetallocene ligand to the magnesium compound was 1:6.

Example III-3-4

Substantially the same as the Example III-3, except for the following changes:

The magnesium compound was changed to dibutyl magnesium, the alcohol was changed to heptanol, and the chemical treating agent was changed to ZrBr4.

The nonmetallocene ligand was changed to

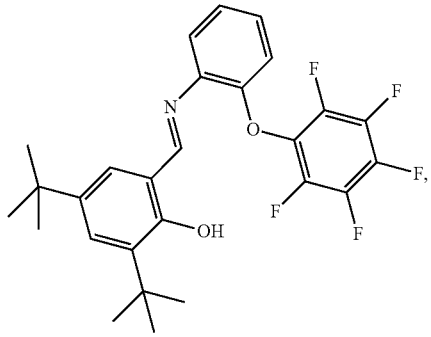

and the solvent for dissolving the nonmetallocene ligand was changed to ethyl benzene.

In this example, the ratio by mass of the magnesium compound to the porous carrier was 1:3, the ratio by molar of the magnesium compound to tetrahydrofuran was 1:10, the ratio by molar of the magnesium compound to the alcohol was 1:4, the ratio by volume of the precipitating agent to tetrahydrofuran was 1:1, the ratio by molar of the chemical treating agent to the magnesium compound was 0.22, the concentration by mass of the nonmetallocene ligand was 0.28 g/ml, and the ratio by molar of the nonmetallocene ligand to the magnesium compound was 1:1.

Example III-3-5

Substantially the same as the Example III-3, except for the following changes:

The magnesium compound was changed to methoxy magnesium, and the alcohol was changed to cyclohexanol.

The nonmetallocene ligand was changed to

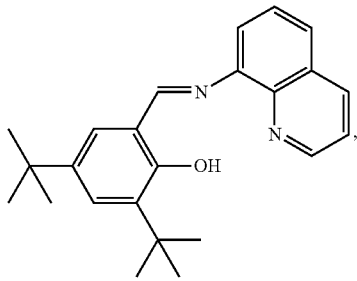

and the solvent for dissolving the nonmetallocene ligand was changed to xylene.

Example III-3-6

Substantially the same as the Example III-3, except for the following changes:

The magnesium compound was changed to ethyl magnesium chloride, and the alcohol was changed to phenyl butanol.

The nonmetallocene ligand was changed to

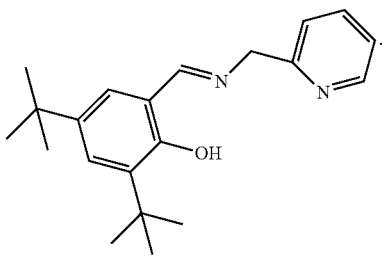

Example III-3-7

Substantially the same as the Example III-3, except for the following changes:

Al2O3 was used as the porous carrier, which had been thermally activated at 800° C. under a N2 atmosphere for 12 hours.

The alcohol was changed to cyclohexanol.

The nonmetallocene ligand was changed to

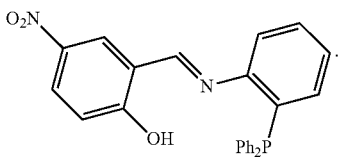

Example III-3-8

Substantially the same as the Example III-3, except for the following changes:

Polystyrene having a carboxy group on its surface was used as the porous carrier, and the thermal activation was conducted at 200° C. under a $N_2$ gas atmosphere for 2 hours.

The alcohol was changed to methyl cyclohexanol.

The nonmetallocene ligand was changed to

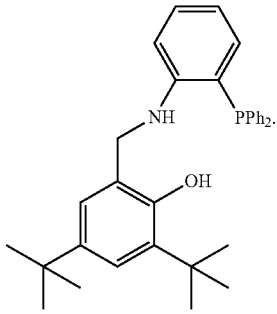

Example III-3-9

Substantially the same as the Example III-3, except for the following changes:

Montmorillonite having a hydroxy group on its surface was used as the porous carrier, and the thermal activation was conducted at 300° C. under a $N_2$ gas atmosphere for 6 hours.

The magnesium compound was changed to propoxy magnesium, and the alcohol was changed to phenyl ethanol.

The nonmetallocene ligand was changed to

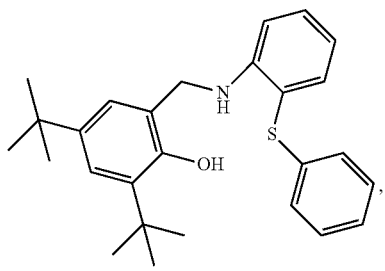

Example III-3-10

Substantially the same as the Example III-3, except for the following changes:
Silica produced by pyrohydrolysis of SiCl4 was used as the porous carrier, and the thermal activation was conducted at 600° C. under a dry $N_2$ gas atmosphere for 8 hours.
The magnesium compound was changed to butoxy magnesium, and the alcohol was changed to heptanol.
The nonmetallocene ligand was changed to

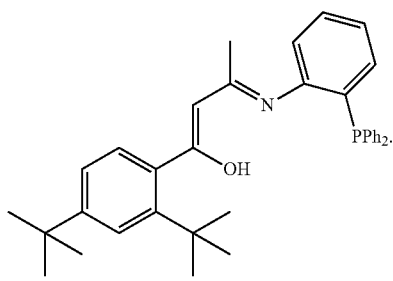

Example III-3-11

Substantially the same as the Example III-3, except for the following changes:
TiO2 was used as the porous carrier, and the thermal activation was conducted at 400° C. under a dry Ar gas atmosphere for 4 hours.
The magnesium compound was changed to methyl magnesium chloride, and the alcohol was changed to phenyl propanol.
The nonmetallocene ligand was changed to

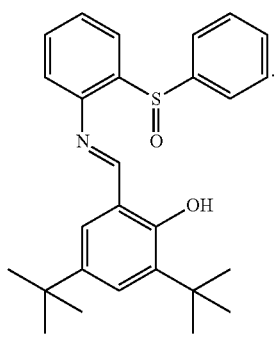

Example III-3-12

Substantially the same as the Example III-3, except for the following changes:
The MCM-41 molecular sieve was used as the porous carrier, and the thermal activation was conducted at 450° C. under a $N_2$ gas atmosphere for 8 hours.
The magnesium compound was changed to ethyl magnesium chloride, and the alcohol was changed to phenyl butanol.
The nonmetallocene ligand was changed to

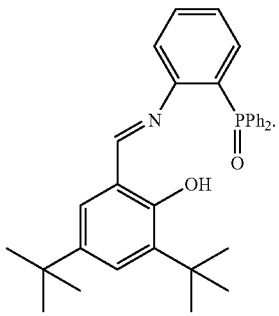

Example III-3-13

Substantially the same as the Example III-3, except for the following changes:
The magnesium compound was changed to propyl magnesium chloride, and the alcohol was changed to phenyl pentanol.
The nonmetallocene ligand was changed to

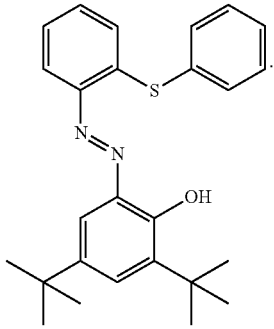

Example III-3-14

Substantially the same as the Example III-3, except for the following changes:
The magnesium compound was changed to butyl magnesium chloride.
The nonmetallocene ligand was changed to

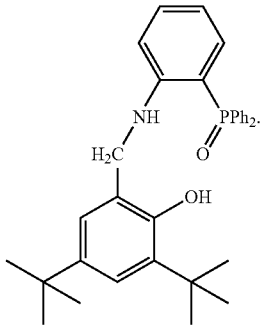

Example III-4

A silica gel (ES757, from the Ineos company) was used as the porous carrier, which had been thermally activated at 600° C. under a N$_2$ atmosphere for 4 hours before use.

5 g of anhydrous magnesium chloride (as the magnesium compound) was weighted, and a mixed solvent of tetrahydrofuran and ethanol (as the alcohol) was added thereto. The mixture was heated to 60° C. under stirring for 1.5 hours to form a solution. Then, the thermally activated silica gel was added to the thus obtained solution. After stirred at 60° C. for 2 hours to form a transparent system, hexane (as the precipitating agent) was added thereto to precipitate the solid. The resultant was filtered, washed for 1 time by 50 ml hexane, and dried by suction so as to obtain a Mg-treated porous carrier.

A solution of triethyl aluminum in hexane was dropwise added to the Mg-treated porous carrier over a period of 15 minutes to react for 1 hour. The resultant was filtered, washed by hexane for 2 time (25 ml per time). Then, a solution of the nonmetallocene ligand of the structure

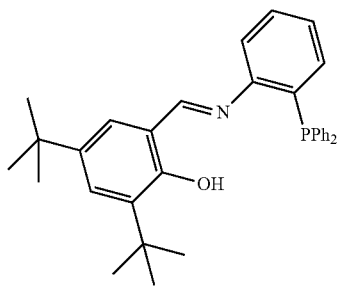

in hexane (as the solvent for dissolving the nonmetallocene ligand) was added thereto, and the reaction continued under stirring for 2 hours. After filtrated, washed by hexane for 2 times (25 ml per time), and dried at 25° C. for 2 hours.

Then, 50 ml hexane was added thereto, and TiCl4 was dropwise added thereto over a period of 30 minutes under stirring, and was reacted for 4 hours at 60° C. under stirring. The resultant was then filtered, washed by hexane for 3 times (25 ml per time), and dried at the room temperature for 4 hours, so as to obtain a supported nonmetallocene catalyst.

In this example, the ratio by mass of the magnesium compound to the porous carrier was 1:1, the ratio by molar of the magnesium compound to tetrahydrofuran was 1:12, the ratio by molar of the magnesium compound to the alcohol was 1:4, the ratio by volume of the precipitating agent to tetrahydrofuran was 1:1.25, the ratio by molar of the chemical treating agent to the magnesium compound was 0.2, the ratio of the assistant chemical treating agent to the Mg-treated porous carrier was 1 mmol:1 g, the concentration by mass of the nonmetallocene ligand was 0.05 g/ml, and the ratio by molar of the nonmetallocene ligand to the magnesium compound was 1:3.

The catalyst obtained was named as CAT-III-4, in which the content by mass of Ti was 2.86%, and the content by mass of the nonmetallocene ligand was 0.9%.

Example III-4-1

Substantially the same as the Example III-4, except for the following changes:

A solution of methyl aluminoxane in toluene was dropwise added to react for 4 hours. Then, TiCl4 was dropwise added. The reaction continued for 0.5 hour at 105° C. under stirring, then the resultant was filtered, and washed by toluene.

In this example, the ratio of the assistant chemical treating agent to the Mg-treated porous carrier was 2 mmol:1 g.

The nonmetallocene ligand was changed to

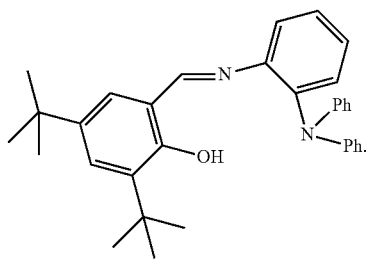

Example III-4-2

Substantially the same as the Example III-4, except for the following changes:

A solution of triethyl aluminum in heptane was dropwise added to react for 0.5 hour. Then, TiBr4 was dropwise added. The reaction continued for 6 hours at 65° C. under stirring, then the resultant was filtered, and washed by heptane.

In this example, the ratio of the assistant chemical treating agent to the Mg-treated porous carrier was 4 mmol:1 g.

The nonmetallocene ligand was changed to

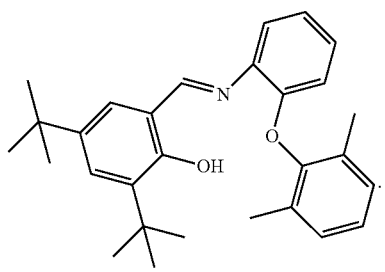

Example III-4-3

Substantially the same as the Example III-4, except for the following changes:

A solution of triethyl aluminum in decane was dropwise added. Then, a solution of ZrCl4 in decane was dropwise added. The reaction continued for 1 hour at 110° C. under stirring, then the resultant was filtered, and washed by decane.

In this example, the ratio of the assistant chemical treating agent to the Mg-treated porous carrier was 0.25 mmol:1 g.

The nonmetallocene ligand was changed to

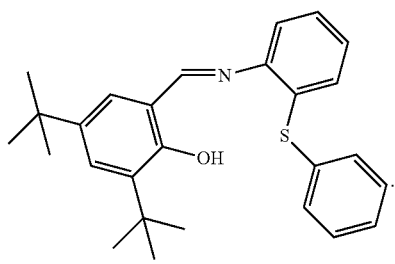

Example III-4-4

Substantially the same as the Example III-4, except for the following changes:

A solution of triethyl aluminum in pentane was dropwise added. Then, a solution of ZrBr4 in xylene was dropwise added. The reaction continued for 8 hours at 30° C. under stirring, then the resultant was filtered, and washed by xylene.

The nonmetallocene ligand was changed to

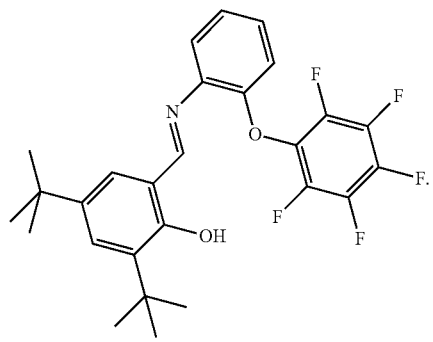

Example III-4-5

Substantially the same as the Example III-4, except for the following changes:

Triisobutyl aluminum was dropwise added, and then TiCl4. The reaction continued for 8 hours at 30° C. under stirring, then the resultant was filtered, and washed by ethyl benzene.

The nonmetallocene ligand was changed to

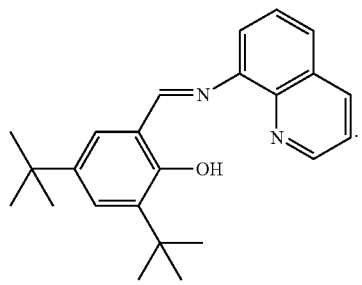

Example III-4-6

Substantially the same as the Example III-4, except for the following changes:

Triethoxy aluminum was dropwise added, and then TiCl4. The nonmetallocene ligand was changed to

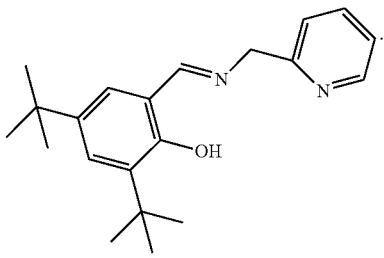

Example III-4-7

Substantially the same as the Example III-4, except for the following changes:

Isobutyl aluminoxane was dropwise added, and then TiCl4.

The nonmetallocene ligand was changed to

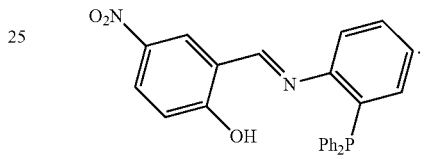

Example III-5

Application

The catalysts CAT-III-1, CAT-III-2, CAT-III-3, and CAT-III-4 produced according to the Examples and the catalysts CAT-III-A and CAT-III-B produced according to the Reference Examples were each used for ethylene homopolymerization under the following conditions.

Reactor: 2 L autoclave for polymerization;
Polymerization method: slurry polymerization;
Conditions: 1 L hexane as the solvent, the total polymerization pressure of 0.8 MPa, the polymerization temperature of 85° C., the partial pressure of hydrogen gas of 0.2 MPa, and the polymerization time of 2 hours.

1 L hexane was added to the autoclave, and the stirring means was started. A mixture of the supported nonmetallocene catalyst and a co-catalyst was added thereto, then hydrogen gas was supplied thereto up to 0.2 MPa, and finally ethylene was supplied continuously thereto to keep the total polymerization pressure at 0.8 MPa. After the polymerization, the inside of the autoclave was vented to the atmosphere, and the thus produced polymer product was discharged and weighed for its weight (by mass) after drying. The results of the polymerization were listed in the following Table III-1.

TABLE III-1

| No. | Catalyst No. | Co-catalyst | Ratio by molar of Al to Ti | Poly activity (kgPE/gCat) | Bulk density (g/cm$^3$) |
|---|---|---|---|---|---|
| 1 | CAT-III-1 | triethyl aluminum | 140 | 9.02 | 0.34 |
| 2 | CAT-III-1 | methyl aluminoxane | 100 | 10.34 | 0.34 |
| 3 | CAT-III-2 | triethyl aluminum | 140 | 7.47 | 0.33 |
| 4 | CAT-III-2 | triethyl aluminum | 500 | 7.50 | 0.33 |
| 5 | CAT-III-2 | methyl aluminoxane | 100 | 8.29 | 0.34 |
| 6 | CAT-III-2 | methyl aluminoxane | 250 | 8.31 | 0.34 |
| 7 | CAT-III-A | triethyl aluminum | 140 | 5.56 | 0.33 |

TABLE III-1-continued

| No. | Catalyst No. | Co-catalyst | Ratio by molar of Al to Ti | Poly activity (kgPE/gCat) | Bulk density (g/cm³) |
|---|---|---|---|---|---|
| 8 | CAT-III-B | triethyl aluminum | 140 | 8.16 | 0.33 |
| 9 | CAT-III-3 | triethyl aluminum | 140 | 6.22 | 0.32 |
| 10 | CAT-III-3 | methyl aluminoxane | 100 | 8.71 | 0.33 |
| 11 | CAT-III-4 | triethyl aluminum | 140 | 6.64 | 0.32 |
| 12 | CAT-III-4 | triethyl aluminum | 500 | 6.93 | 0.32 |

As can be seen from a comparison of the results obtained with the experiment Nos. 3 and 4 (or 5 and 6, or 11 and 12) in the Table III-1, when the amount of the co-catalyst to be used was increased, i.e., the ratio by molar of aluminum to titanium was increased, the polymerization activity of the supported nonmetallocene catalyst and the bulk density of the polymer product did not change to a substantial degree. This fact indicates that, if the supported nonmetallocene catalyst according to this invention is used for olefin polymerization, high polymerization activity can be achieved at a comparatively less amount of the co-catalyst. Further, the polymer product (for example polyethylene) thus obtained is characterized by desirable polymer morphology and high polymer bulk density.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A process for producing a supported single site nonmetallocene catalyst, which comprises:
    a treating step of treating a porous carrier with one of the two: a chemical treating agent and a nonmetallocene ligand, at the end of the reaction, the resultant mixture is subjected to filtration, washing, and drying to obtain a modified porous carrier, wherein the chemical treating agent is a Group IVB metal compound; and
    a contacting step of contacting the modified porous carrier with the other of the two: the chemical treating agent and the nonmetallocene ligand, so as to obtain the supported nonmetallocene catalyst.

2. The process according to claim 1, comprising pre-treating the porous carrier by thermal activating and/or by a magnesium compound, wherein treatment by magnesium compound comprises:
    a step of dissolving the magnesium compound in a mixed solvent consisting of tetrahydrofuran and an alcohol, to obtain a magnesium compound solution,
    a step of mixing the porous carrier with the magnesium compound solution, to obtain a slurry; and
    a step of drying the slurry (hereinafter referred to a slurry-drying process), or adding a precipitating agent to the slurry to precipitate same (hereinafter referred to a slurry-precipitating process), so as to treat the porous carrier with the magnesium compound.

3. The process according to claim 1, wherein prior to the treating step, the porous carrier is pretreated by an assistant chemical treating agent selected from the group consisting of an aluminoxane, an alkylaluminum and a combination thereof.

4. The process according to claim 1, wherein the porous carrier is one or more selected from the group consisting of a styrene polymer, silica, alumina, magnesium oxide, titanium dioxide, a molecular sieve and montmorillonite.

5. The process according to claim 4, wherein the porous carrier is silica.

6. The process according to claim 2, wherein the magnesium compound is one or more selected from the group consisting of a magnesium halide, an alkoxy magnesium halide, an alkoxy magnesium, an alkyl magnesium, an alkyl magnesium halide and an alkyl alkoxy magnesium, and
    the alcohol is one or more selected from the group consisting of an aliphatic alcohol, an aromatic alcohol and an alicyclic alcohol.

7. The process according to claim 6, wherein the magnesium compound is magnesium halide.

8. The process according to claim 6, wherein the alcohol is aliphatic alcohol.

9. The process according to claim 2, wherein during the treatment by magnesium compound, ratio by molar of the magnesium compound (based on Mg) to tetrahydrofuran is 1 to 6-40, ratio by molar of the magnesium compound (based on Mg) to the alcohol is 1 to 1-8, and ratio by mass of the magnesium compound to the porous carrier is 1 to 0.5-4.

10. The process according to claim 9, wherein the ratio by molar of the magnesium compound (based on Mg) to tetrahydrofuran is 1 to 8-20, the ratio by molar of the magnesium compound (based on Mg) to the alcohol is 1 to 0.5-4, and the ratio by mass of the magnesium compound to the porous carrier is 1 to 1-2.

11. The process according to claim 2, wherein the precipitating agent is one or more selected from the group consisting of an alkane, a cyclic alkane, a halogenated alkane and a halogenated cyclic alkane.

12. The process according to claim 11, wherein the precipitating agent is one or more selected from the group consisting of pentane, hexane, heptane, decane and cyclohexane.

13. The process according to claim 2, wherein ratio by volume of the precipitating agent to tetrahydrofuran is 1 to 0.25-4.

14. The process according to claim 13, wherein the ratio by volume of the precipitating agent to tetrahydrofuran is 1 to 0.5-2.

15. The process according to claim 1, wherein the Group IVB metal compound is one or more selected from the group consisting of a Group IVB metal halide, a Group IVB metal alkylate and a Group IVB metal alkyl halide.

16. The process according to claim 15, wherein the Group IVB metal compound is one or more selected from the group consisting of titanium halide and zirconium halide.

17. The process according to claim 2, wherein
    in case the treatment by magnesium compound is conducted with the slurry-drying process, ratio by mass of the nonmetallocene ligand to the porous carrier is 0.05-0.50 to 1, and ratio by molar of the chemical treating agent (based on the Group IVB metal) to the nonmetallocene ligand is 1 to 0.1-1,
    in case the treatment by magnesium compound is conducted with the slurry-precipitating process, ratio by molar of the nonmetallocene ligand to the magnesium compound (based on Mg) is 1 to 1-10, and ratio by molar of the chemical treating agent (based on the Group IVB metal) to the magnesium compound (based on Mg) is 0.05 to 0.50, and in otherwise case, ratio of the chemical treating agent (based on the Group IVB metal) to the porous carrier is 1-100 mmol to 1 g, and ratio of the nonmetallocene ligand to the porous carrier is 0.02-1.00 mmol to 1 g.

18. The process according to claim 17, wherein
in case the treatment by magnesium compound is conducted with the slurry-drying process, the ratio by mass of the nonmetallocene ligand to the porous carrier is 0.10-0.30 to 1, and the ratio by molar of the chemical treating agent (based on the Group IVB metal) to the nonmetallocene ligand is 1 to 0.3-0.9,
in case the treatment by magnesium compound is conducted with the slurry-precipitating process, the ratio by molar of the nonmetallocene ligand to the magnesium compound (based on Mg) is 1 to 1.5-4, and the ratio by molar of the chemical treating agent (based on the Group IVB metal) to the magnesium compound (based on Mg) is 0.10 to 0.30, and
in otherwise case, the ratio of the chemical treating agent (based on the Group IVB metal) to the porous carrier is 5-40 mmol to 1 g, and the ratio of the nonmetallocene ligand to the porous carrier is 0.08-0.53 mmol to 1 g.

19. The process according to claim 1, wherein the nonmetallocene ligand is a compound having the following structure, wherein:
q is 0 or 1;
d is 0 or 1;
A is an oxygen atom, a sulfur atom, a selenium atom, $\diagdown NR^{22}$,

—$NR^{23}R^{24}$, —$N(O)R^{25}R^{26}$, $\diagdown PR^{27}$,

—$PR^{28}R^{29}$, —$P(O)R^{30}OR^{31}$, a sulfone group, a sulfoxide group or —$Se(O)R^{39}$;
B is a nitrogen-containing group, a phosphor-containing group, or a $C_1$-$C_{30}$ hydrocarbyl;
D is an oxygen atom, a sulfur atom, a selenium atom, a nitrogen-containing $C_1$-$C_{30}$ hydrocarbyl, a phosphor-containing $C_1$-$C_{30}$ hydrocarbyl, a sulfone group, a sulfoxide group, $\diagdown NR^{22}$,

—$N(O)R^{25}R^{26}$, $\diagdown PR^{27}$, or —$P(O)R^{32}(OR^{33})$, wherein N, O, S, Se and P each represent a coordination atom;

E is a nitrogen-containing group, an oxygen-containing group, a sulfur-containing group, a selenium-containing group or a phosphor-containing group, wherein N, O, S, Se and P each represent a coordination atom;
G is a $C_1$-$C_{30}$ hydrocarbyl, a substituted $C_1$-$C_{30}$ hydrocarbyl or an inert functional group;
→ represents a single bond or a double bond;
— represents a covalent bond or an ionic bond; and
$R^1$ to $R^3$, $R^{22}$ to $R^{33}$ and $R^{39}$ are each independently selected from the group consisting of hydrogen, a $C_1$-$C_{30}$ hydrocarbyl, a halogen atom, a substituted $C_1$-$C_{30}$ hydrocarbyl and an inert functional group, wherein these groups can be identical to or different with each other, and any adjacent two or more groups can form a bond or a ring together.

20. The process according to claim 19, wherein the nonmetallocene ligand is selected from the group consisting of the following structures (A) and (B), (A)

and (B)

wherein:
F is a nitrogen-containing group, an oxygen-containing group, a sulfur-containing group, a selenium-containing group or a phosphor-containing group, wherein N, O, S, Se and P each represent a coordination atom.

21. The process according to claim 20, wherein the nonmetallocene ligand is selected from the group consisting of the following structures A-1 to A-4 and B-1 to B-4,

A-1

A-2

-continued

A-3 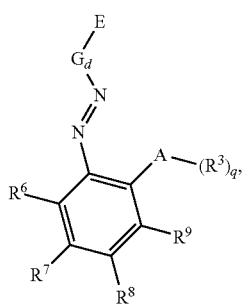

A-4 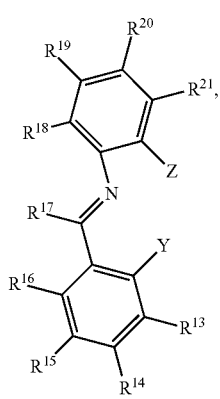

B-1 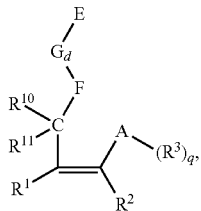

B-2 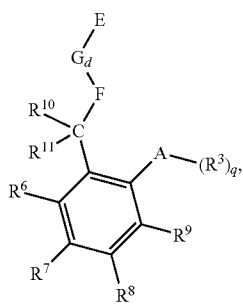

B-3 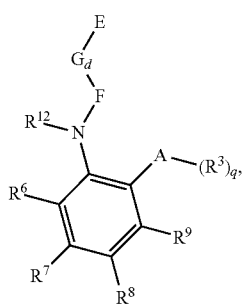

-continued

B-4 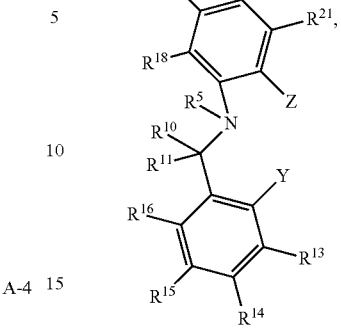

wherein:
Y and Z are each independently selected from the group consisting of a nitrogen-containing group, an oxygen-containing group, a sulfur-containing group, a selenium-containing group and a phosphor-containing group, wherein N, O, S, Se and P each represent a coordination atom;

$R^4$ and $R^6$ to $R^{21}$ are each independently selected from the group consisting of hydrogen, a $C_1$-$C_{30}$ hydrocarbyl, a halogen atom, a substituted $C_1$-$C_{30}$ hydrocarbyl and an inert functional group, wherein these groups can be identical to or different with each other, and any two or more adjacent groups can form a bond or a ring together; and R5 is the lone pair electron on nitrogen atom, hydrogen, a C1-C30 hydrocarbyl, a substituted C1-C30 hydrocarbyl, an oxygen-containing group, a sulfur-containing group, a selenium-containing group, a nitrogen-containing group, or a phosphor-containing group, with the proviso that when R5 is the oxygen-containing group, the sulfur-containing group, the nitrogen-containing group, the selenium-containing group or the phosphor-containing group, N, O, S, P and Se in the group R5 each represent a coordination atom.

22. The process according to claim 21, wherein
the halogen atom is F, Cl, Br or I,
the nitrogen-containing group is

—$NR^{23}R^{24}$, -T-$NR^{23}R^{24}$ or —$N(O)R^{25}R^{26}$,
the phosphor-containing group is

—$PR^{28}R^{29}$, —$P(O)R^3OR^{31}$, —$P(O)R^{32}(OR^{33})$, -T-$PR^{28}(OR^{29})$, -T-$P(O)R^3OR^{31}$ or -T-$P(O)R^{32}(OR^{33})$,
the oxygen-containing group is hydroxy, —$OR^{34}$ or -T-$OR^{34}$,
the sulfur-containing group is —$SR^{35}$, -T-$SR^{35}$, —$S(O)R^{36}$ or -T-$SO_2R^{37}$, the selenium-containing group is —SeR$^{38}$, -T-SeR$^{38}$, —Se(O)R$^{39}$ or -T-Se(O)R$^{39}$, the group T is a C$_1$-C$_{30}$ hydrocarbyl, a substituted C$_1$-C$_{30}$ hydrocarbyl or an inert functional group, the C$_1$-C$_{30}$ hydrocarbyl is a C$_1$-C$_{30}$ alkyl group, a C$_2$-C$_{30}$ cyclic alkyl group, a C$_2$-C$_{30}$ alkenyl group, a C$_2$-C$_{30}$ alkynyl group, a C$_6$-C$_{30}$ aryl group, a C$_8$-C$_{30}$ fused-ring group or a C$_4$-C$_{30}$ heterocycle group, the substituted C$_1$-C$_{30}$ hydrocarbyl is a halogenated C$_1$-C$_{30}$ hydrocarbyl group, a halogenated C$_6$-C$_{30}$ aryl group, a halogenated C$_8$-C$_{30}$ fused-ring group or a halogenated C$_4$-C$_{30}$ heterocycle group, the inert functional group is the halogen atom, the oxygen-containing group, the nitrogen-containing group, a silicon-containing group, a germanium-containing group, the sulfur-containing group or a tin-containing group, the silicon-containing group is —SiR$^{42}$R$^{43}$R$^{44}$, or -T-SiR$^{45}$, the germanium-containing group is —GeR$^{46}$R$^{47}$R$^{48}$, or -T-GeR$^{49}$, the tin-containing group is —SnR$^5$OR$^{51}$R$^{52}$, -T-SnR$^{53}$ or -T-Sn(O)R$^{54}$, and R$^{34}$ to R$^{38}$ and R$^{42}$ to R$^{54}$ are each independently selected from the group consisting of hydrogen, the C$_1$-C$_{30}$ hydrocarbyl, the halogen atom, the substituted C$_1$-C$_{30}$ hydrocarbyl and the inert functional group.

23. The process according to claim 19, wherein the nonmetallocene ligand is selected from the group consisting of the following compounds,

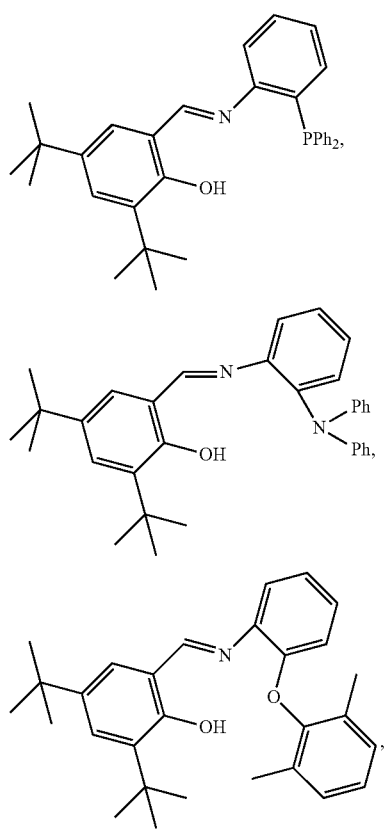

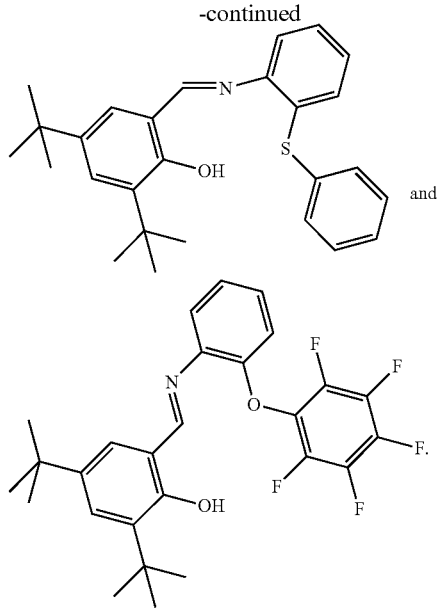

24. The process according to claim 23, wherein the nonmetallocene ligand is selected from the group consisting of the following two compounds,

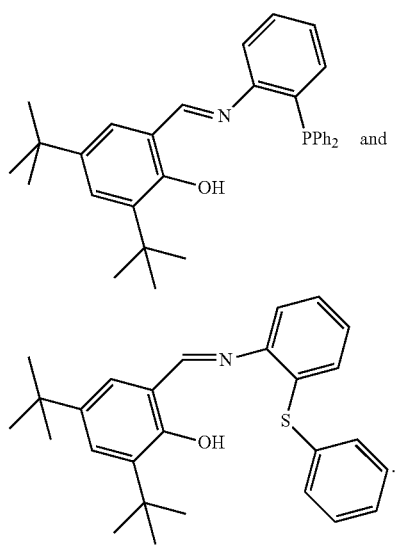

25. A supported nonmetallocene catalyst, comprising a carrier and a nonmetallocene catalyst supported thereon, wherein the supported nonmetallocene catalyst is produced by the process according to claim 1.

26. A supported nonmetallocene catalyst, comprising a carrier and a nonmetallocene catalyst supported thereon, wherein the supported nonmetallocene catalyst is produced by the process according to claim 2.

27. An olefin omopolymerization/copolymerization process, wherein the supported nonmetallocene catalyst according to claim 25 is used as the main catalyst, in combination of one or more selected from the group consisting of an aluminoxane, an alkylaluminum, a halogenated alkyl aluminum, a fluoroborane, an alkylboron and an alkylboron ammonium salt as a co-catalyst, to catalyze homopolymerization/copolymerization of the olefin.

28. An olefin omopolymerization/copolymerization process, wherein the supported nonmetallocene catalyst according to claim 26 is used as the main catalyst, in combination of one or more selected from the group consisting of an aluminoxane, an alkylaluminum, a halogenated alkyl aluminum, a fluoroborane, an alkylboron and an alkylboron ammonium salt as a co-catalyst, to catalyze homopolymerization/copolymerization of the olefin.

29. The process according to claim 2, wherein, prior to mixing with the magnesium compound solution to obtain the slurry, the porous carrier is thermally activated.

30. The process according to claim 2, wherein, prior to the treating step, the porous carrier is pretreated by an assistant chemical treating agent selected from the group consisting of an aluminoxane, an alkylaluminum and a combination thereof.

* * * * *